(12) United States Patent
Kuse et al.

(10) Patent No.: US 7,267,896 B2
(45) Date of Patent: *Sep. 11, 2007

(54) MAGNETIC TAPE AND MAGNETIC TAPE CARTRIDGE

(75) Inventors: Sadamu Kuse, Minoo (JP); Tsugihiro Doi, Ibaraki (JP); Tetsutaro Inoue, Ikeda (JP); Mikio Kishimoto, Moriya (JP); Yuji Sasaki, Kyoto-fu (JP); Hideaki Watanabe, Kyoto-fu (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 437 days.

This patent is subject to a terminal disclaimer.

(21) Appl. No.: 10/389,880

(22) Filed: Mar. 18, 2003

(65) Prior Publication Data

US 2004/0089564 A1    May 13, 2004

(30) Foreign Application Priority Data

Mar. 18, 2002  (JP)  .......................... P2002-074617
Sep. 20, 2002  (JP)  .......................... P2002-274435

(51) Int. Cl.
*G11B 5/706* (2006.01)

(52) U.S. Cl. .................. 428/839.3; 428/842.6

(58) Field of Classification Search ........... 428/216, 428/329, 336, 694 BA, 694 BM, 694 BS, 428/839.3, 842.6

See application file for complete search history.

(56) References Cited

U.S. PATENT DOCUMENTS 3,904,448 A   9/1975  Takahashi et al.
4,020,236 A   4/1977  Aonuma et al.

(Continued)

FOREIGN PATENT DOCUMENTS

DE    69326124    6/1994

(Continued)

OTHER PUBLICATIONS

Powder and Powder Mettallurgy, vol. 46, No. 2, pp. 151-155 (1999), "Synthesis of Iron Nitrides $Fe_xN$ (x:2, 2-3, 4, 16/2) by Nitrogenizing α—Fe in Ammonia Gas, and Magnetic Properties of The Bulk Sample of $Fe_{16}N_2$".

(Continued)

*Primary Examiner*—Carol Chaney
*Assistant Examiner*—G. Harris
(74) *Attorney, Agent, or Firm*—Birch, Stewart, Kolasch & Birch, LLP

(57) ABSTRACT

A magnetic recording medium comprising a non-magnetic support; at least one lower magnetic layer containing magnetic powder and a binder resin, which is formed on one side of the non-magnetic support with or without a non-magnetic primer layer interposed between the non-magnetic support and the lower magnetic layer; at least one non-magnetic intermediate layer containing non-magnetic powder and a binder resin, which is formed on the lower magnetic layer; at least one upper magnetic layer containing magnetic powder and a binder resin, which is formed on the non-magnetic intermediate layer; and a back layer which is formed on the other side of the non-magnetic support, characterized in that the magnetic powder contained in the uppermost magnetic layer of the upper magnetic layer is iron type magnetic powder which comprises substantially spherical or ellipsoidal particles with a number-average particle diameter of 5 to 50 nm and an average axial ratio of 1 to 2, each of said particles containing iron or containing iron as a main component and a transition element; and that the total thickness of the magnetic recording medium is 6 μm or less. This magnetic recording medium has electromagnetic conversion characteristics which cannot be achieved by any of conventional magnetic recording media, and also is expected to have excellent magnetic serve characteristics.

27 Claims, 5 Drawing Sheets

U.S. PATENT DOCUMENTS

| | | | |
|---|---|---|---|
| 4,265,931 A * | 5/1981 | Tamai et al. | 427/599 |
| 4,324,177 A | 4/1982 | Tsuji et al. | |
| 4,451,535 A | 5/1984 | Pingaud et al. | |
| 4,643,942 A | 2/1987 | Ohtsubo | |
| 4,911,951 A * | 3/1990 | Ogawa et al. | 427/130 |
| 4,952,444 A | 8/1990 | Kawamata et al. | |
| 5,093,193 A * | 3/1992 | Koyama et al. | 428/336 |
| 5,156,922 A | 10/1992 | Mishima et al. | |
| 5,252,380 A | 10/1993 | Nakazumi et al. | |
| 5,380,905 A | 1/1995 | Haidos et al. | |
| 5,494,722 A | 2/1996 | Oka et al. | |
| 5,496,607 A | 3/1996 | Inaba et al. | |
| 5,518,804 A * | 5/1996 | Mizuno et al. | 428/212 |
| 5,637,390 A | 6/1997 | Isobe et al. | |
| 5,645,917 A | 7/1997 | Ejiri et al. | |
| 5,935,674 A | 8/1999 | Saito et al. | |
| 6,071,608 A | 6/2000 | Yoshida et al. | |
| 6,307,700 B1 | 10/2001 | Takayama et al. | |
| 6,319,485 B1 * | 11/2001 | Nagatomi et al. | 423/409 |
| 6,372,338 B1 | 4/2002 | Jeffers et al. | |
| 6,517,934 B1 | 2/2003 | Kishimoto | |
| 6,534,168 B2 | 3/2003 | Naoe et al. | |
| 6,607,807 B2 | 8/2003 | Zinbo et al. | |
| 6,652,999 B2 * | 11/2003 | Ejiri et al. | 428/828 |
| 6,780,531 B2 | 8/2004 | Tani et al. | |
| 6,964,811 B2 * | 11/2005 | Kishimoto et al. | 428/402 |
| 7,157,163 B2 * | 1/2007 | Yajima et al. | 428/839.6 |
| 2002/0030929 A1 * | 3/2002 | Sasaki | 360/126 |
| 2003/0194582 A1 | 10/2003 | Ishikawa et al. | |
| 2004/0089564 A1 * | 5/2004 | Kuse et al. | 206/307 |
| 2004/0191574 A1 * | 9/2004 | Fuller et al. | 428/694 BS |
| 2004/0247859 A1 | 12/2004 | Sasaki et al. | |
| 2005/0123754 A1 * | 6/2005 | Masada et al. | 428/402 |
| 2005/0172479 A1 * | 8/2005 | Sasaki | 29/603.16 |
| 2005/0276999 A1 * | 12/2005 | Kuse et al. | 428/836 |
| 2006/0008645 A1 * | 1/2006 | Kishimoto et al. | 428/403 |

FOREIGN PATENT DOCUMENTS

| | | |
|---|---|---|
| EP | 0602533 | 6/1994 |
| EP | 1 071 102 A1 | 1/2001 |
| JP | 52-5720 B | 2/1977 |
| JP | 55-86103 A | 6/1980 |
| JP | 60-50323 B | 6/1980 |
| JP | 64-1297 B | 10/1980 |
| JP | 57-183629 A | 11/1982 |
| JP | 2001-110164 A | 4/1985 |
| JP | 60-130103 A | 7/1985 |
| JP | 6-18062 | 8/1985 |
| JP | 60-157719 A | 8/1985 |
| JP | 60-204862 | 10/1985 |
| JP | 7-60504 B | 9/1987 |
| JP | 63-187418 A | 8/1988 |
| JP | 63-191315 A | 8/1988 |
| JP | 3-49026 A | 3/1991 |
| JP | 03-097203 * | 4/1991 |
| JP | 03-101102 A | 4/1991 |
| JP | 4-19815 A | 1/1992 |
| JP | 04-248120 A | 9/1992 |
| JP | 5-73883 A | 3/1993 |
| JP | 5090018 | 4/1993 |
| JP | 5-217148 A | 8/1993 |
| JP | 5-234064 A | 9/1993 |
| JP | 5-234064 A | 9/1993 |
| JP | 5-298653 A | 11/1993 |
| JP | 06-025702 A | 2/1994 |
| JP | 6-25702 A | 2/1994 |
| JP | 6-36265 A | 2/1994 |
| JP | 6-139553 A | 5/1994 |
| JP | 6-139553 A | 5/1994 |
| JP | 10-083906 | 3/1998 |
| JP | 11-126327 A | 5/1999 |
| JP | 11-126328 A | 5/1999 |
| JP | 11-213384 A | 8/1999 |
| JP | 11-238225 A | 8/1999 |
| JP | 11-297034 A | 10/1999 |
| JP | 11-339254 A | 10/1999 |
| JP | 2000-30238 A | 1/2000 |
| JP | 2000-40217 A | 2/2000 |
| JP | 2000-040218 A | 2/2000 |
| JP | 2000-277311 A | 10/2000 |
| JP | 2000-293836 A | 10/2000 |
| JP | 2000-315312 A | 11/2000 |
| JP | 2000-315312 A | 11/2000 |
| JP | 2001-043525 A | 2/2001 |
| JP | 2001-67649 A | 3/2001 |
| JP | 2001-081506 A | 3/2001 |
| JP | 2001-148115 A | 5/2001 |
| JP | 2001-176715 A | 6/2001 |
| JP | 2001-181754 A | 7/2001 |
| JP | 2001-273620 A | 10/2001 |
| JP | 2001-273626 A | 10/2001 |
| JP | 2001-325720 A | 11/2001 |
| JP | 2001-338418 A | 12/2001 |
| JP | 2002-050029 A | 2/2002 |
| JP | 2002-56518 A | 2/2002 |
| JP | 2002-288817 A | 10/2002 |
| JP | 2003-73705 A | 3/2003 |
| WO | WO 00/48210 | 8/2000 |

OTHER PUBLICATIONS

Transactions of the Magnetic Society of Japan, vol. 25, pp. 927-930 (2001), "Magnetic Properties of $Fe_{16}N_2$ Fine Particles".

Patent Abstracts of Japan, Pub. No. 04-318321, published Nov. 9, 1992.

Patent Abstracts of Japan, Pub. No. 05-274644, published Oct. 22, 1993.

English language Abstract of JP 11-340023, published Dec. 10, 1999.

Derwent Abstract translation of WO 2003/079332 A1 and AU 2003/211248 A1 (Derwent Acc. No. 2003-748694).

English language machine translation of JP-10-083906 (having a publication date of Mar. 31, 1998).

* cited by examiner

MAGNETIC TAPE AND MAGNETIC TAPE CARTRIDGE

TECHNICAL FIELD

The present invention relates to a magnetic recording medium having good high density recording properties, in particular, a coating type magnetic tape (hereinafter simply referred to as "a magnetic tape" or "tape").

BACKGROUND ART

Magnetic tapes have found various applications in audio tapes, videotapes, computer tapes, etc. In particular, in the field of magnetic tapes for data-backup, tapes with memory capacities of several tens to 100 GB per reel are commercialized in association with increased capacities of hard discs for back-up. A backup tape with a capacity of 1 TB or more has been proposed, and it is indispensable for such a backup tape to have a higher recording density.

In the production of a magnetic tape capable of meeting such a demand for higher recording density, advanced techniques are required for production of very fine magnetic powder, highly dense dispersion of such magnetic powder in a coating layer, smoothing of such a coating layer, and formation of a thinner magnetic layer.

To increase the recording density, recording signals with shorter wavelength and tracks with shorter pitches are required, and there has been emerged a system using servo tracks so that a reproduction head can correctly trace the tracks.

To meet mainly the demand for recording of signals with shorter wavelength, magnetic powder for use in magnetic tape have been improved to have more and more fine particle size and also improved in magnetic characteristics. In the field of the existing high recording density magnetic tapes, magnetic powders of ferromagnetic iron oxide, Co-modified ferromagnetic iron oxide, chromium oxide and the like, used in audio systems and household video tapes have been dominantly used. Presently, needle-shape metallic magnetic powder having a particle size in a major axis direction of 100 nm or so has been proposed. On the other hand, to prevent a decrease in output due to demagnetization in recording signals with shorter wavelengths, backup tapes with higher coercive forces have been vigorously developed year by year. As a result of such developments, backup tapes with coercive forces of about 198.9 kA/m have been accomplished by the use of iron-cobalt alloys (JP-A-3-49026, JP-A-5-234064, JP-A-6-25702, JP-A-6-139553, etc.).

In the meantime, the media-producing techniques have been significantly advanced by the development of binder resins having a variety of functional groups, the improvement of the dispersing technique for the above magnetic powder, and further the improvement of the technique of calendering after the coating step. These improvements have markedly improved the surface smoothness of magnetic layers and contributed greatly to an increase in output of signals with shorter wavelengths (for example, JP-B-64-1297, JP-B-7-60504, JP-A-4-19815, etc.).

In association with the recent high density recording, the recording wavelength becomes shorter and shorter. Therefore, in case where the thickness of a magnetic layer is large, the levels of the saturation magnetization and the coercive force of conventional magnetic powder are insufficient within the shortest recording wavelength region, so that the reproducing output decreases to a fraction thereof. Further, because the recording wavelength is very short, self demagnetization loss and thickness loss due to the thickness of a magnetic layer give adverse influences on the resolution, although such demagnetization loss and thickness loss which occur when recorded signals are reproduced have not arisen so serious problem so far. This problem cannot be overcome by the above improvement of the magnetic characteristics of magnetic powder and the improvement of the surfaces of magnetic layers by the medium-producing technique. Under such circumstances, it is proposed that the thickness of a magnetic layer should be reduced.

Generally, it is said that the effective thickness of a magnetic layer is about one third of the shortest recording wavelength used in the system. For example, the thickness of a magnetic layer is required to be about 0.1 µm when the shortest recording wavelength is 0.3 µm. With the trend of compacting a cassette (or a cartridge) for holding tape, a whole of magnetic tape is needed to be thinner so as to increase the recording capacity per volume. To meet such a demand, it is consequently needed to form a thinner magnetic layer. Further, to increase the recording density, a magnetic flux for writing which a magnetic head generates should have a very small area. In this connection, compacting of the magnetic head results in a smaller amount of magnetic flux generated thereby. In order for the above very small magnetic flux to cause a perfect magnetic inversion, it is necessary that a magnetic layer should be formed with a thinner thickness.

However, there arise other problems in the formation of a thinner magnetic layer. That is, when the thickness of a magnetic layer is reduced, the surface roughness of a non-magnetic support gives an adverse influence on the surface of the magnetic layer, so that the surface smoothness of the magnetic layer degrades. When a single magnetic layer is formed with a thin thickness, the solid content in a magnetic paint should be decreased, or the amount of the paint to be applied should be decreased. However, the defects of coating are not eliminated and the filling of magnetic powder is not improved by these methods, which results in poor film strength. To overcome this problem, the following concurrent coating-and-laminating method is proposed: that is, in case where a thinner magnetic layer is formed by an improved medium-producing technique, a primer layer is provided between a non-magnetic support and a magnetic layer, and the upper magnetic layer is applied on the primer layer which is still in a wet state (JP-A-63-187418, JP-A-63-191315, JP-A-5-73883, JP-A-5-217148, JP-A-5-298653, etc.).

When the recording density in the tape-widthwise direction is increased by narrowing the width of the recording tracks, magnetic flux leaking from the magnetic tape is decreased. Therefore, it is needed that MR heads using magneto-resistance elements, which can achieve high output even when the magnetic fluxes are very small, are used for reproducing heads.

Examples of a magnetic recording medium which can correspond to MR heads are disclosed in JP-A-11-238225, JP-A-2000-40217 and JP-A-2000-40218. In the magnetic recording media described in these publications, skewness of outputs from the MR heads is prevented by controlling the magnetic fluxes from the magnetic recording media (a product of a residual magnetic flux density and the thickness of a medium) to a specific value or less, or the thermal asperity of the MR heads is reduced by controlling the dents on the surface of the magnetic layer to a specified value or less.

When the width of the recording tracks is decreased, the reproducing output lowers due to off-track. To avoid such a problem, track servo control is needed. As types of such track servo control, there are an optical servo system (JP-A-11-213384, JP-A-11-339254 and JP-A-2000-293836) and a magnetic servo system. In either of these systems, it is necessary that track servo control is performed on a magnetic tape which is drawn out from a magnetic tape cartridge (or a cassette tape) of single reel type which houses only one reel for winding the magnetic tape, in a box-shaped casing body. The reason for using a single reel type cartridge is that, when the tape-running speed is increased (for example, 2.5 m/second or higher), a tape cannot be reliably run in a two-reel type cartridge which has two reels for drawing out the tape and for winding the same. The two-reel type cartridge has other problems in that the dimensions of the cartridge become larger and that the recording capacity per volume becomes smaller.

As mentioned above, there are two types of track servo systems, i.e., the magnetic servo system and the optical servo system. In the former track servo system, servo track bands, which are explained below, are formed on a magnetic layer by magnetic recording, and servo tracking is performed by magnetically reading such servo track bands. In the latter optical servo type, servo track bands each consisting of an array of pits are formed on a backcoat layer by laser irradiation or the like, and servo tracking is performed by optically reading such servo track bands. Other than these types, there is such magnetic serve system in which magnetic servo signals are recorded on a magnetized backcoat layer (for example, JP-A-11-126327). Further, in other optical servo system, optical servo signals are recorded on a backcoat layer, using a material capable of absorbing light or the like (for example, JP-A-11-126328).

Here, the principle of the track servo will be shortly explained.

As shown in FIG. 7, in the magnetic tape 3 employing the magnetic servo system, the magnetic layer has servo bands 200 for track servo and data-tracks 300 for data recording, each of which extends along the length-wise direction of the tape. Each of the servo bands 200 consists of a plurality of servo signal-recording parts 201 which magnetically record servo-track numbers. A magnetic head array (not shown) for recording and reproducing data onto the magnetic tape consists of a pair of MR heads for servo tracking (for forward traveling and backward traveling), and 8×2 pairs of recording-reproducing heads, where the recording heads are magnetic induction type heads, while the reproducing heads are MR heads. The entire magnetic head array moves in linking with the signals from the MR heads for servo tracking, which read the servo signals. Thereby, the recording-reproducing heads move in the widthwise direction of the tape and reach the data tracks. For example, in the case of the magnetic head array consisting of the 8×2 pairs of the recording-reproducing heads, there are 8 data tracks for one servo track.

However, the improvement of the magnetic powder and the medium-fabricating techniques have now reached the uppermost limit. Particularly in the improvement of the magnetic powder of needle particle type, the particle size thereof in the major axis direction is reduced to about 100 nm as the smallest in view of practical use. This is because, when the particle size is smaller than about 100 nm, the specific surface area of the magnetic powder markedly increases, and the saturation magnetization lowers, and also, it becomes very difficult to disperse such magnetic powder in a binder resin.

The technical innovation of magnetic heads has made it possible to record signals on media having high coercive forces. Particularly in the lengthwise recording system, it is desirable that the coercive force of a magnetic layer should be as high as possible to an extent that the erasing of the recorded signals by a magnetic head is possible, so as to prevent a decrease in output because of demagnetization by recording and reproducing. Therefore, the practical and most effective method for improving the recording density of a magnetic recording medium is to increase the coercive force of a magnetic recording medium.

To suppress the influence of a decrease in output due to demagnetization by recording and reproducing which is the essential problem of the lengthwise recording system, it is effective to further decrease the thickness of a magnetic layer. However, there is a limit in the thickness of a magnetic layer, as long as the above magnetic powder having a needle particle size in the major axis direction of about 100 nm is used. The needle particles are generally arranged such that the needle-pointed direction can be in parallel to the in-plane direction of a medium, because of the lengthwise orientation of the needle particles. However, some of the needle particles are arranged vertically to the plane of the medium, since there is a distribution in the dispersion of the particles. Because of such needle particles, the surface of the medium becomes uneven to increase the level of noises. This problem becomes more serious as the thickness of the magnetic layer is more and more thin.

In case where a magnetic layer is formed with a thinner thickness, it is needed to dilute a paint for magnetic coating with a large amount of an organic solvent. The conventional needle-shape magnetic powder tends to agglomerate paints for magnetic coating. In addition, the large amount of the organic solvent is evaporated off when the magnetic layer is dried, which degrades the orientation of the magnetic powder. Thus, the lengthwise recording tape medium becomes poor in the orientation, and it becomes difficult to obtain desired electromagnetic conversing characteristics therefrom because of degradation of the orientation and the surface of the magnetic layer, even though the magnetic layer is formed thinner. In spite of the known fact that the use of a thinner magnetic layer is effective to improve the recording characteristics in the lengthwise recording system, it is still difficult to obtain a coating type magnetic recording medium which comprises a magnetic layer with a far reduced thickness, as long as the conventional needle-shape magnetic powder is used.

Among several kinds of magnetic powder which hitherto have been proposed, barium ferrite magnetic powder is known which comprises plate particles and has a particle size of about 50 nm (for example, JP-B-60-50323, JP-B-6-18062, etc.). This barium ferrite magnetic powder is more suitable for a thin layer coating type magnetic recording medium, than the needle-shape magnetic powder, because of the particle shape and particle size of the barium ferrite magnetic powder. However, since the barium ferrite magnetic powder is an oxide, its saturation magnetization is about 7.5 µWb/g at most, and therefore, it is theoretically impossible to obtain saturation magnetization of 12.6 µWb/g or more which needle particle type metal or alloy magnetic powder can show. The use of the barium ferrite magnetic powder makes it possible to produce a coating type magnetic recording medium having a thin magnetic layer, but is unsuitable for a high density magnetic recording medium, because the output is low due to low magnetic flux density. Furthermore, the barium ferrite powder particles strongly agglomerate because of the magnetic interaction of the plate particles, and are hardly dissociated to discrete plate particles in a dispersing process. For this reason, the foregoing needle-shape magnetic powder has been dominantly used as the magnetic powder for high density magnetic recording media.

As is understood from the above description, in the formation of a magnetic layer with a thin thickness which is one of the effective methods for improving the recording density of a magnetic recording medium, it is very important to maintain the coercive force and the saturation magnetization of magnetic powder at values as high as possible and simultaneously to reduce the particle size thereof. To achieve this subject matter, the present inventors, firstly, have paid their attentions on the magnetic characteristics of the conventional magnetic powder and found that a theoretical limit is present in achieving a higher coercive force since the conventional needle-shape magnetic powder gains a coercive force based on the shape anisotropy induced by its needle particles. In other words, in the shape anisotropy, the magnitude of the magnetic anisotropy is expressed by $2\pi Is$ (wherein 'Is' represents saturation magnetization), and is proportional to the saturation magnetization. Therefore, the coercive force of the needle-shape magnetic powder based on the shape anisotropy becomes larger in proportion to an increase in saturation magnetization.

As is well known from the Slater-Pauling curve, the saturation magnetization of a metal or an alloy, for example, a Fe—Co alloy, shows a maximal value at the ratio of Fe/Co of about 70/30. Therefore, the coercive force of this alloy shows a maximal value at the above composition ratio. Needle-shape magnetic powder of Fe—Co alloy in the ratio about 70/30 has already been practically used. However, as has been described above, whenever the needle-shape magnetic powder is used, the coercive force thereof is theoretically limited to about 198.9 kA/m at most at the present, and it is difficult to achieve a higher coercive force under the present circumstances. Therefore, the use of such needle-shape magnetic powder is unsuitable for a thin layer coating type magnetic recording medium.

The magnitude of magnetic anisotropy in the shape anisotropy is expressed by $2\pi Is$ as mentioned above, and the coefficient is represented by $2\pi$ when the an aspect of magnetic powder (the particle length/the particle diameter) is not smaller than about 5. When the an aspect is smaller than 5, the coefficient rapidly becomes smaller. When the particle shape is spherical, the anisotropy thereof vanishes. In other words, in the state of the art, as long as a magnetic material such as a Fe metal, a Fe—Co alloy or the like is used as magnetic powder, the particle shape of the magnetic powder inevitably and theoretically results in the shape of needle.

As described above, a primer layer with a thickness of about 2.0 µm is formed on an non-magnetic support, and a magnetic layer with a thickness of about 0.15 to about 0.2 µm is formed on the primer layer, in order to improve the characteristics of recording/reproducing of signals with short wavelength. To further improve the recording density, preferably, a magnetic recording medium comprises at least one magnetic layer, and the uppermost magnetic layer (which will simply be referred to as "magnetic layer") has a thickness of 0.09 µm or less.

In the system of tracking servo signals on a magnetic layer, when the thickness of the upper magnetic layer is reduced, the magnetic servo signals become weak. The solutions for this problem are disclosed in JP-A-04-248120 (see the Examples), JP-A-2000-315312 and JP-A-2002-288817. In these methods, it is described that each of the magnetic recording media has a structure comprising an upper magnetic layer, a non-magnetic intermediate layer, a lower magnetic layer and a non-magnetic support, in which servo signals are also recorded on the lower magnetic layer.

Since these methods use, in the upper magnetic layers, needle-shape magnetic powders with particle sizes of about 100 nm in the major axial direction, some of the needle particles are arranged vertically to the surfaces of the media, as mentioned above. Therefore, the surface smoothness of the media is impaired, and noises are increased because of the roughness of the surfaces of the media. These problems become serious as the thickness of the magnetic layer becomes thinner.

Further, there remains a problem that the use of the needle-shape magnetic powder increases the fluctuation of the thickness of the upper magnetic layer, particularly when the upper magnetic layer is formed with a thickness of as thin as 0.09 µm or less.

Therefore, it is necessary to use magnetic powder comprising substantially spherical or ellipsoidal particles with a particle diameter of 50 nm or less (preferably 30 nm or less) in order to form an upper magnetic layer with a thickness of 0.09 µm or less and to reduce the thickness fluctuation of the upper magnetic layer.

It is preferable to reduce the total thickness of a magnetic recording medium to 6 µm or less by adjusting the total of the thickness of a non-magnetic intermediate layer and the thickness of a lower magnetic layer to 1.4 µm or less, the thickness of a non-magnetic support to 4.0 µm or less, and the thickness of a backcoat layer to 0.5 µm or less. The total thickness of a magnetic recording medium is preferably 5 µm or less, more preferably 4.5 µm or less, still more preferably 4 µm or less. However, it is 2.5 µm or more in view of practical use.

To correctly trace tracks in correspondence with track pitches which have become narrower and narrower, it is necessary that the spacing dimensions between the tape edge and data tracks and between the servo track and data tracks should be kept constant, and thus the higher levels of the dimensional stability against temperature and humidity have been required.

SUMMARY OF THE INVENTION

An object of the present invention is to provide a magnetic tape, which can solve the above various problems and has a high recording density capable of corresponding to a recording capacity of 1 TB or more per one reel of tape.

According to the present invention, this object can be achieved by a magnetic recording medium comprising:

a non-magnetic support, at least one lower magnetic layer which contains magnetic powder and a binder resin and which is formed on one of the surfaces of the non-magnetic support with or without a non-magnetic primer layer between the non-magnetic support and the lower magnetic layer, at least one non-magnetic intermediate layer which contains non-magnetic powder and a binder resin and which is formed on the lower magnetic layer, at least one upper magnetic layer which contains magnetic powder and a binder resin and which is formed on the non-magnetic intermediate layer, and a back layer which is formed on the other surface of the non-magnetic support, characterized in that the magnetic powder contained in the uppermost magnetic layer of the upper magnetic layer is iron magnetic powder which comprises substantially spherical or ellipsoidal particles with a number-average particle diameter of 5 to 50 nm and an average axial ratio of 1 to 2, each of the particles containing iron, or containing iron as a main component and a transition element, and that the total thickness of the magnetic recording medium is 6 μm or less.

It is preferable that the thickness of the uppermost magnetic layer is 0.09 μm or less, to achieve highly dense magnetic recording. Needless to say, the substantially spherical or ellipsoidal particle type iron magnetic powder should have the above-specified number-average particle diameter and should be used to form the upper magnetic layer with the above-specified thickness or less.

A magnetic recording medium which uses the above-specified iron magnetic powder can easily obtain a high coercive force and high magnetic flux density, in spite of the use of the magnetic powder comprising substantially spherical or ellipsoidal ultra-fine particles. In this regard, the phrase "substantially spherical or ellipsoidal" (or "substantially spherical or substantially ellipsoidal") referred to in the context of the present invention means that "spherical or ellipsoidal" particles may also contain some particles having unevenness on the surfaces thereof or slight deformations, as shown in the photograph on FIG. 5.

In addition, the magnetic recording medium which uses the above-specified substantially spherical or ellipsoidal particle type ultra-fine iron magnetic powder with a very small particle size shows small magnetic interaction between each of the particles, and therefore, quick magnetic inversion becomes possible, and the magnetic inversion region becomes narrower. Thus, it is found that this magnetic recording medium has superior recording characteristics to any of the existing magnetic recording media using conventional needle shape magnetic powder. The magnetic recording medium of the present invention shows its effect particularly when the thickness of the magnetic layer is so thin as 0.09 μm or less. In the magnetic recording medium having such a thin magnetic layer, the influence of demagnetization due to a diamagnetic field is lessened, and therefore, the magnetic recording medium can show excellent recording characteristics even if the coercive force is as small as about 80 kA/m (1005 Oe).

However, the coercive force of a magnetic recording medium is preferably 160 kA/m (2010 Oe) or more, more preferably 180 kA/m (2261 Oe) or more, still more preferably 200 kA/m (2512 Oe) or more, also in the present invention, in view of erroneous erasing of record caused by an external magnetic field from a magnet or the like. While the upper limit of the coercive force is not particularly set, it is 400 kA/m (5,024 Oe) or less in the present state of the art, in view of the writing ability of magnetic heads. In addition, when a magnetic layer with a thickness of 0.09 μm or less is used, a magnetic recording medium which has a coercive force as high as 200 to 400 kA/m can have excellent over write characteristics.

As the result of the present inventors' intensive researches of the formation of a thin non-magnetic intermediate layer and the dimensional stability against the changes of temperature and humidity, it is found that a non-magnetic intermediate layer which has an uniform thickness, an excellent surface smoothness and excellent dimensional stability to changes in temperature and humidity can be obtained by containing plate particles (hereinafter, in some cases, referred to as plate powder) with a number-average particle diameter of 10 to 100 nm in the non-magnetic intermediate layer.

MODES FOR CARRYING OUT THE INVENTION

Figure 1A:
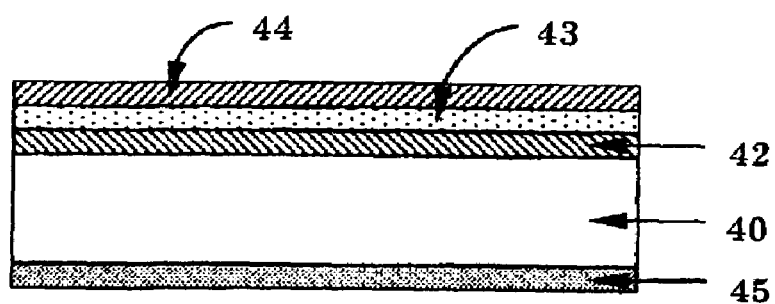
FIGS. 1(a) and 1(b) are sectional views of two typical examples of magnetic tapes according to the present invention.

Magnetic powder comprising a needle-shape iron-cobalt alloy powder, which is conventionally used in high density coating type magnetic recording media, has a theoretical limit in the value of coercive force, and also has a problem in the particle size, since it is very difficult to uniformly disperse the magnetic powder, when the particle size thereof becomes far smaller than that of the existing magnetic powders. However, the most difficult problem of the iron-cobalt alloy magnetic powder is that it is essentially impossible to obtain magnetic powder which can concurrently have a substantially spherical particle shape which minimizes the specific surface area of the powder, and have an uniaxial magnetic anisotropy which provides a magnetization easy axis in one direction, because the coercive force is induced by the shape magnetic anisotropy due to the particle shape of needle. Therefore, the smallest aspect ratio is limited to about 5. If this aspect ratio is below about 5, the uniaxial anisotropy of the powder lowers, resulting in a smaller coercive force.

The present inventors have synthesized a variety of magnetic powder in order to improve the magnetic characteristics, from the points of view different from the conventional magnetic powder on the shape magnetic anisotropy. As a result of the examination of the magnetic anisotropy of the obtained magnetic powder, they have found that a specific iron magnetic powder has a large crystalline magnetic anisotropy, and therefore is not needed to be formed into needle particles. It is therefore known that this magnetic powder, even if comprising substantially spherical or ellipsoidal particles, can show a large coercive force in a single direction. The substantially spherical or ellipsoidal magnetic particles referred to in the present invention mean magnetic particles having a ratio of the major axis to the minor axis of 2 or less (preferably 1.5 or less), and this shape of the particles is essentially different from the particle shapes of the conventional magnetic powder for use in magnetic recording media.

Examples of the substantially spherical or ellipsoidal magnetic powder are rare earth element-iron type magnetic powders such as rare earth element-iron-boron magnetic powder (JP-A-2001-181754), rare earth element-iron magnetic powder (JP-A-2002-56518), etc. As the rare earth element contained in such magnetic powders, at least one element selected from the group consisting of yttrium, ytterbium, cesium, praseodymium, samarium, lanthanum, europium, neodymium and terbium is used. Among them, neodymium (Nd), samarium (Sm), terbium (Tb) and/or yttrium (Y) are preferably used, since a high coercive force can be easily attained.

Although no rare earth element is contained, substantially spherical iron nitride magnetic powder comprising a $Fe_{16}N_2$ phase and having a BET specific surface area of at least 10 $m^2/g$ is known (JP-A-2000-277311). The present inventors improved such an iron nitride magnetic powder and obtained a rare earth element-iron nitride magnetic powder which is suitable for a high density recording magnetic recording medium according to the present invention.

The main point of the improvement is that the rare earth element, which has good effects on the prevention of sintering, the increase of a coercive force and the stability (corrosion resistance), is contained primarily in the outer layer of the particle of the magnetic powder, to form the chemically stable fine particle magnetic powder having a high coercive force of 200 kA/m or more and a BET specific surface area of 40 $m^2/g$ to 100 $m^2/g$ which is suitable for high density recording. When the rare earth metal is contained primarily in the outer layer of the particle of the magnetic powder, and the magnetic powder is stabilized by oxidization, the saturation magnetization of the magnetic powder is controlled in a range from 10 to 20 µWb/g, whereby the rare earth element-iron nitride magnetic powder has excellent dispersibility in a paint and oxidation stability. The above improvement can provide the magnetic powder which is particularly suitable as a magnetic powder to be contained in the uppermost magnetic layer. The rare earth element-iron nitride magnetic powder obtained in the above has a coercive force of 200 kA/m or more, consists of fine particles, and has good dispersibility and chemical stability in the preparation of a magnetic paint. Therefore, the rare earth element-iron nitride magnetic powder is more preferable as a magnetic powder to be contained in the uppermost magnetic layer according to the present invention than the rare earth element-iron-boron magnetic powder, the rare earth element-iron magnetic powder, and the iron nitride magnetic powder comprising mainly the $Fe_{16}N_2$ phase but no rare earth element.

As the result of further researches, the following has been found out: iron nitride magnetic powder having a coercive force of about 200 kA/m which is slightly smaller than that of the rare earth element-iron nitride magnetic powder can be prepared from iron magnetic powder comprising iron magnetic particles each of which has a core part containing a $Fe_{16}N_2$ phase as a main phase, by containing aluminum and/or silicon mainly in the outer layer portion of the magnetic particle. The content of aluminum and/or silicon is preferably 1 to 20 atomic %, more preferably 2 to 20 atomic %, still more preferably 4 to 18 atomic % based on the content of Fe. Also, in this case, it is preferable to contain a rare earth element together with aluminum and/or silicon.

When the substantially spherical or ellipsoidal rare earth element-iron or rare earth element-iron nitride magnetic powder (collectively, an iron type magnetic powder) is used in the coating type magnetic recording medium having a small thickness, in particular, a total thickness of less than 6 µm, the high coercive force and high saturation magnetic flux density of the upper magnetic layer, the uniform dispersion of the magnetic powder in the magnetic layer due to the increase of the dispersibility in the paint and the improvement of the oxidation stability are achieved at the same time. Thus, a high output and a high C/N are attained.

As described above, the iron type magnetic powder used in the present invention are roughly divided into a rare earth element-iron magnetic powder containing mainly metal iron or an iron alloy in the core part, and an iron nitride magnetic powder containing mainly an iron nitride phase, preferably the $Fe_{16}N_2$ phase in the core part. Each type magnetic powder will be explained.

Rare Earth Element-Iron Magnetic Powder Containing Mainly Metal Iron or an Iron Alloy in the Core Part A rare earth element-iron magnetic powder containing mainly metal iron or an iron alloy in the core part has the highest saturation magnetization, when the core part consists of an iron-cobalt alloy. The contents of iron and cobalt in the magnetic powder are preferably such that the atomic ratio of cobalt to iron is 3:97 to 40:60. Since the metal iron or the iron alloy has no shape anisotropy, a coercive force is low. When the magnetic powder contains 0.2 to 20 atomic % of a rare earth element based on the iron, the coercive force significantly increases. In particular, when the rare earth element is primarily contained in the outer layer part surrounding the core part, the coercive force is further increased.

Rare Earth Element-Iron Nitride Magnetic Powder Containing Mainly an Iron Nitride Phase in the Core Part When the outer layer of the particles of the rare earth element-iron nitride magnetic powder containing mainly an iron nitride phase in the core part is covered with 0.05 to 20 atomic %, preferably 0.2 to 20 atomic % of a rare earth element based on the iron, a chemically stable magnetic powder having a coercive force of 200 kA/m (2512 Oe) or more and a BET specific surface area of 40 to 100 $m^2/g$ can be obtained. The covering of the magnetic powder particles with the rare earth element and the stabilization by oxidization can control the saturation magnetization of the magnetic powder in a range of 10 to 20 µWb/g (79.6 to 159.2 $Am^2/kg$, 79.6 to 159.2 emu/g), and thus the rare earth element-iron nitride magnetic powder having the good dispersibility and oxidization stability in the paint is obtained. The core part of this magnetic part consists mainly of the $Fe_{16}N_2$ phase, or the $Fe_{16}N_2$ phase and the α-Fe phase, and the content of nitrogen atoms is 1.0 to 20 atomic % of the iron. A part of the iron (40 atomic % or less) may be replaced with other transition metal element. However, when a large amount of cobalt is added, the nitriding reaction takes a long time. Thus, the amount of cobalt is usually 10 atomic % or less. The rare earth element-iron type magnetic powder containing the iron nitride phase in the core part, that is, the rare earth element-iron nitride magnetic powder, is particularly suitable as a magnetic powder to be contained in the uppermost magnetic layer according to the present invention.

Aluminum and/or Silicon-Iron Nitride Magnetic Powder Containing an Iron Nitride Phase in a Core Part In case of iron type magnetic powder in which each of the magnetic particles has a core part comprising the $Fe_{16}N_2$ phase, the presence of aluminum and/or silicon mainly on the outer layer portion of the magnetic particle can provide iron nitride magnetic powder having a coercive force of about 200 kA/m which is slightly smaller than that of the rare earth element-iron nitride magnetic powder. The content of aluminum and/or silicon is preferably 1 to 20 atomic %, more preferably 2 to 20 atomic %, still more preferably 4 to 18 atomic %, based on the content of Fe. Also, in this case, it is preferable to contain the above specified amount of a rare earth element together with aluminum and/or silicon.

The present inventors have made researches on the particle size of the above iron type magnetic powder. As a result, they have found that an upper magnetic layer can achieve excellent magnetic characteristics when the average particle size of the magnetic powder is 5 to 50 nm. The conventional magnetic powder of the needle particle type is required to have an average major axial particle size of about 100 nm as the smallest, in order to maintain a high coercive force. On the other hand, the coercive force of the above magnetic powder according to the present invention is induced mainly by the crystal anisotropy, and therefore, the magnetic powder can comprise very fine particles with an average particle size of up to 5 nm, and each of such very fine particles can exhibit excellent magnetic characteristics. The average particle size is more preferably 8 nm or more, particularly 10 nm or more.

If the average particle size of the above magnetic powder is too large, the filling property, of the magnetic powder in the magnetic layer degrades, and also, the surface smoothness of the upper magnetic layer is impaired, if the layer is formed with a thin thickness. Furthermore, particle noise due to the size of the particles in the resultant magnetic recording medium becomes larger. Therefore, the average particle size of the magnetic powder should be 50 nm or less, preferably 40 nm or less, more preferably 30 nm or less. The magnetic powder with a particle size as selected above can have a very good filling property and thus can achieve excellent saturation magnetic flux density. It is particularly important that the average particle size of the magnetic powder is 50 nm or less, particularly 30 nm or less, when the thickness of the upper magnetic layer is 0.09 µm or less.

Herein, the average particle size of the magnetic powder is determined by actually measuring the particle sizes (the dimensions of the maximal portions of the respective particles) of 500 particles in a transmission electron microphotograph taken at a magnification of 250,000, and averaging the 500 particle sizes, or by actually measuring the particle sizes of 300 particles on a transmission electron microphotograph taken at a magnification of 200,000, and averaging the 300 particle sizes. The former method is employed in the present invention, unless otherwise specified.

In the above rare earth element-iron magnetic powder to be used in the present invention, when an iron alloy is used as an iron component, a transition metal such as Mn, Zn, Ni, Cu, Co or the like is used as the metal species in the iron alloy. Among these transition metals, Co and Ni are preferable, and Co is particularly preferable because Co can most effectively improve saturation magnetization. The amount of a transition metal as above is preferably 5 to 50 atomic %, more preferably 10 to 30 atomic % based on the amount of iron. However, in case of iron nitride magnetic powder, the amount of Co is preferably 10 atomic % or less.

The amount of the rare earth element in the rare earth element-iron-boron type magnetic powder is 0.2 to 20 atomic %, preferably 0.3 to 15 atomic %, more preferably 0.5 to 10 atomic %, based on the amount of the iron. The amount of the boron in the whole of the magnetic powder is 0.5 to 30 atomic %, preferably 1 to 25 atomic %, more preferably 2 to 20 atomic % based on the amount of the iron. These atomic percentages are determined by fluorescent X-ray analyses. The compounding of the above-specified amounts of the rare earth element and the boron enhances the bonds in the particle because of the magnetic interaction of magnetic anisotropies of the different species. As a result, a coercive force of 80 to 400 kA/m which is optimal for magnetic powder for use in a high performance magnetic recording medium can be obtained.

In case of rare earth element-iron-based magnetic powder, the amount of a rare earth element in the whole magnetic powder is preferably 0.2 to 20 atomic %, more preferably 0.5 to 15 atomic %, still more preferably 1.0 to 10 atomic %, based on the amount of iron.

In case of rare earth element-iron nitride magnetic powder, the amount of a rare earth element in the whole magnetic powder is preferably 0.05 to 20 atomic %, more preferably 0.2 to 20 atomic %, still more preferably 0.5 to 15 atomic %, far more preferably 1.0 to 10 atomic %, based on the amount of iron.

Next, the particle shape of the above iron type magnetic powder will be explained in view of the dispersibility in a magnetic paint and the properties for forming a thin magnetic layer.

In the conventional needle-shape magnetic powder, the particle size thereof is reduced so as to improve the recording characteristics such as reduction of noises. The specific surface area of the magnetic powder consequently increases, so that the interaction between the magnetic powder and a binder resin becomes strong, which makes it difficult to obtain a homogenous dispersion when the magnetic powder is dispersed in the binder resin. In addition, when the dispersion is diluted with a large amount of an organic solvent so as to form a thin coating layer, the magnetic powder tends to agglomerate, so that the orientation of the magnetic powder particles and the surface smoothness of the resultant coating layer degrade. From this point of view, there is a limit in the particle size of magnetic powder usable in a coating type magnetic recording medium.

By contrast, the above iron type magnetic powder to be used in the present invention has a particle shape of substantially sphere or ellipsoid, and therefore, it is possible for particles to have the substantially spherical shape which minimizes the specific surface area. Therefore, the interaction between the magnetic powder and a binder resin decreases, as compared with the conventional magnetic powder, which leads to an improved flowability of a magnetic paint. Accordingly, the dispersion of the magnetic powder, even if having some agglomeration of the magnetic powder, becomes easy. Thus, this magnetic powder can be used to prepare a magnetic paint particularly suitable for forming a magnetic layer by applying the paint with a thin thickness. As a result, there can be provided magnetic powder with a particle size of so small as about 5 nm which is sufficient for practical use in a magnetic recording medium.

On the other hand, to suppress the influence of a decrease in output due to demagnetization in the course of recording and reproducing, which is the essential problem of the lengthwise recording, it is effective to decrease the thickness of the upper magnetic layer. However, there is a limit in the thickness of the upper magnetic layer, as long as magnetic powder of needle particle type with a major axial particle size of about 100 nm is used. The reason therefor may be as follows. The needle particles of magnetic powder are generally arranged so that the needle-pointed direction can be in parallel to the in-plane direction of a recording medium due to the orientation under a magnetic field. However, this magnetic orientation has a distribution, so that some of the particles are so distributed that their needle-pointed direction is perpendicular to the surface of the medium. Such needle particles project from the surface of the upper magnetic layer to impair the surface smoothness of the medium and to remarkably increase the noises. This problem becomes more and more serious, as the thickness of the upper magnetic layer becomes thinner and thinner. Therefore, in the state of the art, it is hard to form an upper magnetic layer having a thickness of about 0.1 μm and also having a smooth surface, as long as the needle shape magnetic powder is used.

In case where a non-magnetic intermediate layer is formed between an upper magnetic layer and a lower magnetic layer so as to form the upper magnetic layer with a thinner thickness, and where the concurrent superposing type coating method in which a magnetic paint containing the needle shape magnetic powder is applied on the non-magnetic intermediate layer in a wet state is employed, the magnetic powder is drawn into the non-magnetic intermediate layer, so that the needle magnetic particles of the magnetic powder tend to project into the non-magnetic intermediate layer at the interface on the side of the upper magnetic layer to thereby further disturb the orientation of the upper magnetic layer. Therefore, a desired squareness ratio cannot be obtained, and also, the smoothness of the surface of the upper magnetic layer tends to degrade. It is considered that this problem may constitute one of factors to make it difficult for a thin magnetic layer containing the needle shape magnetic powder to achieve a high density.

By contrast, the iron type magnetic powder to be used in the present invention has not only a smaller particle size but also a particle shape of substantially sphere or ellipsoid which can take a shape close to sphere. Therefore, the magnetic particles of this magnetic powder do not project from the surface of the upper magnetic layer, nor project into a non-magnetic intermediate layer, if provided, unlike the needle shape magnetic powder. Thus, the resultant upper magnetic layer has very good surface smoothness. In the meantime, the output decreases as the thickness of the upper magnetic layer is reduced, because the magnetic flux from the upper magnetic layer lessens. However, the magnetic powder to be used in the present invention has a great advantage to overcome this problem, because the magnetic powder have a particle shape of substantially sphere or ellipsoid which can take a shape close to a sphere. Thus, the magnetic powder can be packed in the upper magnetic layer at a higher density as compared with the needle shape magnetic powder. As a result, the upper magnetic layer comprising this magnetic powder can achieve a higher magnetic flux density.

Next, the saturation magnetization of the magnetic powder will be described. Magnetic powder of a metal or an alloy generally tends to have a larger specific surface area, as the particle size thereof becomes smaller. Accordingly, the ratio of the oxidized surface of the layer which does not contribute to saturation magnetization increases, while the magnetic portion which contributes to the saturation magnetization decreases. In other words, as the particle size of the magnetic powder becomes smaller, saturation magnetization becomes smaller. This tendency is especially remarkable in the needle shape magnetic powder, in which the saturation magnetization abruptly decreases when the major axis of the needle particle is around 100 nm. Such a decrease in saturation magnetization is one of the factors to determine the limit of the usable particle size.

By contrast, the iron-based magnetic powder used in the present invention has a particle shape of substantially sphere or ellipsoid. Therefore, the specific surface area of this magnetic powder is the smallest, compared with other magnetic powders having the same volumes. Therefore, this magnetic powder can maintain high saturation magnetization, although it comprises very fine particles.

Figure 5:
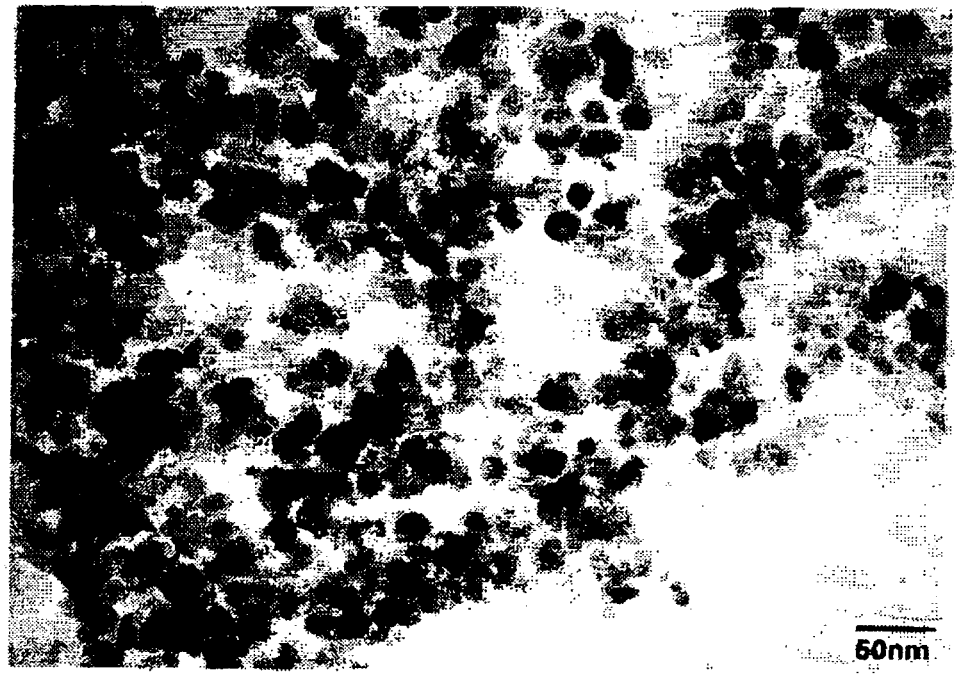
FIG. 5 is a transmission electron microphotograph of the yttrium-iron nitride magnetic powder prepared in Example 1 (the magnification: 200,000).

In the present invention, the particle shape of the iron type magnetic powder is expressed by "substantially sphere or ellipsoid". This expression means that the shapes of the particles of the magnetic powder include all the shapes from a substantially spherical shape to an ellipsoidal shape (including all intermediate shapes between the spherical shape and the ellipsoidal shape), and the particle shape of the magnetic powder of the present invention may be any one selected therefrom. In other words, this expression is used to exclude the conventional "needle shape" magnetic powder. Among the above particle shapes, the spherical particles which minimize the specific surface area of the magnetic powder, or ellipsoidal particles are preferable. These particle shapes can be observed with a scanning type electronic microscope, as well as the particle size. In this regard, the "substantially spherical or ellipsoidal shape" referred to in the context of the present invention includes "the spherical or ellipsoidal shapes" which have unevenness on the surfaces thereof or slight deformation, as seen in the photograph of FIG. 5.

As described above, the above iron type magnetic powder comprising substantially spherical or ellipsoidal particles used in the present invention is essentially suitable for obtaining a thin upper magnetic layer, in all the terms of saturation magnetization, coercive force, particle size, and particle shape. When this magnetic powder is used to make a magnetic recording medium having an upper magnetic layer with an average thickness of 0.09 μm or less, excellent recording/reproducing characteristics can be obtained. It is preferable to use magnetic powder having saturation magnetization of 10 to 25 μWb/g (79.6 to 199.0 Am$^2$/kg), preferably 10 to 20 μWb/g (79.6 to 159.2 Am$^2$/kg), in order to improve the characteristics in the high recording density region of a magnetic recording medium comprising an upper magnetic layer with an average thickness of 0.09 μm or less.

In the context of the present specification, the coercive force and the saturation magnetization of magnetic powder are values which are determined by measuring the coercive force and the saturation magnetization of magnetic powder with a sample-vibration type magnetometer at 25° C. with applying a magnetic field of 1,274 kA/m (16 kOE), and correcting the measured values based on a reference sample.

It is preferable to prepare a magnetic paint by the following steps, in order to densely pack and uniformly disperse ultra-fine magnetic powder with an average particle size of 50 nm or less in a coating layer. Prior to a kneading step, there is provided a step of surface-treating magnetic powder and mixing the same with a binder resin which is carried out by pulverizing the granular particles of magnetic powder with a pulverizer, and mixing the particles with an organic acid based on a phosphoric acid, and the binder resin in a mixer. In the kneading step, the above mixture is kneaded with a continuous twin-screw kneading machine with the solid content being 80 to 85 wt. %, and the proportion of the binder resin being 17 to 30 wt. % based on the weight of the magnetic powder. In a step after the kneading step, the knead-mixture is kneaded and diluted by at least once adding a binder resin solution and/or a solvent, and kneading and diluting the mixture with a continuous twin-screw kneading machine or other diluting machine. The resultant paint is dispersed in a minute media-rotation type dispersing machine such as a sand mill.

The product of the residual magnetic flux density and the thickness of the upper magnetic layer (the data-recording layer) in the tape lengthwise direction is preferably 0.0018 to 0.05 μTm, more preferably 0.0036 to 0.05 μTm, still more preferably 0.004 to 0.05 μTm. When this product is less than 0.0018 μTm, the reproducing output with the MR head is small. On the other hand, when this product exceeds 0.05 μTm, the reproducing output with the MR head tends to skew. A magnetic recording medium having such a specified magnetic layer is preferable for the following reasons: the recording wavelength can be shortened; the reproducing output with the MR head can be increased; and the skew of the reproducing output can be suppressed to increase the ratio of output to noises.

The non-magnetic intermediate layer is provided between the upper magnetic layer as the above data-recording layer and the lower magnetic layer as the servo signal-recording layer. This non-magnetic intermediate layer is provided in order that data signals on the upper magnetic layer may not be disturbed by the data signals which have been magnetically recorded on the lower magnetic layer as well as on the upper magnetic layer. A simulation was conducted under the following conditions: the thickness of an upper magnetic layer: 0.09 µm, the coercive force of the upper magnetic layer: 200 kA/m, the coercive force of a lower magnetic layer: 200 kA/m, and the longest wavelength of a data signal: 0.2 µm. As a result, it is made clear that the data signal on the upper magnetic layer is not disturbed by the data signal magnetically recorded on the lower magnetic layer, because the data signal cannot be recorded on the lower magnetic layer, when the thickness of the non-magnetic intermediate layer is 0.2 µm or more. Further, it is also made clear that, when the thickness of the non-magnetic intermediate layer is 0.2 µm or more, the lower magnetic layer has a low coercive force-component of about 80 kA/m, for which reason, if a data signal should be magnetically recorded on the lower magnetic layer, noise signals from the lower magnetic layer does not reach the MR head for reproducing the data signals, because of the spacing loss.

On the other hand, another simulation was conducted under the following conditions: the thickness of an upper magnetic layer: 0.06 µm, the coercive force of the upper magnetic layer: 200 kA/m, the coercive force of a lower magnetic layer: 200 kA/m, the thickness of the lower magnetic layer: 0.5 µm, and the shortest wavelength of a servo signal: 5 µm or less. As a result, it is made clear that, when the thickness of the non-magnetic intermediate layer is 0.5 µm or less, the servo signal is recorded at a saturated level also on the lower magnetic layer, and that the magnetic flux which enters the MR head for reproducing the servo signals becomes 3.2 dB higher (1.4 times higher) than the magnetic flux found when the servo signals are recorded only on the upper magnetic layer. On the side of the MR head, needless to say, a magnetic field to be applied to the MR head is controlled so as to obtain the same output. Also in this case, the skew of the signals from the MR head becomes smaller when a magnetic flux of a predetermined value or higher enters the MR head, so that the reading S/N ratio becomes higher.

When the thickness of the non-magnetic intermediate layer is 0.3 µm or less, the magnetic flux which enters the MR head for reproducing servo signals is 6.3 dB or higher (2.1 times higher).

From the results of the above simulations, it is seen that the thickness of the non-magnetic intermediate layer is preferably from 0.2 to 0.8 µm, more preferably from 0.6 µm or less, still more preferably from 0.5 µm or less.

The above simulations were conducted using a magnetic field-analyzing software JMAG (the finite element method) provided by NIHON SOGO KENKYUSHO K.K. Simulations described later were conducted by the same method.

Examples of non-magnetic powder to be used in the non-magnetic intermediate layer include titanium oxide, iron oxide, aluminum oxide, etc., and the use of iron oxide alone or a mixture of iron oxide and aluminum oxide is preferred. In general, the non-magnetic powder comprises non-magnetic iron oxide particles each having a major axis length of 0.05 to 0.2 µm and a minor axis length of 5 to 200 nm as a main component, and if necessary, carbon black having a particle diameter of 0.01 to 0.1 µm, and aluminum oxide having a particle diameter of 0.1 to 0.5 µm as auxiliary components. The non-magnetic particles and the carbon black have not so narrow particle distributions, and this defect is not so serious when the thickness of the non-magnetic intermediate layer is 1.0 µm or more. However, when the thickness of the non-magnetic intermediate layer is 0.9 µm or less, the particles on the larger particle diameter side of the particle distribution give an influence on the surface roughness of the non-magnetic intermediate layer. For this reason, it is difficult to form a thin non-magnetic intermediate layer with a thickness of 0.9 µm or less.

To overcome this problem, in the present invention, plate aluminum oxide particles with a number-average particle diameter of 10 to 100 nm are used. In this connection, plate iron oxide particles alone may be used, or the mixture of plate iron oxide particles and plate aluminum oxide particles may be used, as ultra-fine aluminum oxide particles which have a small particle distribution and is suitable for the non-magnetic intermediate layer. In order to impart electric conductivity, plate ITO particles may be mixed with the plate iron oxide particles and the plate aluminum oxide particles, although the plate ITO particles are expensive.

The plate aluminum oxide particles with a particle diameter of 10 to 100 nm to be used in the present invention have two major features. One is that, because of being ultrafine plate particles, fluctuation in the thickness of a coating layer with a thickness as thin as 0.9 µm or less is small, so that the smoothness of the surface of the coating layer does not degrade. The other is that a coating layer, in which the plate particles are laminated on one another, is formed, so that the coating layer is reinforced in the plane direction and is concurrently improved in dimensional stability against changes in temperature and humidity.

The lower magnetic layer is provided to record servo signals thereon. A typical coating structure is composed of a lamination of an upper magnetic layer (a data-recording layer), a non-magnetic intermediate layer, a lower magnetic layer, (a primer layer), and a non-magnetic support, as shown in FIG. 1.

A simulation was conducted under the following conditions: the thickness of an upper magnetic layer: 0.06 µm, the coercive force of the upper magnetic layer: 200 kA/m, the thickness of a non-magnetic intermediate layer: 0.5 µm, the coercive force of a lower magnetic layer: 200 kA/m, and the shortest wavelength of servo signals: 5 µm. As a result, it is made clear that, when the thickness of the lower magnetic layer is 1.0 µm or less, the servo signals are recorded at a saturated level also on the lower magnetic layer, and that, when the thickness of the lower magnetic layer is 0.3 µm or more, the magnetic flux which enters the MR head for reproducing the servo signals becomes 0.5 dB higher (1.1 times higher) than the magnetic flux found when the servo signals are recorded only on the upper magnetic layer. On the side of the MR head, needless to say, a magnetic field to be applied to the MR head is controlled so as to obtain the same output. Also in this case, the skew of signals from the MR head becomes smaller when a magnetic flux of a predetermined value or more enters the MR head, so that the reading S/N ratio becomes higher.

The magnetic flux which enters the MR head for reproducing servo signals is 4.1 dB or higher (1.6 times higher), when the thickness of the lower magnetic layer is 0.6 µm.

The output of the servo signal is 5.6 dB or higher (1.9 times higher), when the thickness of the lower magnetic layer is 0.8 μm. The output of the servo signal is 6.7 dB or higher (2.2 times higher), when the thickness of the lower magnetic layer is 1.0 μm. When the thickness of the lower magnetic layer is 1.0 μm or more, the above effect is saturated, and also, it becomes hard to saturation-record servo signals.

From the results of the above simulations, it is seen that the thickness of the lower magnetic layer is preferably from 0.3 to 1.0 μm, more preferably 0.8 μm or less, particularly preferably 0.6 μm or less, in order to decrease the total thickness of a magnetic recording medium.

Next, the components constituting the magnetic recording medium of the present invention will be explained in detail.

<Substantially Spherical or Ellipsoidal Rare Iron Type Magnetic Powder>

Rare Earth Element-Iron Nitride Magnetic Powder Containing an Iron Nitride Phase in a Core Part The substantially spherical or ellipsoidal iron type magnetic powder is used in the upper magnetic layer.

A preferred embodiment of a substantially spherical or ellipsoidal rare earth element-iron magnetic powder containing the rare earth element mainly in the outer layer of magnetic powder particles, in which the core comprises the iron compound selected from $Fe_{16}N_2$ and $Fe_{16}N_2$ a part of iron atoms of which are replaced with other transition metal, will be explained.

The rare earth element-iron nitride magnetic powder of the present invention comprises substantially spherical or ellipsoidal magnetic powder particles in which the rare earth element is present mainly in the outer layer of the magnetic powder particles. Preferably, such a magnetic powder has an average particle size of 5 to 50 nm, more preferably 8 nm or more, particularly preferably 10 nm or more, and preferably of 40 nm or less, more preferably 30 nm or less. An average axis (an averaged ratio of a longer axis length (diameter) to a shorter axis length (diameter)) of 2 or less, particularly 1.5 or less. The content of the rare earth element is preferably from 0.05 to 20 atomic %, preferably 0.2 to 20 atomic %, based on the ion atoms in the magnetic powder. The content of nitrogen is preferably 1.0 to 20 atomic % based on the ion atoms in the magnetic powder. A BET specific surface area of the particles is preferably from 40 to 100 m²/g.

The above rare earth element-iron nitride magnetic powder can be produced by supplying an oxide or hydroxide of iron as a raw material, coating the particles of the oxide or hydroxide of iron with the rare earth element, reducing them by heating, and then nitriding iron at a temperature lower than the reducing temperature.

In the rare earth element-iron nitride magnetic powder of the present invention, a content of the rare earth element is preferably from 0.05 to 20 atomic %, more preferably from 0.2 to 20 atomic %, particularly preferably from 0.5 to 15 atomic %, most preferably from 1.0 to 10 atomic %, based on the amount of iron. The content of nitrogen is preferably from 1.0 to 20 atomic %, more preferably from 1.0 to 12.5 atomic %, particularly preferably from 3 to 12.5 atomic %, based on the amount of iron.

When the content of the rare earth element is too small, the contribution of the rare earth element to the magnetic anisotropy decreases, and large magnetic powder particles tend to form because of sintering in the reducing process so that a particle size distribution may deteriorate. When the content of the rare earth element is too large, the amount of unreacted rare earth element, which does not contribute to the magnetic anisotropy, increases so that the magnetic properties, in particular, the saturation magnetization tend to excessively deteriorate.

When the content of nitrogen is too small, the amount of the $Fe_{16}N_2$ phase decreases so that the coercive force is not increased. When the content of the nitrogen is too large, iron nitrides having a smaller coercive force such as $Fe_4N$, $Fe_3N$, etc. and non-magnetic nitride tend to be formed so that the coercive force is not increased and further the saturation magnetization tends to excessively decrease.

The shape of the rare earth element-iron nitride magnetic powder of the present invention is substantial sphere or ellipsoid having an acicular ratio of 2 or less, in particular, a substantial sphere having an acicular ratio of 1.5 or less. The rare earth element-iron nitride magnetic powder of the present invention preferably has an average particle size of 5 to 50 nm, more preferably 8 nm or less, particularly preferably 10 nm or less, and preferably of 40 nm or less, more preferably 30 nm or less. When the particle size is too small, the dispersibility of the magnetic powder tends to deteriorate in the preparation of a magnetic paint. Furthermore, the magnetic powder may become thermally unstable, and the coercive force may change over time. When the particle size is too large, it may increase the noise and also the magnetic layer may not have a smooth surface.

The particle size of the rare earth element-iron nitride magnetic powder is determined by measuring the particle sizes of 300 particles in the transmission electron microphotograph taken at a magnification of 200,000 times and averaging the measured particle sizes.

The saturation magnetization of the rare earth element-iron nitride magnetic powder of the present invention is preferably 80 to 160 Am²/kg (80 to 160 emu/g or 10 to 20 μWb/g), more preferably 90 to 155 Am²/kg (90 to 155 emu/g or 11.3 to 19.5 μWb/g), particularly preferably 100 to 145 Am²/kg (100 to 145 emu/g or 12.6 to 18.2 μWb/g). A coercive force is preferably 80 to 400 kA/m (1005 to 5024 Oe), more preferably at least 119.4 kA/m (1500 Oe), more preferably at least 159.2 kA/m (2000 Oe), particularly preferably at least 180 kA/m (2261 Oe), most preferably at least 200 kA/m, (2512 Oe) while it is preferably 318.5 kA/m (4000 Oe) or less, more preferably 278.6 kA/m (3500 Oe) or less.

The rare earth element-iron magnetic powder of the present invention preferably has a BET specific surface area of 40 to 100 m²/g. When the BET specific surface area is too small, the particle size becomes too large so that the magnetic recording medium comprising such a magnetic powder tend to have a high particle noise and the surface smoothness of the magnetic layer decreases so that the reproducing output tends to decrease. When the BET specific surface area is too large, it is difficult to prepare a uniformly dispersed magnetic paint due to the agglomeration of the magnetic powder particles. When such a magnetic powder is used to produce a magnetic recording medium, the orientation may decrease or the surface smoothness may deteriorate.

As described above, the rare earth element-iron nitride magnetic powder of the present invention has the excellent properties as the magnetic powder for magnetic recording media. In addition, this magnetic powder has good storage stability. Thus, when this magnetic powder or magnetic recording media comprising this magnetic powder is stored under high-temperature high-humidity conditions, it does not suffer from the deterioration of the magnetic properties. Therefore, this magnetic powder is suitable for use in magnetic recording media for high density recording.

In the case of the rare earth element-iron nitride magnetic powder, the presence of the rare earth element inside the magnetic powder particles is not excluded. In such a case, the magnetic powder particles have a multi-layer structure having an inner layer and an outer layer, and the rare earth element is primarily present in the outer layer near the surface of the particle. When the magnetic powder has such a structure, the iron phase of the inner layer (core part) usually comprises the $Fe_{16}N_2$ phase. However, it is not necessary for the inner layer to consist of the $Fe_{16}N_2$ phase, but the inner layer may comprise a mixture of the $Fe_{16}N_2$ phase and an $\alpha$-Fe phase. The latter is sometimes advantageous since a desired coercive force can be easily achieved by adjusting the ratio of the $Fe_{16}N_2$ phase to the $\alpha$-Fe phase.

The rare earth element may be yttrium, ytterbium, cesium, praseodymium, lanthanum, samarium, europium, neodymium, terbium, etc. Among them, yttrium, samarium or neodymium can greatly increase the coercive force and effectively serves to the maintenance of the particle shape in the reducing step. Thus at least one of yttrium, samarium and neodymium is preferably used.

Together with such a rare earth element, other element such as phosphorus, silicon, aluminum, carbon, calcium, magnesium, etc. may be contained in the magnetic powder. When at least one of silicon and aluminum, which effectively prevent sintering, is used in combination with the rare earth element, a high coercive force is attained.

As described above, the rare earth element-iron nitride magnetic powder may be produced using an oxide or hydroxide of iron such as hematite, magnetite, goethite, etc., as a raw material. The average particle size of the raw material is selected by taking into consideration the volume change of the particle in the reducing and nitriding steps, and usually from about 5 to 100 nm.

The rare earth element is adhered or deposited on the surface of the raw material particles. Usually, the raw material is dispersed in an aqueous solution of an alkali or an acid. Then, the salt of the rare earth element is dissolved in the solution and the hydroxide or hydrate of the rare earth element is precipitated and deposited on the raw material particles by a neutralization reaction, etc.

The amount of the rare earth element is usually from 0.05 to 20 atomic %, preferably from 0.2 to 20 atomic %, more preferably from 0.5 to 15 atomic %, particularly preferably from 1.0 to 10 atomic %, based on the iron atoms in the magnetic powder.

In addition to the rare earth element, a compound of silicon or aluminum which prevents the sintering of the particles is dissolved in a solvent and the raw material is dipped in the solution so that such an element can be deposited on the raw material particles together with the rare earth element. To effectively carry out the deposition of such an element, an additive such as a reducing agent, a pH-buffer, a particle size-controlling agent, etc. may be mixed in the solution. Silicon or aluminum may be deposited at the same time as or after the deposition of the rare earth element.

Then, the raw material particles on which the rare earth element and optionally other element are deposited are reduced by heating them in the atmosphere of a reducing gas. The kind of the reducing gas is not limited. Usually a hydrogen gas is used, but other reducing gas such as carbon monoxide may be used.

A reducing temperature is preferably from 300 to 600° C. When the reducing temperature is less than 300° C., the reducing reaction may not sufficiently proceed. When the reducing temperature exceeds 600° C., the particles tend to be sintered.

After the reduction of the particles, they are subjected to the nitriding treatment. Thereby, the rare earth element-iron nitride magnetic powder, rare earth element-aluminum-iron nitride magnetic powder, rare earth element-silicon-iron nitride magnetic powder or rare earth element-aluminum-silicon-iron nitride magnetic powder of the present invention is obtained. The nitriding treatment is preferably carried out with a gas containing ammonia. Apart from pure ammonia gas, a mixture of ammonia and a carrier gas (e.g. hydrogen gas, helium gas, nitrogen gas, argon gas, etc.) may be used. The nitrogen gas is preferable since it is inexpensive.

The nitriding temperature is preferably from about 100 to 300° C. When the nitriding temperature is too low, the particles are not sufficiently nitrided so that the coercive force may insufficiently be increased. When the nitriding temperature is too high, the particles are excessively nitrided so that the proportion of $Fe_4N$ and $Fe_3N$ phases increases and thus the coercive force may rather be decreased and the saturation magnetization tends to excessively decrease.

The nitriding conditions are selected so that the content of the nitrogen atoms is usually from 1.0 to 20 atomic %, preferably from 1.0 to 12.5 atomic %, more preferably from 3 to 12.5 atomic %, based on the amount of iron in the rare earth element-iron nitride magnetic powder. rare earth element-aluminum-iron nitride magnetic powder, rare earth element-silicon-iron nitride magnetic powder or rare earth element-aluminum-silicon-iron nitride magnetic powder obtained.

Aluminum and/or Silicon-Iron Nitride Magnetic powder Containing an Iron Nitride phase in a Core Part As for iron type magnetic powder containing a $Fe_{16}N_2$ phase as a main phase in a core part, it has been discovered that iron nitride magnetic powder having a coercive force of about 200 kA/m which is slightly smaller than that of the rare earth-iron nitride magnetic powder can be obtained by containing aluminum and/or silicon mainly in the outer layers of the magnetic particles. The content of aluminum and/or silicon is preferably 1 to 20 atomic %, more preferably 2 to 20 atomic %, still more preferably 4 to 18 atomic %, based on the content of Fe. At present, the coercive force of aluminum and/or silicon type iron-nitride magnetic powder containing no rare earth element is about 200 kA/m. However, there is a possibility for such magnetic powder to have a far higher coercive force in future, depending on further advanced researches. Other preferred modes are the same as the rare earth-iron nitride magnetic powder. Also, in this case, it is preferable that the magnetic particle contain a rare earth element together with aluminum and/or silicon.

Rare Earth-Iron-Boron Magnetic Powder Mainly Containing Metal Iron or an Iron Alloy in a Core Part Rare earth-iron-boron magnetic powder to be used in the present invention is prepared, for example, by the following method.

First, an aqueous solution which contains iron ions, and if necessary, ions of a transition metal such as Mn, Zn, Ni, Cu, Co or the like is mixed with an aqueous alkaline solution to form a co-precipitate of the iron and the above transition metal. As the raw materials for the iron ions and the transition metal ions, iron sulfate, iron nitrate or the like is used. Next, a salt of a rare earth element such as neodymium or samarium and a boron compound are added to the co-precipitate, and the mixture is heated at a temperature of 60 to 400° C. to form a boron-containing oxide of the rare earth and the iron (or, the iron and the above transition metal). Then, the excessive boron is removed, and the oxide is reduced by heating under an atmosphere of a hydrogen gas in the same manner as above, to obtain rare earth-iron-boron magnetic powder. This method is suitable for obtaining rare earth-iron-boron magnetic powder with a such structure that each of the magnetic particles comprises a core part mainly containing metal iron or an iron alloy of the above transition metal, and an outer layer mainly containing a rare earth-iron-boron compound. Also, in this method, the magnetic powder may contain other elements in order to improve the corrosion resistance, etc. In this case, the contents of the rare earth and boron in the whole magnetic powder are preferably 0.2 to 20 atomic % and 0.5 to 30 atomic %, based on the content of the iron, respectively.

Rare Earth Element-Iron Magnetic Powder Containing Metal Iron or an Iron Alloy in a Core Part An rare earth element-iron magnetic powder containing metal iron or an iron alloy in a core part can be prepared as follows:

The spherical or ellipsoidal particles of magnetite or cobalt ferrite are dispersed in an aqueous solution containing at least the ions of a rare earth element. Then, a solution of an alkali in a sufficient amount for converting the rare earth element ions to a hydroxide is added to the dispersion to form a layer of the hydroxide of the rare earth element on the magnetite or cobalt ferrite particles. Thereafter, the particles are recovered by filtration, dried and reduced by heating to obtain the desired magnetic powder. The kind of the spherical or ellipsoidal particles such as the magnetite or cobalt ferrite particles is not limited. For example, magnetite particles having a desired particle size can be prepared by adding an alkali to an aqueous solution of iron(II) ion dissolved therein to form iron(II) hydroxide and heating this hydroxide at a suitable temperature and pH. Cobalt ferrite particles having a desired particle size can be prepared by adding an alkali to an aqueous solution of cobalt(II) ion and iron(III) ion to form the hydroxide of cobalt(II) and iron (III), and heating this hydroxide at a suitable temperature and pH.

The hydroxide of the rare earth element is formed in the surface layer of magnetite or cobalt ferrite particles, and the particles are recovered by filtration, dried and then reduced by heating usually at a temperature of 400 to 800° C. The conditions of this heating for reduction are not limited. When the particles are heated in a reducing atmosphere at a suitable temperature, the desired magnetic powder is obtained. When the obtained magnetic powder is subjected to stabilization treatments, the magnetic powder has good reliability when it is used in the magnetic recording medium. In the case of the rare earth element-iron magnetic powder containing metal iron or the iron alloy mainly in the core part, the rare earth element is primarily present in the outer layer of the magnetic powder particles.

<Non-Magnetic Plate Particles>

The non-magnetic plate particles and a method for producing the same will be explained in detail by making reference to plate alumina by way of example.

Fine aluminum oxide particles having a particle diameter of 100 nm or less, good crystallinity and a narrow particle size distribution have been required, but any aluminum oxide particles which satisfy those properties have not been developed.

The present inventors now newly developed plate particles (fine particles) of aluminum oxide, etc., which satisfy the above properties. The inventors thought that if such plate particles were used in the primer layer of a magnetic tape, it would be possible to decrease the fluctuation of the thickness of the thinly coated primer layer, to improve the surface smoothness and the strength in the plane direction of the layer, and to increase the dimensional stability against the change of temperature and humidity.

Here, a method for producing newly developed plate particles, as mentioned above, will be described by making reference to aluminum oxide particles as an example.

To obtain aluminum oxide particles suitable for a non-magnetic intermediate layer and a primer layer, in the first step, an aqueous solution of aluminum salt is added to an aqueous alkaline solution, and the resultant hydroxide or hydrate of aluminum is subjected to a hydrothermal treatment by heating it at a temperature of 110 to 300° C. in the presence of water, so as to regulate the resultant particles to an intended shape and an intended particle diameter.

The problem of this step rests in the peculiar property of the hydroxide or hydrate of aluminum that the hydroxide or hydrate of aluminum can be dissolved both in an alkaline solution and an acidic solution, and forms its precipitate only at or around neutral pH. However, to obtain particles of a hydroxide or a hydrate of aluminum having an intended shape and an intended particle diameter through a hydrothermal reaction, it is needed to use an alkaline solution. The present inventors have intensively studied in order to overcome the problem of the peculiar property of the hydroxide or hydrate of aluminum which has a trade-off relationship. As a result, they have discovered that the intended reaction can proceed only at or around pH 10.

Next, in the second step, the above hydroxide or hydrate of aluminum is heated in an air. By doing so, there can be obtained aluminum oxide particles with good crystallinity which show an uniform particle diameter distribution and which is hardly sintered or agglomerated.

Thus, quite a novel conception for the production of aluminum oxide particles which comprises separate steps is provided: that is, a step for regulating the shape and particle diameter of the particles is carried out separately from a step for fully extracting the inherent physical properties of a material. Based on this novel conception, the present inventors have succeeded in the development of aluminum oxide plate particles with an average particle diameter of 10 to 100 nm which any of the conventional processes has never achieved. The term "plate-shaped" referred to herein means a shape having a plate ratio (the maximal diameter/the thickness) of exceeding 1. Preferably, this plate ratio is more than 2 and up to 100, more preferably 3 to 50, further preferably 5 to 30. If the plate ratio is 2 or less, some of the particles protrude from the surface of a coated layer when used in the non-magnetic intermediate layer and may deteriorate the surface smoothness of the upper magnetic layer. If it exceeds 100, some of the particles are crushed during the preparation of a paint by using the same.

This process comprising the separate steps as mentioned above can be applied not only to aluminum oxide particles but also to the particles of oxides or compounded oxides of rare earth elements such as cerium, elements such as zirconium, silicon, titanium, manganese, iron and the like, or their mixed crystals, which have a particle diameter (number-average particle diameter) of 5 to 100 nm.

<Non-Magnetic Support>

The thickness of a non-magnetic support is generally 2 to 5 μm, preferably 2 to 4.5 μm, more preferably 2 to 4 μm, which may vary in accordance with an end use. When the thickness of the non-magnetic support is less than 2 μm, it is difficult to form a film, and the strength of the resultant magnetic tape tends to lower. When the thickness of the non-magnetic support exceeds 4.5 μm, the total thickness of the magnetic tape increases to 6 μm or more so that the recording capacity per reel decreases.

The Young's modulus of the non-magnetic support in the lengthwise direction is preferably at least 9.8 GPa (1,000 kg/mm$^2$), more preferably at least 10.8 GPa (1,100 kg/mm$^2$). When the Young's modulus of the support is less than 9.8 GPa (1,000 kg/mm$^2$), the travelling feeding of the magnetic tape may become unstable. In case of a helical scan type magnetic tape, the ratio of the Young's modulus in the lengthwise direction (MD) to the Young's modulus in the widthwise direction (TD) is preferably 0.60 to 0.80, more preferably 0.65 to 0.75. When this ratio is less than 0.60 or when it exceeds 0.80, fluctuation in output from the region between the entrance to a track for a magnetic head and the exit from the track therefor (flatness) becomes larger, although any mechanism for this has not been clarified. The flatness becomes minimal when the MD/TD ratio is at or around 0.70. Further, in case of a linear recording type magnetic tape, the ratio of the Young's modulus in the lengthwise direction to the Young's modulus in the widthwise direction is preferably 0.70 to 1.30, although any reason therefor has not been known. Examples of a non-magnetic support satisfying the above requirements are a biaxial oriented film of aromatic polyamide, aromatic polyimide, and the like.

<Non-Magnetic Intermediate Layer>

The thickness of a non-magnetic intermediate layer is preferably from 0.2 to 0.8 μm, more preferably from 0.2 to 0.6 μm. When the thickness of the non-magnetic intermediate layer is less than 0.2 μm, data signals are recorded also on the lower magnetic layer, and thus, the ratio of C/N of data signals becomes poor. When the thickness of the non-magnetic intermediate layer exceeds 0.8 μm, servo signals cannot be recorded at a saturated level on the lower magnetic layer, or the magnetic flux cannot be emitted from signals recorded on the lower magnetic layer to an external, due to the spacing loss, and the total thickness of a magnetic recording medium is too thick so that the recording capacity per one reel of the magnetic tape decreases.

Preferably, the non-magnetic intermediate layer contains the above-mentioned non-magnetic plate particles with a particle diameter of 10 to 100 nm so as to ensure the uniformity in the thickness of the layer and the surface smoothness thereof, and to control the stiffness and the dimensional stability of the tape. As the components of the non-magnetic plate particles, not only aluminum oxide but also oxides or compounded oxides of rare earth elements such as cerium, and elements such as zirconium, silicon, titanium, manganese and iron are used. To improve the electric conductivity, plate-shaped ITO particles (indium-tin oxide) may be added. If necessary, the plate-shaped ITO particles are added in an amount of 15 to 95 wt. % based on the weight of all the inorganic powder in the non-magnetic intermediate layer. If necessary, carbon black may be added in order to improve the electrical conductivity. In this regard, carbon black with a particle diameter of 10 to 100 nm is preferable. Further, conventional oxide particles such as iron oxide, aluminum oxide and the like may be added. In this case, it is preferable to use particles as fine as possible. A binder resin used in the non-magnetic intermediate layer may be the same one as used in the magnetic layer.

To improve the surface smoothness of an upper magnetic layer, the plate particles with a particle diameter of 10 to 100 nm are added as a main component to the non-magnetic powder for the non-magnetic intermediate layer, and an electrically conductive primer layer which comprises conventional carbon black, granular non-magnetic powder and a binder resin is formed between the lower magnetic layer and the non-magnetic support. In this case, an oxide or a compounded oxide of aluminum, a rare earth element such as cerium, zirconium, silicon, titanium, manganese, iron or the like is preferably used in the non-magnetic powder for the non-magnetic intermediate layer, since ITO is expensive.

<Lower Magnetic Layer>

A conventional magnetic layer is formed as a lower magnetic layer on which magnetic signals with a relatively long wavelength such as servo signals are recorded. The thickness of the lower magnetic layer is preferably 0.2 to 1.0 μm, and more preferably 0.8 μm or less, still more preferably 0.6 μm or less, in order to reduce the total thickness of a magnetic recording medium. In view of practical use, the thickness of the lower magnetic layer is 0.3 μm or more. When the thickness of the lower magnetic layer is 0.2 μm or more, the servo signals recorded on the upper magnetic layer are intensified by the servo signals recorded on the lower magnetic layer. On the other hand, when the thickness of the lower magnetic layer is 1.0 μm or less, servo signals are readily recorded at a saturated level also on the lower magnetic layer.

The coercive force of the lower magnetic layer is preferably 120 to 400 kA/m, more preferably 140 to 320 kA/m. When the coercive force of the lower magnetic layer is less than 120 kA/m, data signals are also recorded on the lower magnetic layer, with the result that the ratio C/N of the data signal becomes poor. When it exceeds 400 kA/m, the recording with a magnetic head often becomes difficult. The coercive force of the lower magnetic layer is measured with a sample-vibration type magnetometer with applying an external magnetic field of 1.27 MA/m (16 kOe).

As magnetic powder to be added to the lower magnetic layer, conventional magnetic powder can be used. Preferably, ferromagnetic iron-based metal powder is used because of its high saturation magnetization. As a paint for this lower magnetic layer, a paint for use in other magnetic recording media may be used.

The average major axial length of the particles of the ferromagnetic iron-based metal powder to be preferably used is generally 0.1 to 0.2 μm. This is because a paint for use in other magnetic recording media may be used as a paint for the lower magnetic layer. The specific surface area of the ferromagnetic iron-based metal powder is usually 40 m$^2$/g or more., in view of the substitute use of a paint for other magnetic recording media.

<Primer Layer>

A primer layer may be provided between the non-magnetic support and the lower magnetic layer. The thickness of the primer layer is usually from 0.3 to 1.0 μm. When the thickness of the primer layer is 0.3 μm or more, the conductivity-improving effect is high and it is easy to form the primer layer. On the other hand, when it exceeds 1.0 μm, the resultant tape becomes thick as a whole.

The primer layer may contain carbon black (hereinafter sometimes referred to as CB) for the purpose of improving the conductivity, and may contain non-magnetic particles for the purpose of controlling the viscosity of a paint or the stiffness of tape. As the carbon black (or CB) and the non-magnetic particles to be used in the primer layer, the same ones as those used in the above-mentioned non-magnetic intermediate layer can be used.

As the carbon black (CB) to be added to the primer layer, acetylene black, furnace black, thermal black, etc. can be used. Carbon black with a particle diameter of 5 to 200 nm is usually used, and preferably, carbon black with a particle diameter of 10 to 100 nm is used. The amount of CB to be added varies depending on the particle diameter of CB, and it is usually 15 to 35 wt. %. Preferably, 15 to 35 wt. % of CB with a particle diameter of 15 to 80 nm is used. More preferably, 20 to 30 wt. % of CB with a particle diameter of 20 to 50 nm is used. The addition of the above specified amount of CB with the above specified particle diameter makes it possible to reduce the electric resistance.

In addition, as a binder resin to be used in the primer layer, the same ones as those used in the magnetic layer can be used.

<Lubricant>

Preferably, the non-magnetic intermediate layer and/or the primer layer contains 0.5 to 5.0 wt. % of a higher fatty acid and 0.2 to 3.0 wt. % of a higher fatty acid ester based on the total weight of the powder components (solids), which are contained in the magnetic layers (the upper magnetic layer and the lower magnetic layer), the non-magnetic intermediate layer and the primer layer, because the coefficient of friction of the magnetic tape against a head can be decreased. When the amount of the higher fatty acid is less than 0.5 wt. %, the effect to decrease the coefficient of friction is insufficient. When the amount of the higher fatty acid exceeds 5.0 wt. %, the primer layer may be plasticized and thus the toughness of the primer layer may be lost. When the amount of the higher fatty acid ester is less than 0.2 wt. %, the effect to decrease the coefficient of friction is insufficient. When the amount of the higher fatty acid ester exceeds 3.0 wt. %, the amount of the higher fatty acid ester which migrates to the magnetic layer becomes too large, so that the magnetic tape may stick to the head.

It is preferable to use a fatty acid having 10 or more carbon atoms. Such a fatty acid may be a linear or branched fatty acid, or an isomer thereof such as a cis form or trans form. However, a linear fatty acid is preferable because of its excellent lubricity. Examples of such a fatty acid include laurie acid, myristic acid, stearic acid, palmitic acid, behenic acid, oleic acid, linoleic acid, etc., among which myristic acid, stearic acid and palmitic acid are preferable. The amount of the fatty acid to be added to the magnetic layer is not particularly limited, since the fatty acid migrates between the non-magnetic intermediate layer, the primer layer and the magnetic layer. Thus, the sum of the fatty acids added to the magnetic layer, the non-magnetic intermediate layer and the primer layer is adjusted to the above-specified amount. When the fatty acid is added to the non-magnetic intermediate layer and the primer layer, the magnetic layer may not always contain the fatty acid.

The coefficient of friction of the traveling magnetic tape can be decreased, when the magnetic layer contains 0.5 to 3.0 wt. % of a fatty acid amide and 0.2 to 3.0 wt. % of a higher fatty acid ester, based on the weight of the magnetic powder. When the amount of the fatty acid amide is less than 0.5 wt. %, the direct contact of the head and the magnetic layer at their interface tends to occur, and the seizure-preventing effect is poor. When the amount of the fatty acid amide exceeds 3.0 wt. %, the fatty acid amide may bleed out and causes a defect such as dropout.

As the fatty acid amide, the amides of palmitic acid, stearic acid and the like can be used.

The addition of less than 0.2 wt. % of a higher fatty acid ester is insufficient to decrease the coefficient of friction, while the addition of 3.0 wt. % or more of a higher fatty acid ester gives an adverse influence such as adhesion of the magnetic tape to the head or the like.

The intermigration of the lubricant between the magnetic layer, the non-magnetic intermediate layer and the primer layer is not inhibited.

<Upper Magnetic Layer>

As mentioned above, the substantially spherical or ellipsoidal iron type magnetic powder is used in the upper magnetic layer. The thickness of the upper magnetic layer is preferably 0.09 µm or less, more preferably 0.06 µm. Practically, it is 0.01 µm or more. The coercive force of the upper magnetic layer is preferably at least 160 kA/m, more preferably at least 180 kA/m, still more preferably at least 200 kA/m. While there is no upper limit in coercive force, the practical upper limit of the coercive force is 400 kA/m, in view of the writing ability of a magnetic head, in the state-of-the art.

As a binder resin to be contained in the upper magnetic layer (the same in the lower magnetic layer, the non-magnetic intermediate layer and the primer layer) (hereinafter simply referred to as "binder"), the following can be used: a combination of a polyurethane resin with at least one resin selected from the group consisting of a vinyl chloride resin, a vinyl chloride-vinyl acetate copolymer (which may sometimes referred to as "copolymer"), a vinyl chloride-vinyl alcohol copolymer, a vinyl chloride-vinyl acetate-vinyl alcohol copolymer, a vinyl chloride-vinyl acetate-maleic anhydride copolymer, a vinyl chloride-hydroxyl group-containing alkyl acrylate copolymer, and cellulose resins such as nitrocellulose. Among them, a combination of a vinyl chloride-hydroxyl group-containing alkyl acrylate copolymer resin with a polyurethane resin is preferably used. Examples of the polyurethane resin include polyester-polyurethane, polyetherpolyurethane, polyetherpolyester-polyurethane, polycarbonatepolyurethane, polyesterpolycarbonatepolyurethane, etc.

Preferably, a binder such as a urethane resin which is a polymer having, as a functional group, —COOH, —SO$_3$M, —OSO$_3$M, —P=O(OM)$_3$, —O—P=O(OM)$_2$ [wherein M is a hydrogen atom, an alkali metal base or an amine salt], —OH, —NR$^1$R$^2$, —N$^+$R$^3$R$^4$R$^5$ [wherein R$^1$, R$^2$, R$^3$, R$^4$ and R$^4$ are, each independently the same or different, a hydrogen atom or a hydrocarbon group], or an epoxy group is used. The reason why such a binder is used is that the dispersibility of the magnetic powder, etc. is improved as mentioned above. When two or more resins are used in combination, it is preferable that the polarities of the functional groups of the resins are the same. In particular, the combination of resins both having —SO$_3$M groups is preferable.

Each of these binders is used in an amount of 7 to 50 parts by weight, preferably from 10 to 35 parts by weight, based on 100 parts by weight of the magnetic powder. In particular, the best combination as the binder is 5 to 30 parts by weight of a vinyl chloride-based resin and 2 to 20 parts by weight of a polyurethane resin.

It is preferable to use the binder in combination with a thermally curable crosslinking agent which bonds with the functional groups in the binder to crosslink the same. Preferable examples of the crosslinking agent include isocyanates such as tolylene diisocyanate, hexamethylene diisocyanate, and isophorone diisocyanate; and polyisocyanates such as reaction products of these isocyanates with compounds each having a plurality of hydroxyl groups such as trimethylolpropane, and condensation products of these isocyanates. The crosslinking agent is used usually in an amount of 1 to 30 parts by weight, preferably 5 to 20 parts by weight, based on 100 parts by weight of the binder. When the magnetic layer is applied on the non-magnetic intermediate layer and the primer layer by the wet on wet method, some of polyisocyanate is diffused and fed from paints for the non-magnetic intermediate layer and the primer layer. Therefore, the magnetic layer can be cross-linked to some degree, even if polyisocyanate is not used in combination.

The magnetic layer may contain the above-mentioned non-magnetic plate particles with a particle diameter of 10 to 100 nm. If needed, the magnetic layer may contain a conventional abrasive. Examples of such an abrasive include α-alumina, β-alumina, silicon carbonate, chrome oxide, cerium oxide, α-iron oxide, corundum, artificial diamond, silicon nitride, silicon carbonate, titanium carbide, titanium oxide, silicon dioxide, boron nitride, and the like. Each of these abrasives with Moh's hardness of 6 or more is used alone or in combination. In case of a thin magnetic layer with a thickness of 0.01 to 0.09 μm, the particle diameter (number-average particle diameter) of abrasive is preferably 10 to 150 nm. The amount of abrasive to be added is preferably 5 to 20 wt. %, more preferably 8 to 18 wt. % based on the weight of the magnetic powder.

The magnetic layer may further contain plate-shaped ITO particles which are prepared by the above-described method, and conventional carbon black (CB) in order to improve the conductivity and the surface lubricity. Examples of such carbon black include acetylene black, furnace black, thermal black and the like. The particle diameter thereof is preferably 10 to 100 nm. If the particle diameter is 10 nm or less, it becomes hard to disperse carbon black. If it is 100 nm or more, it is needed to add a large amount of carbon black. In either case, the surface of the magnetic layer becomes coarse, which leads to a decrease in output. The amount of carbon black to be added is preferably 0.2 to 5 wt. %, more preferably 0.5 to 4 wt. %, based on the weight of the magnetic powder.

<Backcoat Layer>

A backcoat layer, which is one example of the back layer, is explained.

To improve the tape-running performance, a backcoat layer may be formed on the other side of the above non-magnetic support composing the magnetic recording medium of the present invention (the side opposite to the side of the non-magnetic support on which the magnetic layer is formed). The thickness of the backcoat layer is preferably from 0.2 to 0.8 μm, more preferably 0.5 μm or less. When the thickness of the backcoat layer is less than 0.2 μm, the effect to improve the tape-running performance is insufficient. When the thickness of the backcoat layer exceeds 0.8 μm, the total thickness of the magnetic tape increases, so that the recording capacity per one reel of the tape decreases.

As carbon black (CB) to be contained in the backcoat layer, acetylene black, furnace black, thermal black or the like can be used. In general, carbon black with a small particle diameter and carbon black with a large particle diameter are used in combination. The particle diameter (number-average particle diameter) of small particle diameter carbon black is from 5 to 200 nm, preferably from 10 to 100 nm. When the particle diameter of small particle diameter carbon black is less than 10 nm, the dispersion thereof is difficult. When the particle diameter of small particle diameter carbon black exceeds 100 nm, a large amount of carbon black should be added. In either case, the surface of the backcoat layer becomes coarse and thus the surface roughness of the backcoat layer may be transferred to the reverse side of the magnetic layer (embossing).

When the large particle diameter carbon black having a particle diameter of 300 to 400 nm is used in an amount of 5 to 15 wt. % based on the weight of the small particle diameter carbon black, the surface of the backcoat is not roughened and the effect to improve the tape-running performance is increased. The total amount of the small particle diameter carbon black and the large particle diameter carbon black is preferably from 60 to 98 wt. %, more preferably from 70 to 95 wt. %, based on the weight of the inorganic powder in the backcoat layer. The average height Ra of the surface roughness of the backcoat layer is preferably from 3 to 8 nm, more preferably from 4 to 7 nm.

Further, the above non-magnetic plate particles having a particle diameter (number-average particle diameter) of 10 to 100 nm may be added to the backcoat layer in order to improve the strength. The components of the non-magnetic plate particle include not only aluminum oxide but also oxides or compounded oxides of rare earth elements such as cerium, and elements such as zirconium, silicon, titanium, manganese, iron and the like. Further, the ITO plate particles (indium tin oxide) prepared by the above method may be added to the backcoat layer in order to improve the conductivity of the magnetic tape. The plate ITO particles and the carbon black particles are added to the backcoat layer in a total amount of 60 to 98 wt. % based on the weight of the inorganic powder in the backcoat layer. The particle diameter of the carbon black particles is preferably 10 to 100 nm. If needed, iron oxide particles with a particle diameter of 0.1 to 0.6 μm may be added in an amount of 2 to 40 wt. %, preferably 5 to 30 wt. % based on the weight of all the inorganic powder in the backcoat layer.

As a binder resin to be contained in the backcoat layer, the same resins as the binder resins used in the magnetic layer and the primer layer can be used. Among those, the combination of a cellulose resin with a polyurethane resin is preferably used so as to decrease the coefficient of friction and to improve the tape-running performance.

The amount of the binder resin in the backcoat layer is usually from 40 to 150 parts by weight, preferably from 50 to 120 parts by weight, more preferably from 60 to 110 parts by weight, still more preferably from 70 to 110 parts by weight, based on 100 parts by weight of the total of the carbon black and the inorganic non-magnetic powder in the backcoat layer. When the amount of the binder resin is less than 50 parts by weight, the strength of the backcoat layer is insufficient. When the amount of the binder resin exceeds 120 parts by weight, the coefficient of friction tends to increase. Preferably, 30 to 70 parts by weight of a cellulose resin and 20 to 50 parts by weight of a polyurethane resin are used in combination. To cure the binder resin, a crosslinking agent such as a polyisocyanate compound is preferably used.

The crosslinking agent to be contained in the backcoat layer may be the same as those used in the magnetic layer and the primer layer. The amount of the crosslinking agent is usually from 10 to 50 parts by weight, preferably from 10 to 35 parts by weight, more preferably from 10 to 30 parts by weight, based on 100 parts by weight of the binder resin. When the amount of the crosslinking agent is less than 10 parts by weight, the film strength of the backcoat layer tends to decrease. When the amount of the crosslinking agent exceeds 35 parts by weight, the coefficient of dynamic friction of the backcoat layer against SUS increases.

<Organic Solvent>

Examples of organic solvents to be used in the paints for the magnetic layer, the primer layer and the backcoat layer include ketone solvents such as methyl ethyl ketone, cyclohexanone, methylisobutylketone, etc.; ether solvents such as tetrahydrofuran, dioxane, etc.; and acetate solvents such as ethyl acetate, butyl acetate, etc. Each of these solvents may be used alone or in combination, and such a solvent may be further mixed with toluene for use.

<Magnetic Tape>

Magnetic tape according to the present invention will be described.

FIG. 1(a) is a sectional view of one typical example of a magnetic tape (3) according to the present invention. The magnetic tape (3) of the present invention comprises a non-magnetic support (40); a lower magnetic layer (a servo signal layer) (42), a non-magnetic intermediate layer (43) and an upper magnetic layer (a data-recording layer) (44) which are formed in this order on one side of the non-magnetic support (40); and a back layer (45) formed on the other side of the non-magnetic support (40).

Figure 1B:
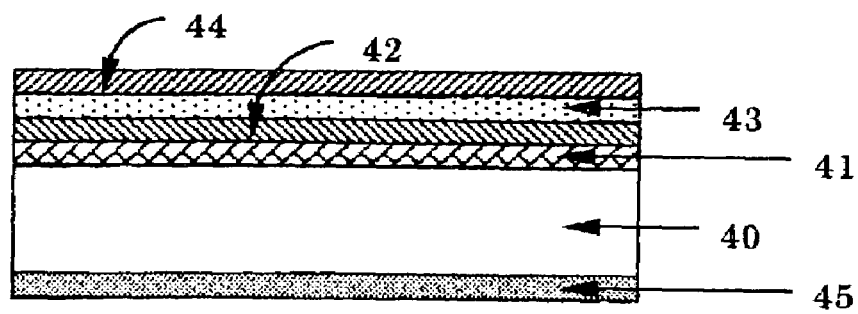

FIG. 1(b) is a sectional view of another typical example of magnetic tape (3) according to the present invention, in which a conductive primer layer (41) is provided in the magnetic tape shown in FIG. 1(a). The magnetic tape (3) of the present invention comprises a non-magnetic support (40); a conductive primer layer (41), a lower magnetic layer (a servo signal layer) (42), a non-magnetic intermediate layer (43) and an upper magnetic layer (a data-recording layer) (44) formed in this order on one side of the non-magnetic support (40); and a back layer (45) formed on the other side of the non-magnetic support (40).

<Magnetic Tape (Recording) Cartridge>

A magnetic tape cartridge comprising the magnetic tape of the present invention is explained.

Figure 2:
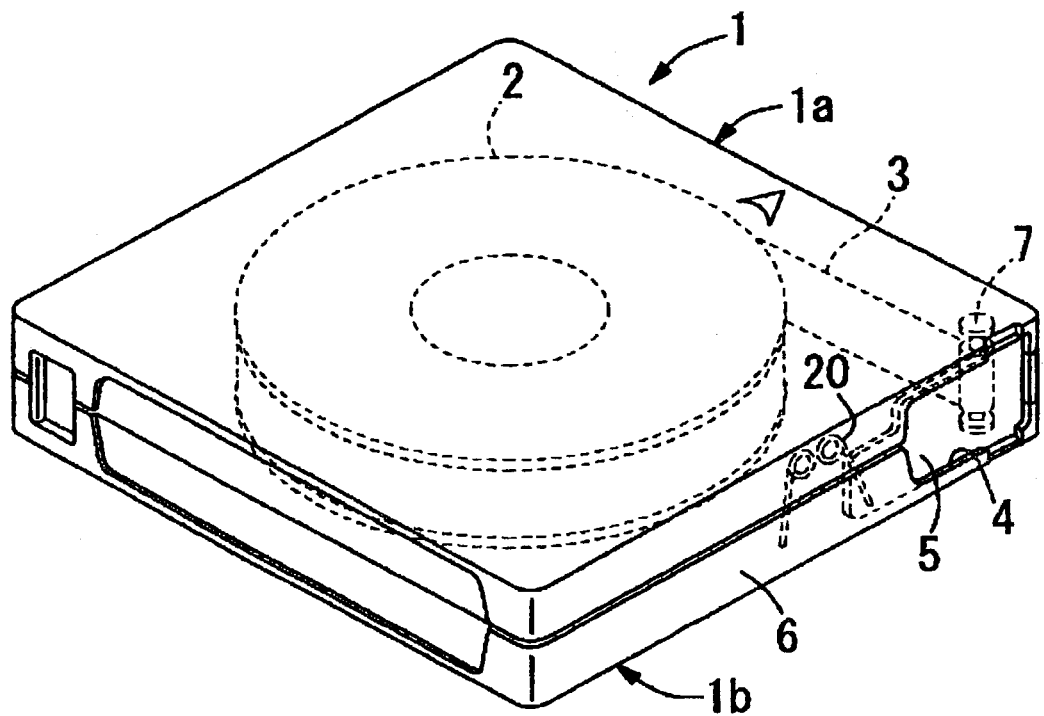
FIG. 2 is a perspective view of a magnetic tape cartridge according to the present invention, showing the generic structure thereof.
Figure 3:
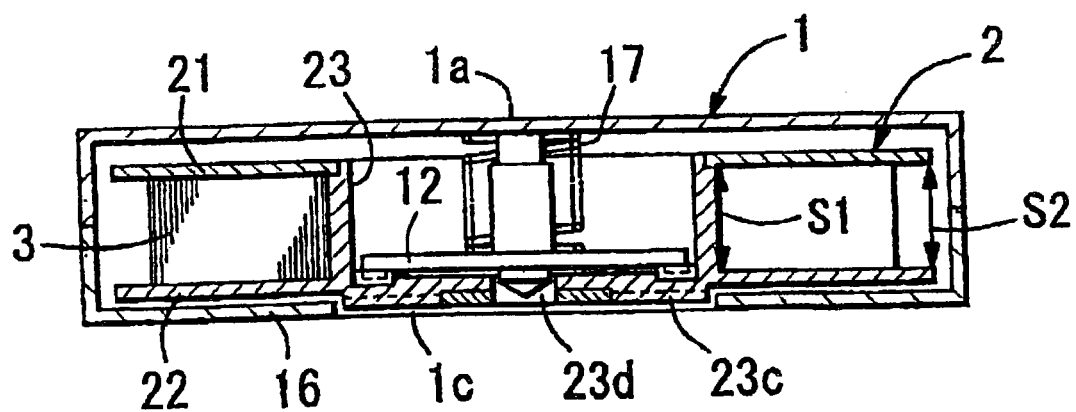
FIG. 3 is a sectional view of the magnetic tape cartridge shown in FIG. 2.

FIG. 1 shows a general structure of a magnetic tape cartridge, and FIG. 2 shows the inside structure of the cartridge of FIG. 1. As shown in FIG. 1, this computer tape comprises a box-shaped casing body (1) constructed by joining an upper casing section (1a) to a lower casing section (1b), and one reel (2) having the magnetic tape (3) wound thereon and arranged in the casing body (1). An outlet (4) for drawing out the magnetic tape from the cartridge is formed at one side of the front wall (6) of the casing body (1), and the outlet (4) is opened or closed by a slidable door (5). A tape-drawing member (7) is connected to an end portion for drawing out the magnetic tape (3) so as to draw out the magnetic tape (3) wound on the reel (2) from the casing for operation. Numeral 20 in FIG. 1 refers to a door spring for forcing the door (5) to freely close the outlet.

EXAMPLES

The present invention will be explained in detail by way of the following Examples, which do not limit the scope of the present invention in any way. In Examples and Comparative Examples, "parts" are "wt. parts", unless otherwise specified.

Example 1

<Synthesis of Ultrafine Magnetic Particles>

Rare earth-iron nitride magnetic powder was synthesized. A synthesis example of magnetic powder which uses yttrium as a rare earth element will be described below.

Iron (II) sulfate heptahydrate (0.419 mol) and iron (III) nitrate nonahydrate (0.974 mol) were dissolved in water (1,500 g). Separately, sodium hydroxide (3.76 mol) was dissolved in water (1,500 g). Then, the aqueous solution of sodium hydroxide was added to the aqueous solution of the above two iron salts, and the mixture was stirred for 20 minutes to form magnetite particles.

The magnetite particles were charged in an autoclave and heated at 200° C. for 4 hours. The magnetite particles were then subjected to a hydrothermal treatment and washed with water. The resultant magnetite particles were spherical or ellipsoidal particles with a particle size of 25 nm.

The magnetite particles (10 g) were dispersed in water (500 cc) for 30 minutes, using an ultrasonic dispersing machine. Yttrium nitrate (2.5 g) was added to and dissolved in the dispersion, and the solution was stirred for 30 minutes. Separately, sodium hydroxide (0.8 g) was dissolved in water (100 cc). This aqueous sodium hydroxide solution was added dropwise to the above dispersion in about 30 minutes. After the completion of the addition, the mixture was further stirred for one hour. By this treatment, the hydroxide of yttrium was coated and deposited on the surfaces of the magnetite particles. The magnetite particles were washed with water and filtered and dried at 90° C. to obtain powder which comprised the magnetite particles coated with the hydroxide of yttrium.

This magnetic powder was reduced by heating at 450° C. in a stream of a hydrogen gas for 2 hours to obtain yttrium-iron magnetic powder. Then, the magnetic powder was cooled to 150° C. in about one hour in the stream of a hydrogen gas. When the temperature of the magnetic powder had reached 150° C., the hydrogen gas was changed to an ammonia gas, and the magnetic powder was nitrided for 30 hours while being maintained at 150° C. Then, the magnetic powder was cooled from 1500 to 90° C. in the stream of an ammonia gas. When the temperature of the magnetic powder had reached 90° C., the ammonia gas was changed to a mixed gas of oxygen and nitrogen, and the magnetic powder was stabilized for 2 hours.

Then, the magnetic powder was cooled from 90° to 40° C. in the stream of the mixed gas, and was maintained at 40° C. for about 10 hours and exposed to an air.

Figure 4:
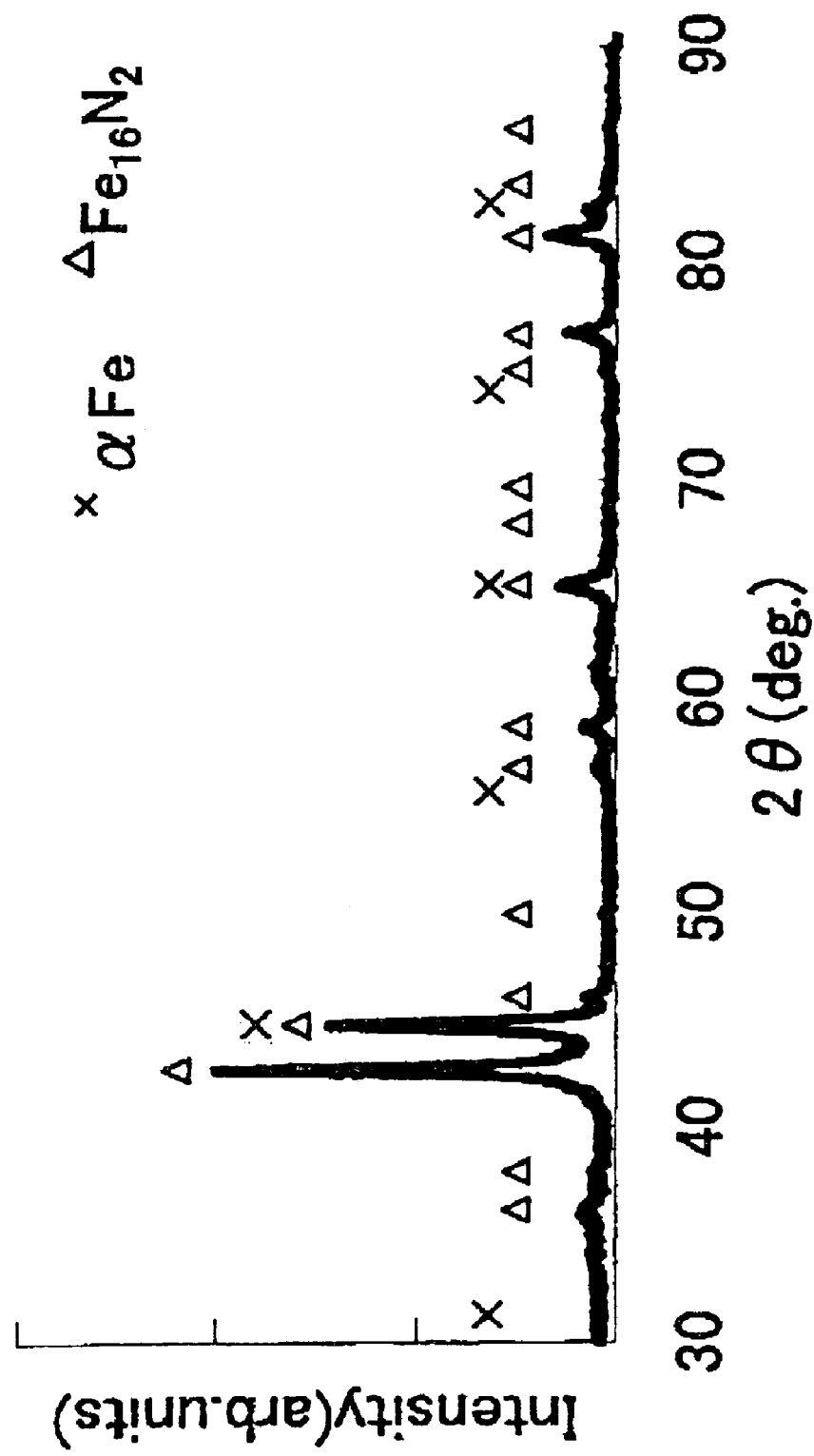
FIG. 4 is a graph showing the X-ray diffraction pattern of yttrium-iron nitride magnetic powder prepared in Example 1.

The contents of yttrium and nitrogen of the yttrium-iron nitride magnetic powder thus obtained were measured by a fluorescent X-ray analysis, and they were found to be 5.3 atomic % and 10.8 atomic %, respectively. Further, a profile showing a $Fe_{16}N_2$ phase was obtained from the X-ray diffraction pattern. FIG. 4 is a graph showing the X-ray diffraction pattern of this yttrium-iron nitride magnetic powder, from which a diffraction peak derived from $Fe_{16}N_2$ and a diffraction peak derived from α-Fe were observed. Thus, it was found that this yttrium-iron nitride magnetic powder comprised a mixed phase of a $Fe_{16}N_2$ phase and an α-Fe phase.

Further, the particle shapes of this magnetic powder were observed with a high resolution analysis transmission electron microscope, and they were found to be substantially spherical particles with an average particle size of 20 nm. FIG. 5 is a transmission electron microphotograph of this magnetic powder (magnification; 200,000). The specific surface area of this magnetic powder determined by the BET method was 53.2 $m^2$/g.

The saturation magnetization of this magnetic powder measured under the application of a magnetic field of 1,274 kA/m (16 kOe) was 135.2 $Am^2$/kg (135.2 emu/g), and the coercive force thereof was 226.9 kA/m (2,850 Oe). The saturation magnetization of this magnetic powder which had been stored for one week under an environment of 60° C. and 90% RH was measured in the same manner, and it was found to be 118.2 $Am^2$/kg (118.2 emu/g). Thus, the maintaining percentage of the saturation magnetization of the magnetic powder was 87.4%.

A magnetic paint described below was prepared from the rare earth-iron nitride magnetic powder thus obtained. In the preparation of the magnetic paint, the rare earth-iron nitride magnetic powder prepared by scaling up the procedure of this Example by 100 times was used.

<Synthesis of Plate Alumina Particles>

Sodium hydroxide (0.075 mol) was dissolved in water (90 ml) to prepare an aqueous alkaline solution. Separately from this alkaline solution, an aqueous aluminum chloride solution was prepared by dissolving aluminum (III) chloride heptahydrate (0.0074 mol) in water (40 ml). To the aqueous alkaline solution was added dropwise the aqueous aluminum chloride solution to form a precipitate containing aluminum hydroxide. To the precipitate was added dropwise hydrochloric acid so as to adjust pH to 10.2. A suspension of the precipitate was aged for 20 hours, and then was washed with water in an amount about 1,000 times larger than the amount of the precipitate.

Next, the supernatant was removed, and the pH of the residual suspension of the precipitate was adjusted to 10.0 with an aqueous sodium hydroxide solution. The suspension was charged in an autoclave and subjected to a hydrothermal treatment at 200° C. for 2 hours.

The resultant product was filtered and dried at 90° C. in an air. The dried product was slightly crushed in a mortar and treated by heating at 600° C. in an air for one hour. Thus, aluminum oxide particles were obtained. After the heat treatment, the aluminum oxide particles were washed with water, using an ultrasonic dispersing machine, so as to remove the non-reacted product and the residues. Then, the particles were filtered and dried.

The resultant aluminum oxide (or alumina) particles were subjected to an X-ray diffraction spectral analysis. As a result, a spectrum corresponding to γ-alumina was observed. Further, the shapes of the particles were observed with a transmission electron microscope. As a result, they were found to be square plate particles having particle diameters of 30 to 50 nm (the plate aspect ratio: 5 to 10).

The resultant aluminum oxide particles were further treated by heating at 1,250° C. in an air for one hour. The resultant aluminum oxide particles were subjected to an X-ray diffraction spectral analysis. As a result, a spectrum corresponding to α-alumina was observed. Further, the shapes of the particles were observed with a transmission electron microscope. As a result, they were found to be square plate particles having particle diameters of 40 to 60 nm.

<Synthesis of Plate ITO Particles>

Sodium hydroxide (0.75 mol) was dissolved in water (180 ml) to prepare an aqueous alkaline solution. Separately from this alkaline solution, an aqueous solution of tin chloride and indium chloride was prepared by dissolving indium (III) chloride tetrahydrate (0.067 mol) and tin (IV) chloride pentahydrate (0.007 mol) in water (400 ml). To the former aqueous alkaline solution was added dropwise the latter aqueous solution of tin chloride and indium chloride to form a precipitate of a hydroxide or a hydrate comprising tin and indium. The pH of the precipitate was 10.2. A suspension of the precipitate was aged at room temperature for 20 hours, and then washed with water until the pH of the suspension reached 7.6.

Next, to the suspension of the precipitate was added an aqueous sodium hydroxide solution to adjust pH to 10.8, and the suspension was charged in an autoclave and subjected to a hydrothermal treatment at 200° C. for 2 hours.

The resultant product was washed with water until its pH reached 7.8, and filtered and dried at 90° C. in an air. The dried product was slightly crushed in a mortar and treated by heating at 600° C. in an air for one hour. Thus, particles of tin-containing indium oxide were obtained. After the heat treatment, the tin-containing indium oxide particles were washed with water, using an ultrasonic dispersing machine, so as to remove the non-reacted product and the residues. Then, the particles were filtered and dried.

The shapes of the resultant tin-containing indium oxide particles were observed with a transmission electron microscope. As a result, they were found to be disc or square plate particles with particle diameters of 30 to 50 nm (the plate aspect ratio: 5 to 10).

The tin-containing indium oxide particles were subjected to an X-ray diffraction spectral analysis. As a result, the X-ray diffraction spectrum indicated that the particles were composed of a substance having a single structure, and that the particles were formed of the tin-containing indium oxide in which indium was substituted with tin.

<Synthesis of Plate Iron Oxide Particles>

Sodium hydroxide (0.75 mol) was dissolved in water (180 ml) to prepare an aqueous alkaline solution. Separately from this alkaline solution, an aqueous ferric chloride solution was prepared by dissolving ferric (III) chloride hexahydrate (0.074 mol) in water (400 ml). To the former aqueous alkaline solution was added dropwise the latter aqueous ferric chloride solution to form a precipitate containing ferric hydroxide which had a pH of 11.3. A suspension of the precipitate was aged for 20 hours and washed with water until its pH reached 7.5.

Next, the supernatant was removed, and the suspension of the precipitate was charged in an autoclave and subjected to a hydrothermal treatment at 150° C. for 2 hours.

The resultant product was filtered and dried at 90° C. in an air. The dried product was slightly crushed in a mortar and treated by heating at 600° C. in an air for one hour to obtain alpha iron oxide particles. After the heat treatment, the particles were washed with water, filtered and dried, using an ultrasonic dispersing machine, so as to remove the non-reacted product and the residues.

The resultant alpha iron oxide particles were subjected to an X-ray diffraction spectral analysis. As a result, a spectrum corresponding to an alpha hematite structure was clearly observed. Further, the shapes of the particles were observed with a transmission electron microscope. As a result, they were found to be hexagonal plate particles with particle diameters of 40 to 60 nm (the plate aspect ratio: 5 to 10).

| <Fabrication of Magnetic Tape> | |
|---|---|
| <Components of Paint A for Primer Layer> (1) | |
| Plate alumina particles (average particle diameter: 50 nm) | 10 parts |
| Plate ITO particles (average particle diameter: 40 nm) | 90 parts |
| Stearic acid | 2.0 parts |
| Vinyl chloride-hydroxypropyl acrylate copolymer ($-SO_3Na$ group content: $0.7 \times 10^{-4}$ eq./g) | 8.8 parts |
| Polyester-polyurethane resin (Tg: 40° C., $-SO_3Na$ group content: $1 \times 10^{-4}$ eq./g) | 4.4 parts |
| Cyclohexanone | 25 parts |

<Fabrication of Magnetic Tape>

| | |
|---|---|
| Methyl ethyl ketone | 40 parts |
| Toluene | 10 parts |
| (2) | |
| Butyl stearate | 1 part |
| Cyclohexanone | 70 parts |
| Methyl ethyl ketone | 50 parts |
| Toluene | 20 parts |
| (3) | |
| Polyisocyanate | 1.4 parts |
| Cyclohexanone | 10 parts |
| Methyl ethyl ketone | 15 parts |
| Toluene | 10 parts |

<Components of Paint B for Primer Layer>
(1)

| | |
|---|---|
| Needle iron oxide particles (average particle diameter: 100 nm) | 68 parts |
| Granular alumina particles (average particle diameter: 80 nm) | 8 parts |
| Carbon black (average particle diameter: 25 nm) | 24 parts |
| Stearic acid | 2.0 parts |
| Vinyl chloride-hydroxypropyl acrylate copolymer (—$SO_3Na$ group content: $0.7 \times 10^{-4}$ eq./g) | 8.8 parts |
| Polyester-polyurethane resin (Tg: 40° C., —$SO_3Na$ group content: $1 \times 10^{-4}$ eq./g) | 4.4 parts |
| Cyclohexanone | 25 parts |
| Methyl ethyl ketone | 40 parts |
| Toluene | 10 parts |
| (2) | |
| Butyl stearate | 1 part |
| Cyclohexanone | 70 parts |
| Methyl ethyl ketone | 50 parts |
| Toluene | 20 parts |
| (3) | |
| Polyisocyanate | 1.4 parts |
| Cyclohexanone | 10 parts |
| Methyl ethyl ketone | 15 parts |
| Toluene | 10 parts |

<Components of Paint for Lower Magnetic Layer>
(1) Kneading step

| | |
|---|---|
| Needle ferromagnetic iron type metal powder (Co/Fe: 30 atomic %, Y/(Fe + Co): 3 atomic %, Al/(Fe + Co): 5 wt. %, σs: 145 A·$m^2$/kg (145 emu/g), Hc: 187 kA/m (2,350 Oe), and average axial length: 100 nm) | 100 parts |
| Vinyl chloride-hydroxypropyl acrylate copolymer (—$SO_3Na$ group content: $0.7 \times 10^{-4}$ eq./g) | 14 parts |
| Polyester-polyurethane resin (PU) (—$SO_3Na$ group content: $1.0 \times 10^{-4}$ eq./g) | 5 parts |
| Granular alumina particles (average particle diameter: 80 nm) | 10 parts |
| Carbon black (average particle diameter: 75 nm) | 5 parts |
| Methyl acid phosphate (MAP) | 2 parts |
| Tetrahydrofuran (THF) | 20 parts |
| Methyl ethyl ketone/cyclohexanone (MEK/A) | 9 parts |
| (2) Diluting step | |
| Amide palmitate (PA) | 1.5 parts |
| n-Butyl stearate (SB) | 1 part |
| Methyl ethyl ketone/cyclohexanone (MEK/A) | 350 parts |
| (3) Compounding step | |
| Polyisocyanate | 1.5 parts |
| Methyl ethyl ketone/cyclohexanone (MEK/A) | 29 parts |

<Components for Paint for Non-Magnetic Intermediate Layer>
(1)

| | |
|---|---|
| Plate alumina particles (average particle diameter: 50 nm) | 10 parts |
| Plate ITO particles (average particle diameter: 40 nm) | 90 parts |
| Stearic acid | 2.0 parts |
| Vinyl chloride-hydroxypropyl acrylate copolymer (—$SO_3Na$ group content: $0.7 \times 10^{-4}$ eq./g) | 8.8 parts |
| Polyester-polyurethane resin (Tg: 40° C., —$SO_3Na$ group content: $1 \times 10^{-4}$ eq./g) | 4.4 parts |
| Cyclohexanone | 25 parts |
| Methyl ethyl ketone | 40 parts |
| Toluene | 10 parts |
| (2) | |
| Butyl stearate | 1 part |
| Cyclohexanone | 70 parts |
| Methyl, ethyl ketone | 50 parts |
| Toluene | 20 parts |
| (3) | |
| Polyisocyanate | 1.4 parts |
| Cyclohexanone | 10 parts |
| Methyl ethyl ketone | 15 parts |
| Toluene | 10 parts |

<Components for Paint for Upper Magnetic Layer>
(1) Kneading step

| | |
|---|---|
| Ultra-fine particle type granular magnetic powder (Y—N—Fe) [Y/Fe: 5.3 atomic %, N/Fe: 10.8 atomic %, σs: μWb/g (135.2 A·$m^2$/kg = 135.2 emu/g), Hc: 226.9 kA/m (2,850 Oe), average axial length: 20 nm, and average axial ratio: 1.2] | 100 parts |
| Vinyl chloride-hydroxypropyl acrylate copolymer (—$SO_3Na$ group content: $0.7 \times 10^{-4}$ eq./g) | 14 parts |
| Polyester-polyurethane resin (PU) (—$SO_3Na$ group content: $1.0 \times 10^{-4}$ eq./g) | 5 parts |
| Plate alumina particles (average particle diameter: 50 nm) | 10 parts |
| Plate ITO powder (average particle diameter: 40 nm) | 5 parts |
| Methyl acid phosphate (MAP) | 2 parts |
| Tetrahydrofuran (THF) | 20 parts |
| Methyl ethyl ketone/cyclohexanone (MEK/A) | 9 parts |
| (2) Diluting step | |
| Amide palmitate (PA) | 1.5 parts |
| n-Butyl stearate (SB) | 1 part |
| Methyl ethyl ketone/cyclohexanone (MEK/A) | 350 parts |
| (3) Compounding step | |
| Polyisocyanate | 1.5 parts |
| Methyl ethyl ketone/cyclohexanone (MEK/A) | 29 parts |

A paint A for primer layer was prepared by kneading the components of Group (1) of <Paint A for Primer Layer> with a batch type kneader, adding the components of Group (2) to the mixture and stirring them, dispersing the mixed components with a sand mill in a residence time of 60 minutes, and adding the components of Group (3), followed by stirring and filtering the mixture.

Separately, a paint for lower magnetic layer was prepared by previously mixing the components for the kneading step (1) at a high velocity and kneading the mixture with a continuous two-axle kneader, adding the components for the diluting step (2) and diluting the knead mixture with the continuous two-axle kneader in at least 2 stages, dispersing the mixture with a sand mill in a residence time of 45 minutes, and adding the components for the compounding step (3), followed by stirring and filtering the dispersion.

The paint A for primer layer was applied on a non-magnetic support (base film) made of an aromatic polyamide film (Mictron (trade name) manufactured by Toray, thickness of 3.3 μm, MD=0.11 GPa, MD/TD=0.70) so that the resultant primer layer could have a thickness of 0.5 μm after dried and calendered. Then, the paint for lower magnetic layer was applied on the primer layer by a wet-on-wet method so that the resultant lower magnetic layer could have a thickness of 0.5 μm after oriented in a magnetic field, dried and calendered. After the orientation in the magnetic field, the magnetic layer was dried with a drier and by far infrared radiation to obtain a magnetic sheet. The orientation in the magnetic field was carried out by arranging N—N opposed magnets (5 kG) in front of the drier, and arranging, in the drier, two pairs of N—N opposed magnets (5 kG) at an interval of 50 cm and at a position 75 cm before a position where the dryness of the layer was felt by one's fingers. The coating rate was 100 m/min.

Then, the components of the group (1) of the paint for non-magnetic intermediate layer were kneaded with a batch type kneader, and the components of the group (2) were added to the mixture. The mixture was stirred and dispersed in a sand mill in a residence time of 60 minutes, and the components of the group (3) were added. The mixture was stirred and filtered to obtain a paint for non-magnetic intermediate layer.

Separately from this paint, the components for the kneading step (1) for the upper magnetic layer were pre-mixed at a high velocity, and the resultant mixed powder was kneaded with a continuous twin-screw kneader. The components for the diluting step (2) were further added, and the mixture was diluted in at least two stages with a continuous twin-screw kneader, and dispersed in a sand mill in a residence time of 45 minutes. The components for the compounding step (3) were added, and the mixture was stirred and filtered to obtain a paint for upper magnetic layer.

The paint for non-magnetic intermediate layer was applied on the magnetic tape made of the aromatic polyamide film on which the primer layer and the lower magnetic layer had been formed, so that the resultant non-magnetic intermediate layer could have a thickness of 0.3 μm after dried and calendered. Then, the paint for upper magnetic layer was applied on the non-magnetic intermediate layer by a wet-on-wet method so that the resultant upper magnetic layer could have a thickness of 0.06 μm after oriented in a magnetic field, dried and calendered. After the orientation in the magnetic field, the upper magnetic layer was dried with a drier and by far infrared radiation to obtain a magnetic sheet. The orientation in the magnetic field was carried out by arranging N—N opposed magnets (5 kG) in front of the drier, and arranging, in the drier, two pairs of N—N opposed magnets (5 kG) at an interval of 50 cm and at a position 75 cm before a position where the dryness of the layer was felt by one's fingers. The coating rate was 100 m/min.

| <Components of Paint for Backcoat Layer> | |
|---|---|
| Plate ITO particles (average particle diameter: 40 nm) | 80 parts |
| Carbon black (average particle diameter: 25 nm) | 10 parts |
| Plate iron oxide particles (average particle diameter: 50 nm) | 10 parts |
| Nitrocellulose | 45 parts |

-continued

| <Components of Paint for Backcoat Layer> | |
|---|---|
| Polyurethane resin (containing —SO$_3$Na groups) | 30 parts |
| Cyclohexanone | 260 parts |
| Toluene | 260 parts |
| Methyl ethyl ketone | 525 parts |

The above components of the paint for backcoat layer were dispersed with a sand mill in a residence time of 45 minutes and polyisocyanate (15 parts) was added to the mixture to obtain a paint for backcoat layer. After the filtration, the paint was applied on a surface of the magnetic sheet opposite to the magnetic layer so that the resultant backcoat layer could have a thickness of 0.5 μm after dried and calendered, and then, the backcoat layer was dried to finish the magnetic sheet.

The magnetic sheet thus obtained was planished with seven-stage calendering using metal rolls, at a temperature of 100° C. under a linear pressure of 196 kg/cm, and wound onto a core and aged at 70° C. for 72 hours. After that, the magnetic sheet was cut into tapes with widths of ½ in.

A tape cut from the magnetic sheet was fed at a rate of 200 m/min. while the surface of the magnetic layer of the tape was being polished with a lapping tape and a blade, and wiped to thereby provide a magnetic tape. As the lapping tape, K10000 was used; as the blade, a hard blade was used; and Toraysee (trade name) manufactured by Toray was used for wiping the magnetic layer. The tape was treated under a feeding tension of 0.294 N. Magnetic servo signals were recorded on the magnetic tape thus obtained, with a servo writer, and the magnetic tape was set in a cartridge shown in FIG. 2 to thereby provide a computer tape. The coercive force, and the product Br.δ of the residual magnetic flux density and the thickness of the magnetic layer, which had been measured along the orientating direction of the magnetic tape, were 299.5 kA/m and 0.020 μTm, respectively. In this regard, the values of this magnetic measurement are the measured values of a magnetic tape which was obtained by applying a non-magnetic intermediate layer and an upper magnetic layer on a non-magnetic support, and orientating, drying and calendering under the same conditions. This measurement was similarly conducted in the following Examples. The results are shown in Table 1.

Example 2

A magnetic tape was made in the same manner as in Example 1, except that the paint B for primer layer was used instead of the paint A for primer layer.

Example 3

A magnetic tape was made in the same manner as in Example 1, except that 100 parts of the plate aluminum oxide particles was used instead of 10 parts of the plate aluminum oxide particles and 90 parts of the plate ITO particles in a paint for non-magnetic intermediate layer, and that the paint B for primer layer was used.

Example 4

A magnetic tape was made in the same manner as in Example 1, except that 100 parts of the plate iron oxide particles were used instead of 10 parts of the plate aluminum oxide particles and 90 parts of the plate ITO particles in a paint for non-magnetic intermediate layer, and that the paint B for primer layer was used.

Example 5

A magnetic tape was made in the same manner as in Example 1, except that the thickness of the non-magnetic intermediate layer was changed from 0.3 µm to 0.5 µm.

Example 6

A magnetic tape was made in the same manner as in Example 1, except that the thickness of the non-magnetic intermediate layer was changed from 0.3 µm to 0.2 µm.

Example 7

A magnetic tape was made in the same manner as in Example 1, except that the thickness of the lower magnetic layer was changed from 0.5 µm to 0.3 µm.

Example 8

A magnetic tape was made in the same manner as in Example 1, except that the thickness of the lower magnetic layer was changed from 0.5 µm to 1.0 µm.

Example 9

A magnetic tape was made in the same manner as in Example 8, except that no primer layer was formed.

Comparative Example 1

A computer tape was made in the same manner as in Example 1, except that the components for the kneading step (1) in <Components of Paint for Upper Magnetic Layer> and the components of <Paint for Non-Magnetic Intermediate Layer> and <Paint for Backcoat Layer> were changed to the following. In this regard, the magnetic powder was changed to magnetic powder comprising needle particles with a particle diameter (average axial length) of 100 nm, and therefore, the thickness of the magnetic layer could not be controlled to 0.06 µm, and it resulted in 0.11 µm.

| <Components of Paint for Upper Magnetic Layer> (1) Kneading step | |
|---|---|
| Needle ferromagnetic iron type metal powder (Co/Fe: 30 atomic %, Y/(Fe + Co): 3 atomic %, Al/(Fe + Co): 5 wt. %, σs: 145 A·m²/kg (145 emu/g), Hc: 187 kA/m (2,350 Oe), and average axial length: 100 nm) | 100 parts |
| Vinyl chloride-hydroxypropyl acrylate copolymer (—SO₃Na group content: 0.7 × 10⁻⁴ eq./g) | 14 parts |
| Polyester-polyurethane resin (PU) (—SO₃Na group content: 1.0 × 10⁻⁴ eq./g) | 5 parts |
| Granular alumina particles (average particle diameter: 80 nm) | 10 parts |
| Carbon black (average particle diameter: 75 nm) | 5 parts |
| Methyl acid phosphate (MAP) | 2 parts |
| Tetrahydrofuran (THF) | 20 parts |
| Methyl ethyl ketone/cyclohemanone (MEK/A) | 9 parts |

| -continued | |
|---|---|
| <Components of Paint for Non-Magnetic Intermediate Layer> (1) | |
| Needle iron oxide particles (average particle diameter: 100 nm) | 68 parts |
| Granular alumina particles (average particle diameter: 80 nm) | 8 parts |
| Carbon black (average particle diameter: 25 nm) | 24 parts |
| Stearic acid | 2.0 parts |
| Vinyl chloride-hydroxypropyl acrylate copolymer (—SO₃Na group content: 0.7 × 10⁻⁴ eq./g) | 8.8 parts |
| Polyester-polyurethane resin (Tg: 40° C., —SO₃Na group content: 1 × 10⁻⁴ eq./g) | 4.4 parts |
| Cyclohexanone | 25 parts |
| Methyl ethyl ketone | 40 parts |
| Toluene | 10 parts |
| (2) | |
| Butyl stearate | 1 part |
| Cyclohexanone | 70 parts |
| Methyl ethyl ketone | 50 parts |
| Toluene | 20 parts |
| (3) | |
| Polyisocyanate | 1.4 parts |
| Cyclohexanone | 10 parts |
| Methyl ethyl ketone | 15 parts |
| Toluene | 10 parts |
| <Components of Paint for Backcoat Layer> | |
| Carbon black (average particle diameter: 25 nm) | 80 parts |
| Carbon black (average particle diameter: 0.35 µm) | 10 parts |
| Granular iron oxide particles (average particle diameter: 0.4 µm) | 10 parts |
| Nitrocellulose | 45 parts |
| Polyurethane resin (containing SO₃Na groups) | 30 parts |
| Cyclohexanone | 260 parts |
| Toluene | 260 parts |
| Methyl ethyl ketone | 525 parts |

Comparative Example 2

A magnetic tape was made in the same manner as in Example 1, except that no lower magnetic layer was formed, and that the same paint for non-magnetic intermediate layer as that used in Comparative Example 1 was used.

Comparative Example 3

A magnetic tape was made in the same manner as in Example 1, except that no lower magnetic layer was formed.

The properties of the magnetic tapes obtained in the above Examples and Comparative Examples were evaluated as follows.

<Surface Roughness of Magnetic Layer>

The surface roughness of the magnetic layer was measured at a scan length of 5 µm by a scan type white light interference method, using an universal three-dimensional surface structure analyzer, NewView 5000 manufactured by ZYGO. The view field for measurement was 350 µm×260 µm. The center line average height of the surface roughness of the magnetic layer was measured as Ra.

<Magnetic Properties>

The magnetic properties were measured with a sample-vibration type magnetometer at 25° C. with applying a magnetic field of 1,274 kA/m like the measurement of the magnetic properties of the magnetic powder. In this measurement, 20 pieces of the magnetic recording medium were laminated, and blanked to obtain a circular sample having a diameter of 8 mm, and the measured values were compensated using a standard sample.

The anisotropic magnetic field distribution was obtained by measuring a differential curve in the second quadrant of the hysteresis loop of the tape (demagnetization curve) and dividing a magnetic field corresponding to the half-width value of the differential curve by the coercive force of the tape. That is, as the coercive force distribution of the magnetic powder is narrower or the dispersion and orientation of the magnetic powder in the tape is better, Ha is smaller. When the coercive force is the same, the smaller Ha leads to the better recording characteristics in particular in the short wavelength range.

<Output and Ratio of Output to Noises>

The electromagnetic conversion characteristics of the magnetic tape were measured using a drum tester. The drum tester was equipped with an electromagnetic induction type head (track width: 25 µm, gap: 0.1 µm) and a MR head (8 µm) so that the induction type head was used for recording, and the MR head, for reproducing. Both heads were arranged at different positions relative to the rotary drum, and both heads were operated in the vertical direction to match their tracking with each other. A proper length of the magnetic tape was drawn out from the reel in the cartridge and discarded. A further 60 cm length of the magnet tape was drawn out and cut and processed into a tape with a width of 4 mm, which was then wound onto the outer surface of the drum.

Output and noises were determined as follows. A rectangular wave with a wavelength of 0.2 µm was written on the magnetic tape, using a function generator, and the output from the MR head was read with the spectrum analyzer. The value of a carrier with a wavelength of 0.2 µm was defined as an output C from the medium. The value of integration of values, which were obtained by subtracting the output and system noises from the components of spectra corresponding to a recording wavelength of 0.2 µm or more, was used as a noise value N, when the rectangular wave with a wavelength of 0.2 µm was written on the magnetic tape. The ratio of the output to the noises was calculated as C/N. C and C/N were reported as relative values in relation to the values of the tape of Comparative Example 1.

<Output of Servo Signals>

Servo verify was executed immediately after magnetic servo signals were written with a servo writer, and simultaneously the outputs (C) from the servo signals were measured to determine relative values in relation to the values of the magnetic tape of Comparative Example 2. In this regard, when the leakage magnetic field from magnetic tape is small, a bias magnetic field is generally applied to the MR head to gain a predetermined output (C). However, a too small leakage magnetic field leads to a decrease in C/N.

<Coefficients of Temperature/Humidity Expansions of Tape>

Test pieces with a width of 12.65 mm and a length of 150 mm were prepared from the magnetic sheet along the widthwise direction. The temperature expansion coefficient was determined from difference in length between each of the test pieces exposed to atmospheres of 20° C. and 60% RH, and of 40° C. and 60% RH, respectively. The humidity expansion coefficient was determined from difference in length between each of the test pieces exposed to atmospheres of 20° C. and 30% RH, and of 20° C. and 70% RH, respectively.

<Off-Track Amount>

An off-track amount was measured as follows:

Recording was performed on the magnetic tape at a recording wavelength of 0.55 µm, using an adapted LTO drive, at a temperature of 20° C. and a humidity of 45% RH, and then, the recording outputs were measured at a temperature of 20° C. and a humidity of 45% RH and at a temperature of 35° C. and a humidity of 70% RH. The ratio of the former output to the latter output was used as an off-track amount. In the measurement, the recording head having tracks with a width of 20 µm and the reproducing head (MR head) having tracks with a width of 12 µm were used.

Table 1 shows the results of the properties of the magnetic tapes of Examples 1 to 9 and Comparative Examples 1 to 3 as well as the conditions employed in Examples and Comparative Examples.

TABLE 1

|  | Ex. 1 | Ex. 2 | Ex. 3 | Ex. 4 |
|---|---|---|---|---|
| Upper magnetic layer | | | | |
| Magnetic powder | | | | |
| Elemental composition | Y—N—Fe | Y—N—Fe | Y—N—Fe | Y—N—Fe |
| Particle size (nm) | 20 | 20 | 20 | 20 |
| Filler | | | | |
| Plate alumina (50 nm) | 10 | 10 | 10 | 10 |
| Granular alumina (80 nm) | — | — | — | — |
| CB (75 nm) | — | — | — | — |
| Plate ITO (40 nm) | 5 | 5 | 5 | 5 |
| Roughness Ra (nm) | 2.2 | 2.5 | 2.3 | 2.4 |
| Coercive force (kA/m) | 299.5 | 292.4 | 294.2 | 297.7 |
| Sqareness ratio | 0.84 | 0.84 | 0.83 | 0.84 |
| Br.δ (µTm) | 0.020 | 0.021 | 0.020 | 0.019 |
| Anisotropic magnetic field distribution (Ha) | 0.50 | 0.50 | 0.51 | 0.50 |
| Non-magnetic intermediate layer | | | | |
| Filler | | | | |
| Plate alumina (50 nm) | — | — | 100 | — |
| Plate iron oxide (50 nm) | 10 | 10 | — | 100 |
| Needle iron oxide (100 nm) | — | — | — | — |
| Granular alumina (80 nm) | — | — | — | — |
| CB (25 nm) | — | — | — | — |
| Plate ITO (40 nm) | 90 | 90 | — | — |
| Lower magnetic layer | | | | |
| Magnetic powder | | | | |
| Elemental composition | Y—Al—Co—Fe | Y—Al—Co—Fe | Y—Al—Co—Fe | Y—Al—Co—Fe |
| Particle size (nm) | 100 | 100 | 100 | 100 |

TABLE 1-continued

Filler

| | | | | |
|---|---|---|---|---|
| Plate alumina (50 nm) | — | — | — | — |
| Granular alumina (80 nm) | 10 | 10 | 10 | 10 |
| CB (75 nm) | 5 | 5 | 5 | 5 |
| Plate ITO (40 nm) | — | — | — | — |

Primer layer

Filler

| | | | | |
|---|---|---|---|---|
| Plate alumina (50 nm) | 10 | — | — | — |
| Plate iron oxide (50 nm) | — | — | — | — |
| Needle iron oxide (100 nm) | — | 68 | 68 | 68 |
| Granular alumina (80 nm) | — | 8 | 8 | 8 |
| CB (25 nm) | — | 24 | 24 | 24 |
| Plate ITO (40 nm) | 90 | — | — | — |

BC layer

Filler

| | | | | |
|---|---|---|---|---|
| CB (25 nm) | 10 | 10 | 10 | 10 |
| CB (0.35 μm) | — | — | — | — |
| Granular iron oxide (0.4 μm) | — | — | — | — |
| Plate iron oxide (50 nm) | 10 | 10 | 10 | 10 |
| Plate ITO (40 nm) | 80 | 80 | 80 | 80 |
| Thickness of upper magnetic layer (μm) | 0.06 | 0.06 | 0.06 | 0.06 |
| Thickness of non-magnetic intermediate layer (μm) | 0.3 | 0.3 | 0.3 | 0.3 |
| Thickness of lower magnetic layer (μm) | 0.5 | 0.5 | 0.5 | 0.5 |
| Thickness of primer layer (μm) | 0.5 | 0.5 | 0.5 | 0.5 |
| Thickness of support (μm) | 3.3 | 3.3 | 3.3 | 3.3 |
| Thickness of BC layer (μm) | 0.5 | 0.5 | 0.5 | 0.5 |
| Total thickness (μm) | 5.16 | 5.16 | 5.16 | 5.16 |
| C (dB) | 3.1 | 2.9 | 3.1 | 3.0 |
| C/N (dB) | 12.5 | 12.0 | 12.2 | 12.0 |
| Output of servo signal (dB) | 6.0 | 6.1 | 6.1 | 6.0 |
| Thermal expansion coefficient ($\times 10^{-6}/°C$) | 4.7 | 10.7 | 10.4 | 10.9 |
| Humidity expansion coefficient ($\times 10^{-6}/\%RH$) | 13.5 | 15.0 | 15.2 | 15.1 |
| Amount of off-track (μm) | 1.4 | 1.8 | 2.0 | 1.9 |

TABLE 1-continued

| | Ex. 5 | Ex. 6 | Ex. 7 | Ex. 8 |
|---|---|---|---|---|

Upper magnetic layer

Magnetic powder

| | Ex. 5 | Ex. 6 | Ex. 7 | Ex. 8 |
|---|---|---|---|---|
| Elemental composition | Y—N—Fe | Y—N—Fe | Y—N—Fe | Y—N—Fe |
| Particle size (nm) | 20 | 20 | 20 | 20 |

Filler

| | Ex. 5 | Ex. 6 | Ex. 7 | Ex. 8 |
|---|---|---|---|---|
| Plate alumina (50 nm) | 10 | 10 | 10 | 10 |
| Granular alumina (80 nm) | — | — | — | — |
| CB (75 nm) | — | — | — | — |
| Plate ITO (40 nm) | 5 | 5 | 5 | 5 |
| Roughness Ra (nm) | 2.4 | 2.3 | 2.2 | 2.4 |
| Coercive force (kA/m) | 295.3 | 297.6 | 293.9 | 298.1 |
| Squareness ratio | 0.84 | 0.83 | 0.84 | 0.84 |
| Br.δ (μTm) | 0.020 | 0.021 | 0.021 | 0.020 |
| Anisotropic magnetic field distribution (Ha) | 0.50 | 0.51 | 0.50 | 0.50 |

Non-magnetic intermediate layer

Filler

| | Ex. 5 | Ex. 6 | Ex. 7 | Ex. 8 |
|---|---|---|---|---|
| Plate alumina (50 nm) | — | — | — | — |
| Plate iron oxide (50 nm) | 10 | 10 | 10 | 10 |
| Needle iron oxide (100 nm) | — | — | — | — |
| Granular alumina (80 nm) | — | — | — | — |
| CB (25 nm) | — | — | — | — |
| Plate ITO (40 nm) | 90 | 90 | 90 | 90 |

Lower magnetic layer

Magnetic powder

| | Ex. 5 | Ex. 6 | Ex. 7 | Ex. 8 |
|---|---|---|---|---|
| Elemental composition | Y—Al—Co—Fe | Y—Al—Co—Fe | Y—Al—Co—Fe | Y—Al—Co—Fe |
| Particle size (nm) | 100 | 100 | 100 | 100 |

Filler

| | Ex. 5 | Ex. 6 | Ex. 7 | Ex. 8 |
|---|---|---|---|---|
| Plate alumina (50 nm) | — | — | — | — |
| Granular alumina (80 nm) | 10 | 10 | 10 | 10 |
| CB (75 nm) | 5 | 5 | 5 | 5 |
| Plate ITO (40 nm) | — | — | — | — |

Primer layer

Filler

| | Ex. 5 | Ex. 6 | Ex. 7 | Ex. 8 |
|---|---|---|---|---|
| Plate alumina (50 nm) | 10 | 10 | 10 | 10 |
| Plate iron oxide (50 nm) | — | — | — | — |
| Needle iron oxide (100 nm) | — | — | — | — |

TABLE 1-continued

| | | | | |
|---|---|---|---|---|
| Granular alumina (80 nm) | — | — | — | — |
| CB (25 nm) | — | — | — | — |
| Plate ITO (40 nm) | 90 | 90 | 90 | 90 |
| BC layer | | | | |
| *Filler* | | | | |
| CB (25 nm) | 10 | 10 | 10 | 10 |
| CB (0.35 μm) | — | — | — | — |
| Granular iron oxide (0.4 μm) | — | — | — | — |
| Plate iron oxide (50 nm) | 10 | 10 | 10 | 10 |
| Plate ITO (40 nm) | 80 | 80 | 80 | 80 |
| Thickness of upper magnetic layer (μm) | 0.06 | 0.06 | 0.06 | 0.06 |
| Thickness of non-magnetic intermediate layer (μm) | 0.5 | 0.2 | 0.3 | 0.3 |
| Thickness of lower magnetic layer (μm) | 0.5 | 0.5 | 0.3 | 1.0 |
| Thickness of primer layer (μm) | 0.5 | 0.5 | 0.5 | 0.5 |
| Thickness of support (μm) | 3.3 | 3.3 | 3.3 | 3.3 |
| Thickness of BC layer (μm) | 0.5 | 0.5 | 0.5 | 0.5 |
| Total thickness (μm) | 5.36 | 5.06 | 5.16 | 5.66 |
| C (dB) | 3.0 | 3.0 | 3.1 | 2.9 |
| C/N (dB) | 12.1 | 12.3 | 12.5 | 12.1 |
| Output of servo signal (dB) | 3.1 | 7.5 | 3.4 | 9.5 |
| Thermal expansion coefficient ($\times 10^{-6}$/°C) | 4.5 | 4.8 | 2.2 | 10.8 |
| Humidity expansion coefficient ($\times 10^{-6}$/% RH) | 12.7 | 14.0 | 11.6 | 15.4 |
| Amount of off-track (μm) | 1.4 | 1.5 | 1.2 | 1.8 |

| | Ex. 9 | C. Ex. 1 | C. Ex. 2 | C. Ex. 3 |
|---|---|---|---|---|
| Upper magnetic layer | | | | |
| *Magnetic powder* | | | | |
| Elemental composition | Y—N—Fe | Y—Al—Co—Fe | Y—N—Fe | Y—N—Fe |
| Particle size (nm) | 20 | 100 | 20 | 20 |
| *Filler* | | | | |
| Plate alumina (50 nm) | 10 | — | 10 | 10 |
| Granular alumina (80 nm) | — | 10 | — | — |
| CB (75 nm) | — | 5 | — | — |
| Plate ITO (40 nm) | 5 | — | 5 | 5 |
| Roughness Ra (nm) | 2.3 | 4.4 | 2.4 | 2.3 |
| Coercive force (kA/m) | 294.7 | 193.2 | 297.3 | 296.9 |
| Squareness ratio | 0.83 | 0.84 | 0.83 | 0.84 |
| Br·δ (μTm) | 0.020 | 0.040 | 0.020 | 0.021 |
| Anisotropic magnetic field distribution (Ha) | 0.51 | 0.065 | 0.51 | 0.50 |
| Non-magnetic intermediate layer | | | | |
| *Filler* | | | | |
| Plate alumina (50 nm) | — | — | — | — |
| Plate iron oxide (50 nm) | 10 | — | — | 10 |
| Needle iron oxide (100 nm) | — | 68 | 68 | — |
| Granular alumina (80 nm) | — | 8 | 8 | — |
| CB (25 nm) | — | 24 | 24 | — |
| Plate ITO (40 nm) | 90 | — | — | 90 |
| Lower magnetic layer | | | | |
| *Magnetic powder* | | | | |
| Elemental composition | Y—Al—Co—Fe | Y—Al—Co—Fe | — | — |
| Particle size (nm) | 100 | 100 | — | — |
| *Filler* | | | | |
| Plate alumina (50 nm) | — | — | — | — |
| Granular alumina (80 nm) | 10 | 10 | — | — |
| CB (75 nm) | 5 | 5 | — | — |
| Plate ITO (40 nm) | — | — | — | — |
| Primer layer | | | | |
| *Filler* | | | | |
| Plate alumina (50 nm) | — | 10 | 10 | 10 |
| Plate iron oxide (50 nm) | — | — | — | — |
| Needle iron oxide (100 nm) | — | — | — | — |
| Granular alumina (80 nm) | — | 10 | — | — |
| CB (25 nm) | — | 80 | — | — |
| Plate ITO (40 nm) | — | — | 90 | 90 |
| BC layer | | | | |
| *Filler* | | | | |
| CB (25 nm) | 10 | 80 | 10 | 10 |
| CB (0.35 μm) | — | 10 | — | — |
| Granular iron oxide (0.4 μm) | — | 10 | — | — |
| Plate iron oxide (50 nm) | 10 | — | 10 | 10 |
| Plate ITO (40 nm) | 80 | — | 80 | 80 |
| Thickness of upper magnetic layer (μm) | 0.06 | 0.11 | 0.06 | 0.06 |
| Thickness of non-magnetic intermediate layer (μm) | 0.3 | 0.3 | 0.3 | 0.3 |
| Thickness of lower magnetic layer (μm) | 1.0 | 0.5 | — | — |

TABLE 1-continued

| | | | | |
|---|---|---|---|---|
| Thickness of primer layer (μm) | 0.5 | 0.5 | 0.5 | 0.5 |
| Thickness of support (μm) | 3.3 | 3.3 | 3.3 | 3.3 |
| Thickness of BC layer (μm) | 0.5 | 0.5 | 0.5 | 0.5 |
| Total thickness (μm) | 5.16 | 5.21 | 4.66 | 4.66 |
| C (dB) | 2.9 | 0.0 | 3.0 | 3.1 |
| C/N (dB) | 12.0 | 0.0 | 12.1 | 12.3 |
| Output of servo signal (dB) | 9.4 | 9.7 | 0.0 | 0.2 |
| Thermal expansion coefficient ($\times 10^{-6}$/° C.) | 11.6 | 25.6 | 9.5 | 1.5 |
| Humidity expansion coefficient ($\times 10^{-6}$/% RH) | 16.0 | 29.0 | 15.2 | 11.0 |
| Amount of off-track (μm) | 1.9 | 3.5 | 2.0 | 1.3 |

As is apparent from Table 1, the computer magnetic tapes (the magnetic recording media) of Examples 1 to 9 of the present invention which have a total thickness of less than 6 μm and use the substantially spherical or ellipsoidal iron type magnetic powder in the uppermost magnetic layers are superior in electromagnetic conversion characteristics (C, C/N) to the computer tape of Comparative Example 1 which uses the needle particle type magnetic powder in the uppermost magnetic layer. In addition, the computer magnetic tape which uses the substantially spherical or ellipsoidal iron type magnetic powder in the uppermost magnetic layer and the plate particle type non-magnetic powder in the primer layer is excellent in C/N characteristics.

Further, the linear recording type computer magnetic tape which uses the substantially spherical or ellipsoidal rare earth-iron magnetic powder in the uppermost magnetic layer and the plate particle type non-magnetic powder in the primer layer and/or the backcoat layer is sufficient in stability against changes in temperature and humidity, and thus, the off-track amount of such a magnetic tape is small, even when the temperature and the humidity change.

Further, as is apparent from the results of Examples 1 to 9 of the present invention and Comparative Example 2, the formation of the lower magnetic layer is effective to increase the servo output, and therefore, improvement on servo characteristics can be expected.

In this regard, in accordance with the apparatus used, the primer layer and the lower magnetic layer were applied by the wet-on-wet method and dried, and the non-magnetic intermediate layer and the upper magnetic layer were formed thereon by the-wet-on-wet method. However, it is more preferable that the primer layer, the lower magnetic layer, the non-magnetic intermediate layer and the upper magnetic layer are formed by the wet-on-wet method.

Example 10

Yttrium-iron nitride magnetic powder was prepared in the same manner as in Example 1, except that magnetite particles with an average particle size of 20 nm were used instead of the magnetite particles with an average particle size of 25 nm as the starting material. In this connection, the magnetite particles of this Example were prepared under the same conditions as those in Example 8, except that the conditions for the hydrothermal treatment were changed from 200° C. for 4 hours to 180° C. for 4 hours.

The contents of yttrium and nitrogen of this yttrium-iron nitride magnetic powder were measured by a fluorescent X-ray analysis and were found to be 5.5 atomic % and 11.9 atomic %, respectively. Further, a profile indicating the presence of a $Fe_{16}N_2$ phase was obtained form the X-ray diffraction pattern.

Furthermore, the particle shapes of this magnetic powder were observed with a high resolution analytic transmission electron microscope. As a result, it was found that the magnetic powder comprised spherical or ellipsoidal particles with an average particle size of 17 nm. The specific surface area of this magnetic powder was 60.1 m²/g which was determined by the BET method.

Still furthermore, the saturation magnetization of the magnetic powder found by applying a magnetic field of 1,274 kA/m (16 kOe) was 130.5 Am²/kg, and the coercive force thereof was 211.0 kA/m (2,650 Oe). This magnetic powder was stored at 60° C. and 90% RH for one week, and then, the saturation magnetization of this magnetic powder was measured in the same manner as above. As a result, it was 106.9 Am²/kg (106.9 emu/g), and the saturation magnetization-maintaining rate of the magnetic powder was 81.9%.

A paint for upper magnetic layer was prepared in the same manner as in Example 1, using the rare earth-iron nitride magnetic powder thus obtained. In this regard, this magnetic powder was prepared by scaling up the procedure of this Example by 100 times. Further, a paint for lower magnetic layer, a paint for primer layer, a paint for non-magnetic intermediate layer and a paint for backcoat layer were prepared in the same manners as in Example 1. The same plate oxide particles such as plate alumina particles and plate ITO particles as those described in Example 1 were used in these paints. The paints for magnetic layers, primer layer, non-magnetic intermediate layer and backcoat layer thus prepared were applied in the same manners as in Example 1 to make a magnetic tape under the same conditions as in Example 1. Further, the magnetic sheet planished and aged in the same manners as in Example 1 was cut into elongated pieces with a width of ½ in., which were then polished with lapping tapes and then with blades and wiped in the same manners as in Example 1, to obtain magnetic tapes. Magnetic servo signals were recorded on the magnetic tape thus obtained, with a servo writer, and the magnetic tape was set in a cartridge shown in FIG. 2 for use as a computer tape. The coercive force and the product Br.δ of the residual magnetic flux density and the thickness of the magnetic layer of the magnetic tape, measured in the tape-orientating direction, were 278.5 kA/m and 0.019 μTm, respectively.

Example 11

Yttrium-iron nitride magnetic powder was prepared in the same manner as in Example 1, except that magnetite particles with an average particle size of 30 nm was used instead of the magnetite particles with an average particle size of 25 nm as the starting material. The magnetite particles of this Example were prepared under the same conditions as in Example 1, except that the conditions for the hydrothermal treatment were changed from 200° C. for 4 hours to 220° C. for 4 hours.

The contents of yttrium and nitrogen of this yttrium-iron nitride magnetic powder were measured by a fluorescent X-ray analysis, and were found to be 4.8 atomic % and 10.1 atomic %, respectively. Further, a profile indicating the presence of a $Fe_{16}N_2$ phase was observed from the X-ray diffraction pattern.

Figure 6:
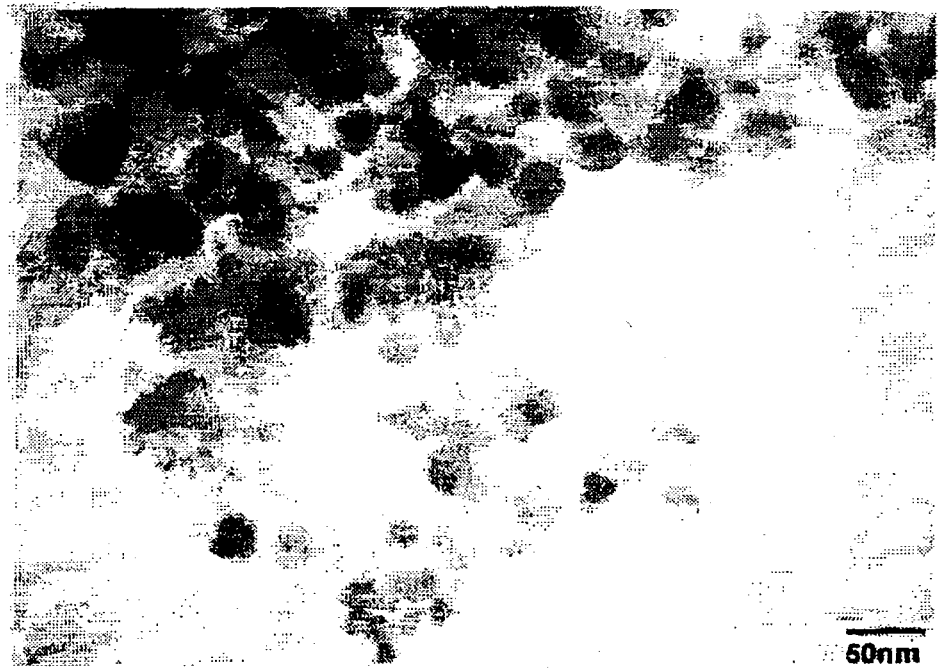
FIG. 6 is a transmission electron microphotograph of yttrium-iron nitride magnetic powder prepared in Example 11 (the magnification: 200,000).
Figure 7:
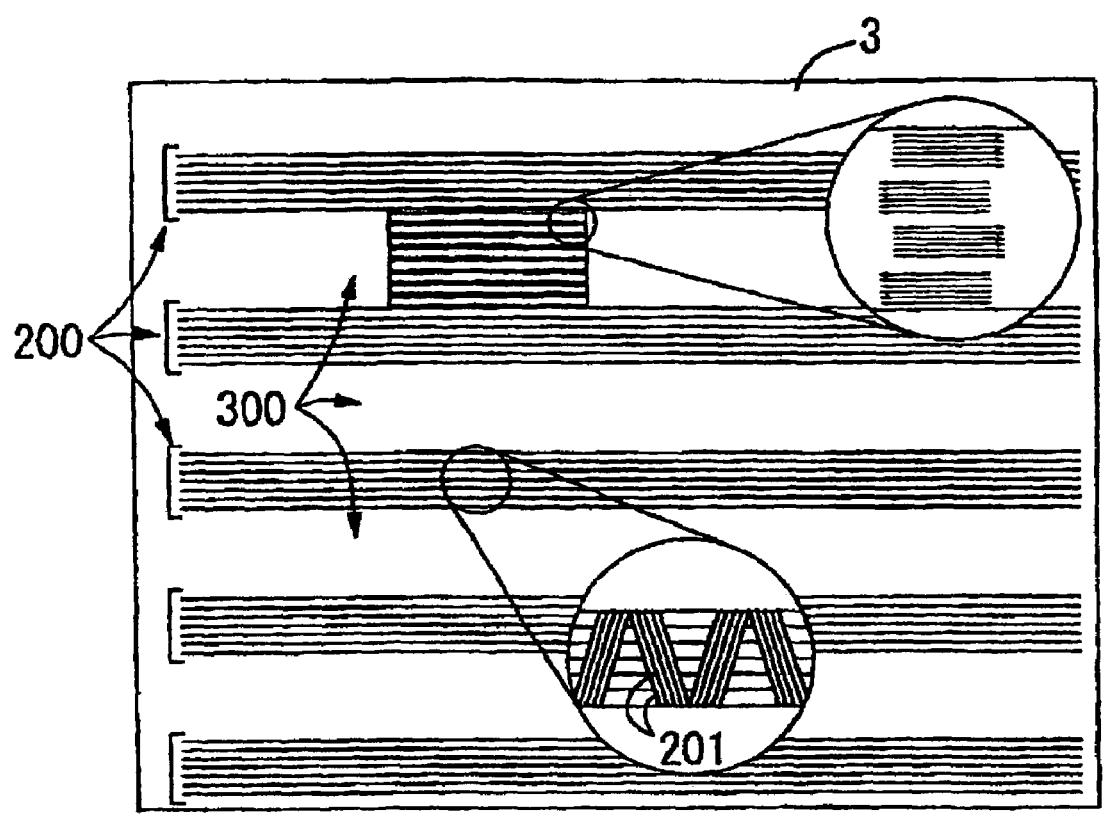
FIG. 7 is a schematic diagram of magnetic tape, illustrating a magnetic servo system as an example of track servo systems used in the magnetic tape, in which data tracks and servo bands are alternately provided on the magnetic recording surface (the magnetic layer) of a magnetic tape.

Furthermore, the particle shapes of the magnetic powder were observed with a high resolution analytic transmission electron microscope, and they were found to be spherical or ellipsoidal particles with an average particle size of 27 nm. FIG. 6 is a transmission electron microphotograph of this magnetic powder taken at a magnification of 200,000. The specific surface area of the magnetic powder determined by the BET method was 42.0 $m^2/g$.

Still furthermore, the saturation magnetization of the magnetic powder found by applying a magnetic field of 1,274 kA/m (16 kOe) was 155.1 $Am^2/kg$ (155.1 emu/g), and the coercive force thereof was 235.4 kA/m (2,957 Oe). This magnetic powder was stored at 60° C. and 90% RH for one week, and then, the saturation magnetization of this magnetic powder was measured in the same manner. As a result, it was 140.1 $Am^2/kg$ (140.1 emu/g), and the saturation magnetization-maintaining rate of the magnetic powder was 90.3%.

A paint for upper magnetic layer was prepared in the same manner as in Example 1, using the rare earth-iron nitride magnetic powder obtained as above. In this regard, this magnetic powder was produced by scaling up the procedures of the Example of the present invention by 100 times. Further, a paint for lower magnetic layer, a paint for primer layer, a paint for non-magnetic intermediate layer and a paint for backcoat layer were prepared in the same manners as in Example 1. The same plate oxide particles such as plate alumina particles and plate ITO particles as described in Example 1 were used in these paints. The paints for magnetic layers, primer layer, non-magnetic intermediate layer and backcoat layer thus prepared were applied in the same manners as in Example 1 to make a magnetic tape under the same conditions as in Example 1. Magnetic servo signals were recorded on the magnetic tape thus obtained, with a servo writer, and the magnetic tape was set in a cartridge shown in FIG. 2 for use as a computer tape. The coercive force and the product Br.δ of the residual magnetic flux density and the thickness of the magnetic layer of the magnetic tape, measured in the tape-orientating direction, were 294.3 kA/m and 0.023 µTm, respectively.

Example 12

Yttrium-iron nitride magnetic powder was prepared in the same manner as in Example 1, except that the addition amount of yttrium nitride was changed from 2.5 g to 7.4 g, and that the addition amount of sodium hydroxide was changed from 0.8 g to 2.3 g.

The contents of yttrium and nitrogen of this yttrium-iron nitride magnetic powder were measured by a fluorescent X-ray analysis, and were found to be 14.6 atomic % and 9.5 atomic %, respectively. Further, a profile indicating the presence of a $Fe_{16}N_2$ phase was observed from the X-ray diffraction pattern.

Furthermore, the particle shapes of the magnetic powder were observed with a high resolution analytic transmission electron microscope, and they were found to be spherical or ellipsoidal particles with an average particle size of 21 nm. The specific surface area of this magnetic powder determined by the BET method was 64.3 $m^2/g$.

Still furthermore, the saturation magnetization of this magnetic powder found by applying a magnetic field of 1,274 kA/m (16 kOe) was 105.8 $Am^2/kg$ (105.8 emu/g), and the coercive force thereof was 232.5 kA/m (2,920 Oe). This magnetic powder was stored at 60° C. and 90% RH for one week, and then, the saturation magnetization of this magnetic powder was measured in the same manner. As a result, it was 95.8 $Am^2/kg$ (95.8 emu/g), and the saturation magnetization-maintaining rate of the magnetic powder was 90.5%.

A paint for upper magnetic layer was prepared in the same manner as in Example 1, using the rare earth-iron nitride magnetic powder thus obtained. In this regard, this powder was prepared by scaling up the procedure of this Example by 100 times. Further, a paint for lower magnetic layer, a paint for primer layer, a paint for non-magnetic intermediate layer and a paint for backcoat layer were prepared in the same manners as in Example 1. The plate oxide particles such as plate alumina particles and plate ITO particles used in these paints were the same ones as described in Example 1. The paints for magnetic layers, primer layer, non-magnetic intermediate layer and backcoat layer thus prepared were applied in the same manners as in Example 1 to make a magnetic tape under the same conditions as in Example 1. Magnetic servo signals were recorded on the magnetic-tape thus obtained, with a servo writer, and the magnetic tape was set in a cartridge shown in FIG. 2 for use as a computer tape. The coercive force and the product Br.δ of the residual magnetic flux density and the thickness of the magnetic layer of this magnetic tape, measured in the tape-orientating direction, were 297.6 kA/m and 0.017 µTm, respectively.

Example 13

As magnetic powder, aluminum-iron nitride magnetic powder was used. This magnetic powder was prepared by using the same magnetite particles as those used in Example 1, and treating the magnetic powder with aluminum instead of yttrium. That is, this magnetic powder was prepared under the same conditions as in Example 1, except that 5.1 g of aluminum chloride was used instead of 2.5 g of yttrium nitride. The magnetite particles were coated with aluminum hydroxide, and were reduced and nitrided in the same manner as in Example 1, to obtain the aluminum-iron nitride magnetic powder.

The contents of aluminum and nitrogen of this aluminum-iron nitride magnetic powder thus obtained were measured by a fluorescent X-ray analysis, and were found to be 8.1 atomic % and 8.9 atomic %, respectively. Further, a diffraction peak derived from a $Fe_{16}N_2$ phase and a diffraction peak derived from an α-Fe phase were observed from the X-ray diffraction pattern. Thus, it was confirmed that this aluminum-iron nitride magnetic powder comprised a $Fe_{16}N_2$ phase and an α-Fe phase.

Furthermore, the particle shapes of the magnetic powder were observed with a high resolution analytic transmission electron microscope, and they were found to be substantially spherical particles with an average particle size of 25 nm. The saturation magnetization of this magnetic powder found by applying a magnetic field of 1,274 kA/m (16 kOe) was 136.7 $Am^2/kg$ (136.7 emu/g), and the coercive force thereof was 171.9 kA/m (2,160 Oe). This magnetic powder was stored at 60° C. and 90% RH for one week, and then, the saturation magnetization of this magnetic powder was measured in the same manner. As a result, it was 115.3 $Am^2/kg$ (115.3 emu/g), and the saturation magnetization-maintaining rate of the magnetic powder was 84.3%.

A paint for upper magnetic layer was prepared in the same manner as in Example 1, using the aluminum-iron nitride magnetic powder which was prepared by scaling up the procedure of the above method. Other layers were formed in the same manners as in Example 1 to make a magnetic tape. Magnetic servo signals were recorded on the magnetic tape thus obtained, with a servo writer, and the magnetic tape was set in a cartridge shown in FIG. 2 for use as a computer tape. The coercive force and the product Br.δ of the residual magnetic flux density and the thickness of the magnetic layer of this magnetic tape, measured in the tape-orientating direction, were 198.6 kA/m and 0.023 µTm, respectively.

Example 14

Yttrium-iron nitride magnetic powder was prepared in the same manner as in Example 1, except that the nitriding temperature was changed from 150° C. to 170° C.

The contents of yttrium and nitrogen of this yttrium-iron nitride magnetic powder were measured by a fluorescent X-ray analysis, and were found to be 5.1 atomic % and 15.1 atomic %, respectively. Further, a profile indicating the presence of a $Fe_{16}N_2$ phase was observed from the X-ray diffraction pattern.

Furthermore, the particle shapes of the magnetic powder were observed with a high resolution analytic transmission electron microscope, and they were found to be spherical or ellipsoidal particles with an average particle size of 21 nm. The specific surface area of the magnetic powder determined by the BET method was 54.6 $m^2/g$.

Still furthermore, the saturation magnetization of this magnetic powder found by applying a magnetic field of 1,274 kA/m (16 kOe) was 123.3 $Am^2/kg$ (123.3 emu/g), and the coercive force thereof was 226.1 kA/m (2,840 Oe). This magnetic powder was stored at 60° C. and 90% RH for one week, and then, the saturation magnetization of this magnetic powder was measured in the same manner. As a result, it was 105.2 $Am^2/kg$ (105.2 emu/g), and the saturation magnetization-maintaining rate of the magnetic powder was 85.3%.

A paint for upper magnetic layer was prepared in the same manner as in Example 1, using the rare earth-iron nitride magnetic powder obtained as above. In this regard, this magnetic powder was prepared by scaling up the procedure of the method of the present Example by 100 times. Further, a paint for lower magnetic layer, a paint for primer layer, a paint for non-magnetic intermediate layer and a paint for backcoat layer were prepared in the same manners as in Example 1. The same plate oxide particles such as plate alumina particles and plate ITO particles as described in Example 1 were used. The paints for magnetic layers, primer layer, non-magnetic intermediate layer and backcoat layer thus prepared were applied in the same manners as in Example 1 to make a magnetic tape under the same conditions as in Example 1. Magnetic servo signals were recorded on the magnetic tape thus obtained, with a servo writer, and the magnetic tape was set in a cartridge shown in FIG. 2 for use as a computer tape. The coercive force and the product Br.δ of the residual magnetic flux density and the thickness of the magnetic layer of the magnetic tape, measured in the tape-orientating direction, were 293.6 kA/m and 0.019 µTm, respectively.

Example 15

As magnetic powder, yttriuim-silicon-iron nitride magnetic powder was used. This magnetic powder was prepared by using the same magnetite particles as those used in Example 1, and treating them with yttrium and silicon. That is, the magnetite particles were coated with yttrium hydroxide and then with silicon oxide which was obtained by neutralizing a solution of 0.5 g of sodium silicate with dilute nitric acid. This magnetic powder was reduced and nitrided in the same manners as in Example 1, to obtain the yttrium-silicon-iron nitride magnetic powder.

The contents of yttrium, silicon and nitrogen of this yttrium-silicon-iron nitride magnetic powder were measured by a fluorescent X-ray analysis, and were found to be 5.1 atomic %, 1.8 atomic % and 9.2 atomic %, respectively. Further, a diffraction peak derived from a $Fe_{16}N_2$ phase and a diffraction peak derived from an α-Fe phase were observed from the X-ray diffraction pattern. Thus, it was confirmed that this yttrium-silicon-iron nitride magnetic powder comprised a mixed phase of a $Fe_{16}N_2$ phase and an α-Fe phase.

Furthermore, the particle shapes of the magnetic powder were observed with a high resolution analytic transmission electron microscope, and they were found to be substantially spherical particles with an average particle size of 20 nm. The saturation magnetization of this magnetic powder found by applying a magnetic field of 1,274 kA/m (16 kOe) was 131.0 $Am^2/kg$ (131.0 emu/g), and the coercive force thereof was 231.6 kA/m (2,910 Oe). This magnetic powder was stored at 60° C. and 90% RH for one week, and then, the saturation magnetization of this magnetic powder was measured in the same manner. As a result, it was 118.3 $Am^2/kg$ (118.3 emu/g), and the saturation magnetization-maintaining rate of the magnetic powder was 90.3%.

A paint for upper magnetic layer was prepared in the same manner as in Example 1, using the yttrium-silicon-iron nitride magnetic powder prepared by scaling up the procedure of the above method. Other layers were formed in the same manner as in Example 1. Thus, a magnetic tape was made. The coercive force and the product Br.δ of the residual magnetic flux density and the thickness of the magnetic layer of the magnetic tape, measured in the tape-orientating direction, were 298.8 kA/m and 0.021 µTm, respectively.

Comparative Example 4

Magnetic powder was prepared in the same manner as in Example 1, except that spherical or ellipsoidal magnetite particles with a particle size of 25 nm were reduced by heating at 400° C. in the stream of a hydrogen gas for 2 hours, without the step of depositing yttrium thereon. The magnetic powder was cooled to 90° C. in the stream of a hydrogen gas. Then, the hydrogen gas was changed to a mixed gas of oxygen and nitrogen, and the magnetic powder was stabilized in the stream of the mixed gas for 2 hours. The magnetic powder was then cooled from 90° C. to 40° C. still in the stream of the mixed gas, and then maintained at 40° C. for about 10 hours, and exposed to an air for use. The particle shapes of the resultant magnetic powder were observed with a high resolution analytic transmission electron microscope, and they were found to be spherical or ellipsoidal particles with an average particle size of 70 nm. The specific surface area of the magnetic powder determined by the BET method was 15.6 $m^2/g$. The saturation magnetization of the magnetic powder found by applying a magnetic field of 1,274 kA/m (16 kOe) was 195.2 $Am^2/kg$ (195.2 emu/g), and the coercive force thereof was 49.4 kA/m (620 Oe).

This magnetic powder was prepared by scaling up the procedure of the above method, and a paint for upper magnetic layer was prepared in the same manner as in Example 1, using this magnetic powder. Using this paint for upper magnetic layer, a magnetic tape having an upper magnetic layer with a thickness of 0.06 µm was made in the same manner as in Example 10. However, because of the large variation in the thickness of the upper magnetic layer, it was impossible to make a magnetic tape having a magnetic layer with an uniform thickness.

The coercive force and the product Br.δ of the residual magnetic flux density and the thickness of the magnetic layer of the magnetic tape, measured in the tape-orientating direction, were 66.7 kA/m and 0.066 µTm, respectively.

Comparative Example 5

Iron nitride powder was prepared in the same manner as in Example 1, except that magnetite particles with an average particle diameter of 25 nm were reduced by heating at 400° C. in the stream of a hydrogen gas for 2 hours without the step of depositing yttrium thereon, and then that the resultant magnetic particles were nitrided at 150° C. in the stream of ammonia for 30 hours.

The content of nitrogen of this magnetic powder was measured by a fluorescent X-ray analysis, and was found to be 8.9 atomic %. Further, the particle shapes of this magnetic powder were observed with a high resolution analytic transmission electron microscope, and they were found to be spherical or ellipsoidal particles with a particle diameter of 75 nm. The specific surface area of the magnetic powder determined by the BET method was 14.9 m$^2$/g. A profile indicating the presence of a $Fe_{16}N_2$ phase was observed from the X-ray diffraction pattern. The saturation magnetization of the magnetic powder found by applying a magnetic field of 1,274 kA/m (16 kOe) was 186.4 Am$^2$/kg (186.4 emu/g), and the coercive force thereof was 183.1 kA/m (2,300 Oe).

A paint for upper magnetic layer was prepared in the same manner as in Example 1, using this magnetic powder which was prepared by scaling up the procedure of the above method. Using this paint for upper magnetic layer, a magnetic tape having an upper magnetic layer with a thickness of 0.06 µm was made in the same manner as in Example 1. However, because of the large particle size, the variation in the thickness of the upper magnetic layer was large. Therefore, it was impossible to make a magnetic tape having a magnetic layer with an uniform thickness.

The coercive force and the product Br.δ of the residual magnetic flux density and the thickness of the magnetic layer of the magnetic tape, measured in the tape-orientating direction, were 217.9 kA/m and 0.068 µTm, respectively.

The conditions for the preparation of the magnetic powders of Examples 1 and 10 to 15 and Comparative Examples 4 and 5 are shown in Table 2. The elemental compositions (atomic % of the rare earth elements and nitrogen), the presence or absence of a $Fe_{16}N_2$ phase, the average particle sizes and the BET specific surface areas of the magnetic powders of Examples 1 and 10 to 15 and Comparative Examples 4 and 5 are shown in Table 3. Further, the saturation magnetizations, the coercive forces and the storage stability (the saturation magnetization and the maintaining rates thereof found after the storage) of the magnetic powders of Examples 1 and 10 to 15, and Comparative Examples 4 and 5 are shown in Table 4.

TABLE 2

| | Av. particle size of material | Conditions for reduction | | Conditions for nitriding | |
|---|---|---|---|---|---|
| | powder (nm) | Temperature (° C.) | Time (hour) | Temperature (° C.) | Time (hour) |
| Ex. 1 | 25 | 450 | 2 | 150 | 30 |
| Ex. 10 | 20 | 450 | 2 | 150 | 30 |
| Ex. 11 | 30 | 450 | 2 | 150 | 30 |
| Ex. 12 | 25 | 450 | 2 | 150 | 30 |
| Ex. 13 | 25 | 450 | 2 | 150 | 30 |
| Ex. 14 | 25 | 450 | 2 | 170 | 30 |
| Ex. 15 | 25 | 450 | 2 | 150 | 30 |

TABLE 2-continued

| | Av. particle size of material | Conditions for reduction | | Conditions for nitriding | |
|---|---|---|---|---|---|
| | powder (nm) | Temperature (° C.) | Time (hour) | Temperature (° C.) | Time (hour) |
| C. Ex. 4 | 25 | 400 | 2 | — | — |
| C. Ex. 5 | 25 | 400 | 2 | 150 | 30 |

TABLE 3

| | Composition (atomic %) | | Presence of $Fe_{16}N_2$ phase | Av. particle size (nm) | BET specific surface area (m$^2$/g) |
|---|---|---|---|---|---|
| | Rare earth element | Nitrogen | | | |
| Ex. 1 | 5.3 | 10.8 | Yes | 20 | 53.2 |
| Ex. 10 | 5.5 | 11.9 | Yes | 17 | 60.1 |
| Ex. 11 | 4.8 | 10.1 | Yes | 27 | 42.0 |
| Ex. 12 | 14.6 | 9.5 | Yes | 21 | 64.3 |
| Ex. 13 | — | 8.9 | Yes | 25 | 46.5 |
| Ex. 14 | 5.1 | 15.1 | Yes | 21 | 54.6 |
| Ex. 15 | 5.1 | 9.2 | Yes | 20 | 54.6 |
| C. Ex. 4 | 0 | — | No | 70 | 15.6 |
| C. Ex. 5 | 0 | 8.9 | Yes | 75 | 14.9 |

TABLE 4

| | Saturation magnetization (Am$^2$/kg) | Coercive force (kA/m) | Storage stability | |
|---|---|---|---|---|
| | | | Saturation magnetization after storage (Am$^2$/kg) | Maintaining rate (%) |
| Ex. 1 | 135.2 | 226.9 | 118.2 | 87.4 |
| Ex. 10 | 130.5 | 211.0 | 106.9 | 81.9 |
| Ex. 11 | 155.1 | 235.4 | 140.1 | 90.3 |
| Ex. 12 | 105.8 | 232.5 | 95.8 | 90.5 |
| Ex. 13 | 136.7 | 171.9 | 115.3 | 84.3 |
| Ex. 14 | 123.3 | 226.1 | 105.2 | 85.3 |
| Ex. 15 | 131.0 | 231.6 | 118.3 | 90.3 |
| C. Ex. 4 | 195.2 | 49.4 | — | — |
| C. Ex. 5 | 186.4 | 183.1 | — | — |

Example 16

A paint for upper magnetic layer was prepared in the same manner as in Example 1, using, as magnetic powder, yttrium-iron nitride magnetic powder described in Example 1 (the coercive force: 226.9 kA/m, the saturation magnetization: 135.2 Am$^2$/kg, the particle size: 20 nm, and the particle shape: spherical or ellipsoidal), and this paint was orientated under a magnetic field, dried and calendered so that the resultant upper magnetic layer could have a thickness of 0.06 to 0.08 µm after calendered, as in Example 1. The same plate oxide particles such as plate alumina particles and plate ITO particles as those used in Example 1 were used. Paints for magnetic layer, primer layer and backcoat layer were prepared and applied in the same manners as in Example 10 to make a magnetic tape under the same conditions as those employed in Example 1. Magnetic servo signals were recorded on the magnetic tape thus obtained with a servo writer, and the magnetic tape was set in a cartridge shown in FIG. 2 for use as a computer tape.

The coercive force and the product Br.δ of the residual magnetic flux density and the thickness of the magnetic layer, measured along the orientating direction of this magnetic tape, were 283.6 kA/m and 0.027 µTm, respectively.

Example 17

A paint for upper magnetic layer was prepared in the same manner as in Example 1, using, as magnetic powder, yttrium-iron nitride magnetic powder described in Example 10 (the coercive force: 211.0 kA/m, the saturation magnetization: 130.5 Am²/kg, the particle size: 17 nm, and the particle shape: spherical or ellipsoidal), and this paint was orientated under a magnetic field, dried and calendered so that the resultant upper magnetic layer could have a thickness of 0.06 to 0.08 µm after calendered, as in Example 1. The same plate oxide particles such as plate alumina particles and plate ITO particles as those used in Example 1 were used. Paints for magnetic layer, primer layer and backcoat layer were prepared and applied in the same manners as in Example 1 to make a magnetic tape under the same conditions as those employed in Example 10. Magnetic servo signals were recorded on the magnetic tape thus obtained with a servo writer, and the magnetic tape was set in a cartridge shown in FIG. 2 for use as a computer tape. The coercive force and the product Br.δ of the residual magnetic flux density and the thickness of the magnetic layer, measured along the orientating direction of this magnetic tape, were 280.6 kA/m and 0.024 µTm, respectively.

Comparative Example 6

A paint for upper magnetic layer was prepared in the same manner as in Example 1, using needle particle type Fe—Co alloy magnetic powder (Co/Fe: 22.1 wt. %, the coercive force: 195.0 kA/m, the saturation magnetization: 108.7 Am²/g, the average major axial length: 60 nm, and the axial ratio: 5) as magnetic powder, and a magnetic tape was made under the same conditions as in Example 10. The thickness of the upper magnetic layer could not be controlled to 0.06 µm, and it resulted in 0.09 µm. Magnetic servo signals were recorded on the magnetic tape thus obtained with a servo writer, and the magnetic tape was set in a cartridge shown in FIG. 2 for use as a computer tape.

The coercive force and the product Br.δ of the residual magnetic flux density and the thickness of the magnetic layer, measured along the orientating direction of this magnetic tape, were 200.8 kA/m and 0.017 µTm, respectively.

The coercive forces (Hc), saturation magnetic flux densities (Bm), squareness ratios (Br/Bm) and anisotropic magnetic field distributions (Ha) of the magnetic tapes of Example 10 to 17 and Comparative Examples 4 to 6 were measured as the magnetic properties of the magnetic tapes. The results are shown in Table 5.

The anisotropic magnetic field distribution was obtained by measuring a differential curve in the second quadrant of the hysteresis loop of the tape (demagnetization curve) and dividing a magnetic field corresponding to the half-width value of the differential curve by the coercive force of the tape. That is, as the coercive force distribution of the magnetic powder is narrower or the dispersion and orientation of the magnetic powder in the tape is better, Ha is smaller. When the coercive force is the same, the smaller Ha leads to the better C and C/N properties.

TABLE 5

| | Ex. 10 | Ex. 11 | Ex. 12 | Ex. 13 |
|---|---|---|---|---|
| Upper magnetic layer | | | | |
| Magnetic powder | | | | |
| Elemental composition | Y—N—Fe | Y—N—Fe | Y—N—Fe | Y—N—Fe |
| Particle size (nm) | 17 | 27 | 21 | 25 |
| Filler | | | | |
| Plate alumina (50 nm) | 10 | 10 | 10 | 10 |
| Granular alumina (80 nm) | — | — | — | — |
| CB (75 nm) | — | — | — | — |
| Plate ITO (40 nm) | 5 | 5 | 5 | 5 |
| Roughness Ra (nm) | 2.5 | 2.7 | 2.5 | 2.6 |
| Coercive force (kA/m) | 278.5 | 294.3 | 297.6 | 198.6 |
| Squareness ratio | 0.80 | 0.84 | 0.81 | 0.83 |
| Br.δ (µTm) | 0.019 | 0.023 | 0.017 | 0.023 |
| Anisotropic magnetic field distribution (Ha) | 0.50 | 0.48 | 0.45 | 0.51 |
| Non-magnetic intermediate layer | | | | |
| Filler | | | | |
| Plate alumina (50 nm) | — | — | — | — |
| Plate iron oxide (50 nm) | 10 | 10 | 10 | 10 |
| Needle iron oxide (100 nm) | — | — | — | — |
| Granular alumina (80 nm) | — | — | — | — |
| CB (25 nm) | — | — | — | — |
| Plate ITO (40 nm) | 90 | 90 | 90 | 90 |
| Lower magnetic layer | | | | |
| Magnetic powder | | | | |
| Elemental composition | Y—Al—Co—Fe | Y—Al—Co—Fe | Y—Al—Co—Fe | Y—Al—Co—Fe |
| Particle size (nm) | 100 | 100 | 100 | 100 |
| Filler | | | | |
| Plate alumina (50 nm) | — | — | — | — |
| Granular alumina (80 nm) | 10 | 10 | 10 | 10 |
| CB (75 nm) | 5 | 5 | 5 | 5 |
| Plate ITO (40 nm) | — | — | — | — |
| Primer layer | | | | |
| Filler | | | | |
| Plate alumina (50 nm) | 10 | 10 | 10 | 10 |
| Plate iron oxide (50 nm) | — | — | — | — |
| Needle iron oxide (100 nm) | — | — | — | — |

TABLE 5-continued

| | | | | |
|---|---|---|---|---|
| Granular alumina (80 nm) | — | — | — | — |
| CB (25 nm) | — | — | — | — |
| Plate ITO (40 nm) | 90 | 90 | 90 | 90 |
| BC layer | | | | |
| *Filler* | | | | |
| CB (25 nm) | 10 | 10 | 10 | 10 |
| CB (0.35 μm) | — | — | — | — |
| Granular iron oxide (0.4 μm) | — | — | — | — |
| Plate iron oxide (50 nm) | 10 | 10 | 10 | 10 |
| Plate ITO (40 nm) | 80 | 80 | 80 | 80 |
| Thickness of upper magnetic layer (μm) | 0.06 | 0.06 | 0.06 | 0.06 |
| Thickness of non-magnetic intermediate layer (μm) | 0.3 | 0.3 | 0.3 | 0.3 |
| Thickness of lower magnetic layer (μm) | 0.5 | 0.5 | 0.5 | 0.5 |
| Thickness of primer layer (μm) | 0.5 | 0.5 | 0.5 | 0.5 |
| Thickness of support (μm) | 3.3 | 3.3 | 3.3 | 3.3 |
| Thickness of BC layer (μm) | 0.5 | 0.5 | 0.5 | 0.5 |
| Total thickness (μm) | 5.16 | 5.16 | 5.16 | 5.16 |
| C (dB) | 2.9 | 2.8 | 2.9 | 2.8 |
| C/N (dB) | 12.9 | 11.3 | 12.1 | 12.2 |
| Output of servo signal (dB) | 5.8 | 5.9 | 5.6 | 5.8 |
| Thermal expansion coefficient ($\times 10^{-6}$/°C) | 4.6 | 4.9 | 4.7 | 4.8 |
| Humidity expansion coefficient ($\times 10^{-6}$/% RH) | 13.3 | 13.5 | 13.4 | 13.5 |
| Amount of off-track (μm) | 1.4 | 1.4 | 1.5 | 1.3 |

| | Ex. 14 | Ex. 15 | Ex. 16 | Ex. 17 |
|---|---|---|---|---|
| Upper magnetic layer | | | | |
| *Magnetic powder* | | | | |
| Elemental composition | Al—N—Fe | Y—N—Fe | Y—N—Fe | Y—N—Fe |
| Particle size (nm) | 25 | 25 | 17 | 17 |
| *Filler* | | | | |
| Plate alumina (50 nm) | 10 | 10 | 10 | 10 |
| Granular alumina (80 nm) | — | — | — | — |
| CB (75 nm) | — | — | — | — |
| Plate ITO (40 nm) | 5 | 5 | 5 | 5 |
| Roughness Ra (nm) | 2.7 | 2.4 | 2.5 | 2.6 |
| Coercive force (kA/m) | 293.6 | 298.8 | 280.6 | 280.6 |
| Squareness ratio | 0.82 | 0.84 | 0.81 | 0.80 |
| Br·δ (μTm) | 0.019 | 0.021 | 0.024 | 0.024 |
| Anisotropic magnetic field distribution (Ha) | 0.45 | 0.46 | 0.49 | 0.50 |
| Non-magnetic intermediate layer | | | | |
| *Filler* | | | | |
| Plate alumina (50 nm) | — | — | — | — |
| Plate iron oxide (50 nm) | 10 | 10 | 10 | 10 |
| Needle iron oxide (100 nm) | — | — | — | — |
| Granular alumina (80 nm) | — | — | — | — |
| CB (25 nm) | — | — | — | — |
| Plate ITO (40 nm) | 90 | 90 | 90 | 90 |
| Lower magnetic layer | | | | |
| *Magnetic powder* | | | | |
| Elemental composition | Y—Al—Co—Fe | Y—Al—Co—Fe | Y—Al—Co—Fe | Y—Al—Co—Fe |
| Particle size (nm) | 100 | 100 | 100 | 100 |
| *Filler* | | | | |
| Plate alumina (50 nm) | — | — | — | — |
| Granular alumina (80 nm) | 10 | 10 | 10 | 10 |
| CB (75 nm) | 5 | 5 | 5 | 5 |
| Plate ITO (40 nm) | — | — | — | — |
| Primer layer | | | | |
| *Filler* | | | | |
| Plate alumina (50 nm) | 10 | 10 | 10 | 10 |
| Plate iron oxide (50 nm) | — | — | — | — |
| Needle iron oxide (100 nm) | — | — | — | — |
| Granular alumina (80 nm) | — | — | — | — |
| CB (25 nm) | — | — | — | — |
| Plate ITO (40 nm) | 90 | 90 | 90 | 90 |
| BC layer | | | | |
| *Filler* | | | | |
| CB (25 nm) | 10 | 10 | 10 | 10 |
| CB (0.35 μm) | — | — | — | — |
| Granular iron oxide (0.4 μm) | — | — | — | — |
| Plate iron oxide (50 nm) | 10 | 10 | 10 | 10 |
| Plate ITO (40 nm) | 80 | 80 | 80 | 80 |
| Thickness of upper magnetic layer (μm) | 0.06 | 0.08 | 0.08 | 0.08 |
| Thickness of non-magnetic intermediate layer (μm) | 0.3 | 0.3 | 0.3 | 0.3 |
| Thickness of lower magnetic layer (μm) | 0.5 | 0.5 | 0.5 | 0.5 |

TABLE 5-continued

|  |  |  |  |  |
|---|---|---|---|---|
| Thickness of primer layer (μm) | 0.5 | 0.5 | 0.5 | 0.5 |
| Thickness of support (μm) | 3.3 | 3.3 | 3.3 | 3.3 |
| Thickness of BC layer (μm) | 0.5 | 0.5 | 0.5 | 0.5 |
| Total thickness (μm) | 5.16 | 5.18 | 5.18 | 5.18 |
| C (dB) | 2.8 | 3.0 | 2.9 | 2.9 |
| C/N (dB) | 12.2 | 12.0 | 12.8 | 12.8 |
| Output of servo signal (dB) | 5.7 | 7.2 | 7.3 | 7.0 |
| Thermal expansion coefficient (× $10^{-6}$/° C.) | 4.7 | 4.8 | 4.9 | 5.1 |
| Humidity expansion coefficient (× $10^{-6}$/% RH) | 13.6 | 13.6 | 13.7 | 13.5 |
| Amount of off-track (μm) | 1.4 | 1.5 | 1.6 | 1.4 |

|  | C. Ex. 4 | C. Ex. 5 | C. Ex. 6 |
|---|---|---|---|
| Upper magnetic layer | | | |
| Magnetic powder | | | |
| Elemental composition | Fe | N—Fe | Co—Fe |
| Particle size (nm) | 70 | 75 | 60 |
| Filler | | | |
| Plate alumina (50 nm) | 10 | 10 | 10 |
| Granular alumina (80 nm) | — | — | — |
| CB (75 nm) | — | — | — |
| Plate ITO (40 nm) | 5 | 5 | 5 |
| Roughness Ra (nm) | 6.5 | 5.2 | 4.8 |
| Coercive force (kA/m) | 66.7 | 217.9 | 200.8 |
| Squareness ratio | 0.38 | 0.72 | 0.84 |
| Br.δ (μTm) | 0.066 | 0.068 | 0.017 |
| Anisotropic magnetic field distribution (Ha) | >1.0 | >1.0 | 0.61 |
| Non-magnetic intermediate layer | | | |
| Filler | | | |
| Plate alumina (50 nm) | — | — | — |
| Plate iron oxide (50 nm) | 10 | 10 | 10 |
| Needle iron oxide (100 nm) | — | — | — |
| Granular alumina (80 nm) | — | — | — |
| CB (25 nm) | — | — | — |
| Plate ITO (40 nm) | 90 | 90 | 90 |
| Lower magnetic layer | | | |
| Magnetic powder | | | |
| Elemental composition | Y—Al—Co—Fe | Y—Al—Co—Fe | Y—Al—Co—Fe |
| Particle size (nm) | 100 | 100 | 100 |
| Filler | | | |
| Plate alumina (50 nm) | — | — | — |
| Granular alumina (80 nm) | 10 | 10 | 10 |
| CB (75 nm) | 5 | 5 | 5 |
| Plate ITO (40 nm) | — | — | — |
| Primer layer | | | |
| Filler | | | |
| Plate alumina (50 nm) | 10 | 10 | 10 |
| Plate iron oxide (50 nm) | — | — | — |
| Needle iron oxide (100 nm) | — | — | — |
| Granular alumina (80 nm) | — | — | — |
| CB (25 nm) | — | — | — |
| Plate ITO (40 nm) | 90 | 90 | 90 |
| BC layer | | | |
| Filler | | | |
| CB (25 nm) | 10 | 10 | 10 |
| CB (0.35 μm) | — | — | — |
| Granular iron oxide (0.4 μm) | — | — | — |
| Plate iron oxide (50 nm) | 10 | 10 | 10 |
| Plate ITO (40 nm) | 80 | 80 | 80 |
| Thickness of upper magnetic layer (μm) | 0.35 | 0.2 | 0.09 |
| Thickness of non-magnetic intermediate layer (μm) | 0.3 | 0.3 | 0.3 |
| Thickness of lower magnetic layer (μm) | 0.5 | 0.5 | 0.5 |
| Thickness of primer layer (μm) | 0.5 | 0.5 | 0.5 |
| Thickness of support (μm) | 3.3 | 3.3 | 3.3 |
| Thickness of BC layer (μm) | 0.5 | 0.5 | 0.5 |
| Total thickness (μm) | 5.45 | 5.30 | 5.19 |
| C (dB) | — | — | 2.4 |
| C/N (dB) | — | — | 8.2 |
| Output of servo signal (dB) | — | — | 7.5 |
| Thermal expansion coefficient (× $10^{-6}$/° C.) | — | — | 5.2 |
| Humidity expansion coefficient (× $10^{-6}$/% RH) | — | — | 14.0 |
| Amount of off-track (μm) | — | — | 1.6 |

It was confirmed from Tables 3 and 4 that the iron nitride magnetic powders of Examples 1 and 10 to 15 of the present invention which contained rare earth elements, Al and Si were substantially spherical or ellipsoidal particles with particle sizes of 5 to 50 nm, which are optimal for magnetic recording media having magnetic layers with thickness of as thin as 0.09 μm or less. It was also confirmed that these magnetic powders had higher coercive forces and saturation magnetization optimal for high density recording, in spite of their spherical or ellipsoidal particles, and simultaneously had excellent saturation magnetization-maintaining stability.

As is understood from Examples 10 to 17 in Table 5, the iron-nitride magnetic powders of the present invention, when used in magnetic recording media, show excellent magnetic field orientation because of their high magnetic anisotropy, in spite of their substantially spherical or ellipsoidal particles. Further, the magnetic recording media of the present invention show excellent anisotropic magnetic field distributions, which reflect the sharp coercive force distributions of the magnetic powders of the present invention. The magnetic tapes having such small anisotropic magnetic field distributions show excellent electromagnetic conversion characteristics (C, C/N).

The excellent properties of the magnetic recording media of the present invention as such high density recording media are more markedly exhibited when the rare earth-iron nitride magnetic powder containing an iron nitride represented by $Fe_{16}N_2$ was used.

On the other hand, the magnetic powders of Comparative Examples 4 and 5 comprise practically spherical particles with particle sizes of as large as 50 nm or more, and therefore, essentially can not be used for magnetic recording media which have magnetic layers with thickness of as thin as 0.9 μm or less. In addition, the magnetic powder of Comparative Example 4 contains no rare earth element, and thus has markedly smaller coercive force than any of the magnetic powders of the present invention. The magnetic powder of Comparative Example 5 contains an iron nitride and thus has a relatively high coercive force. However, this magnetic powder contains no rare earth element, Al or Si, and therefore, it is impossible to control the particle size thereof to 5 to 50 nm suitable for high density magnetic recording media.

The magnetic tape of Comparative Example 6 which uses the needle particle type magnetic powder has a high coercive force and high orientation, but shows a larger anisotropic magnetic field than any of the magnetic tapes of the present invention. As a result, this magnetic tape shows poor electromagnetic conversion characteristics (C, C/N). This is because the needle particle type magnetic powder has a wider particle size distribution, as compared with the magnetic powders of the present invention which comprises substantially spherical or ellipsoidal particles. As a result, the needle particle type magnetic powder has a wider coercive force distribution. Furthermore, the needle particles of such magnetic powder, when used in a magnetic recording medium having a thin magnetic layer, are raised at a higher rate from the surface of the magnetic layer, and therefore, signals are often non-uniformly recorded on the magnetic layer, and noises occur when such signals are reproduced. This is considered to be the reason why the electromagnetic conversion characteristics (C, C/N) of the magnetic powder of Comparative Example 6 are lower than any of the magnetic powders of the present invention. Furthermore, in comparison between the magnetic tapes of Examples 10 to 17 and Comparative Example 2 in Table 1, the servo outputs of the magnetic tapes of Examples 10 to 17 are increased by forming the lower magnetic layers, and thus, improvement on serve characteristics can be expected.

As has been fully described above, the iron type magnetic powders used in Examples according to the present invention can show high coercive forces derived from the uniaxial crystalline magnetic anisotropy, in spite of their spherical or ellipsoidal particles, and also have saturation magnetization optimal for high density magnetic recording, in spite of their very fine particles. Particularly, a magnetic tape which uses an iron nitride-based magnetic powder comprising an iron nitride represented by $Fe_{16}N_2$, and a rare earth element, Al or Si, for the upper magnetic layer, can show a higher coercive force and excellent electromagnetic conversion characteristics (C, C/N). Still furthermore, by forming a lower magnetic layer, outputs of servo signals (C) becomes larger, and thus, improvement on the servo characteristics can be expected.

EFFECT OF THE INVENTION

As described above, according to the present invention, there can be provided linear recording type magnetic recording media for computers, having excellent electromagnetic conversion characteristics (C, C/N) and high stability against changes in temperature and humidity. Thus, magnetic recording media and magnetic recording cartridges for computers, capable of corresponding to a memory capacity of, for example, 1 TB or more can be realized. Further, by forming lower magnetic layers in the magnetic tapes, outputs of servo signals (C) are increased, and thus, improvement on servo characteristics can be expected.

The invention claimed is:

1. A magnetic recording medium comprising
a non-magnetic support,
at least one lower magnetic layer containing magnetic powder and a binder resin, which is formed on one side of the non-magnetic support with or without a non-magnetic primer layer interposed between the non-magnetic support and the lower magnetic layer,
at least one non-magnetic intermediate layer containing non-magnetic powder and a binder resin, which is formed on the lower magnetic layer,
at least one upper magnetic layer containing magnetic powder and a binder resin, which is formed on the non-magnetic intermediate layer, and
a back layer which is formed on the other side of the non-magnetic support,
wherein the magnetic powder contained in the uppermost magnetic layer of the upper magnetic layer is a magnetic powder which comprises iron and is substantially spherical or ellipsoidal particles with a number-average particle diameter of 5 to 50 nm and an average axial ratio of 1 to 2, each of said particles has a core portion and an outer layer portion, wherein said core portion contains an iron nitride phase in which a part of the iron is optionally substituted by another transition element, and wherein a rare earth element is present mainly in said outer layer portion; and that the total thickness of the magnetic recording medium is 6 μm or less.

2. The magnetic recording medium according to claim 1, wherein the thickness of the uppermost magnetic layer is 0.09 μm or less.

3. The magnetic recording medium according to claim 1, wherein the back layer is a backcoat layer containing carbon black powder and a binder.

4. The magnetic recording medium according to claim 1, wherein the magnetic powder of the uppermost magnetic layer has a number-average particle diameter of 5 to 30 nm.

5. The magnetic recording medium according to claim 1, wherein the coercive force of the uppermost magnetic layer is 200 to 400 kA/m.

6. The magnetic recording medium according to claim 1, wherein the coercive force of the magnetic powder of the uppermost magnetic layer is 200 to 400 kA/m.

7. The magnetic recording medium according to claim 1, wherein the thickness of the non-magnetic intermediate layer is 0.2 to 0.6 μm.

8. The magnetic recording medium according to claim 1, wherein the non-magnetic intermediate layer contains plate oxide particles with a particle size (plate diameter) of 10 to 100 nm.

9. The magnetic recording medium according to claim 1, wherein the thickness of the lower magnetic layer is 0.2 to 1.0 μm.

10. The magnetic recording medium according to claim 1, wherein the coercive force of the lower magnetic layer is 80 to 250 kA/m.

11. The magnetic recording medium according to claim 1, wherein the product (Br.δ) of the residual magnetic flux density (Br) and the thickness (δ) of the uppermost magnetic layer is 0.0018 to 0.05 μTm.

12. The magnetic recording medium according to claim 1, wherein the magnetic powder of the uppermost magnetic layer has a number-average particle diameter of 5 to 20 nm.

13. The magnetic recording medium according to claim 1, wherein the magnetic powder of the uppermost magnetic layer comprises magnetic particles each of which has the core portion containing an iron nitride phase represented by $Fe_{16}N_2$ in which a part of the iron is optionally substituted by a transition metal element.

14. The magnetic recording medium according to claim 1, wherein the magnetic powder of the uppermost magnetic layer comprises magnetic particles each of which has the core portion containing an iron nitride phase represented by $Fe_{16}N_2$ in which a part of the iron is optionally substituted by a transition metal element, and wherein at least one of aluminum and silicon is present mainly in the outer layer portion of each magnetic particle.

15. The magnetic recording medium according to claim 1, wherein the magnetic powder of the uppermost magnetic layer comprises magnetic particles each of which has the core portion containing an iron nitride phase represented by $Fe_{16}N_2$ in which a part of the iron is optionally substituted by a transition metal element; wherein at least one of aluminum and silicon is present mainly in the outer layer portion of each magnetic particle; and wherein the content of at least one of aluminum and silicon is 1 to 20 atomic %.

16. The magnetic recording medium according to claim 1, wherein a rare earth element is present in the magnetic powder in a concentration of 0.2 to 20 atomic % based on the content of the iron.

17. The magnetic recording medium according to claim 1, wherein a rare earth element is present in the magnetic powder in a concentration of 0.5 to 15 atomic % based on the content of the iron.

18. The magnetic recording medium according to claim 1, wherein the magnetic powder comprises nitrogen in a quantity of 1.0 to 20 atomic % based on the content of the iron.

19. The magnetic recording medium according to claim 1, wherein the magnetic powder comprises nitrogen in a quantity of 2.0 to 12.5 atomic % based on the content of the iron.

20. The magnetic recording medium according to claim 1, wherein at least one element selected from the group consisting of samarium, neodymium and yttrium is contained as the rare earth element in the magnetic powder.

21. A magnetic recording cartridge comprising a box-shaped casing body and a reel onto which the magnetic recording medium defined in claim 1 is wound, disposed in the box-shaped casing body, characterized in that magnetically recorded data signals on the uppermost magnetic layer of the medium are reproduced with a magnetoresistance magnetic head (or a MR head).

22. The magnetic recording cartridge according to claim 21, wherein at least one set of the servo signals are magnetic servo signals recorded on the magnetic layer, which are reproduced with a magnetoresistance magnetic head (a MR head).

23. A magnetic recording cartridge comprising a box-shaped casing body and a reel onto which the magnetic recording medium defined in claim 1 is wound, disposed in the box-shaped casing body, characterized in that tracking is performed by tracing servo signals on the magnetic recording medium.

24. The magnetic recording cartridge according to claim 23, wherein servo signals are recorded on at least one of the magnetic layer and the back layer of the magnetic recording medium.

25. The magnetic recording cartridge according to claim 23, wherein the servo signals are at least one selected from magnetic servo signals and optical servo signals.

26. The magnetic recording cartridge according to claim 23, wherein at least one set of the servo signals are magnetic servo signals which are reproduced with a magnetoresistance magnetic head (a MR head).

27. The magnetic recording medium according to claim 1, wherein the magnetic recording medium comprises a primer layer and said primer layer comprises carbon black, granular non-magnetic powder and a binder resin.

* * * * *